United States Patent
Ariyama et al.

[11] Patent Number: 6,053,962
[45] Date of Patent: Apr. 25, 2000

[54] SCRAP MELTING PROCESS

[75] Inventors: Tatsuro Ariyama; Takanori Inoguchi; Hidetoshi Noda; Masahiro Matsuura; Tsutomu Shikada; Takeshi Konishi; Ryota Murai, all of Tokyo, Japan

[73] Assignee: NKK Corporation, Tokyo, Japan

[21] Appl. No.: 08/849,233

[22] PCT Filed: Apr. 30, 1996

[86] PCT No.: PCT/JP96/01184
§ 371 Date: Aug. 11, 1997
§ 102(e) Date: Aug. 11, 1997

[87] PCT Pub. No.: WO97/12997
PCT Pub. Date: Apr. 10, 1997

[30] Foreign Application Priority Data

Oct. 2, 1995 [JP] Japan .................................. 7-278445
Oct. 2, 1995 [JP] Japan .................................. 7-278446
Oct. 2, 1995 [JP] Japan .................................. 7-278447

[51] Int. Cl.⁷ .................................................... C21B 11/02
[52] U.S. Cl. ............................ 75/573; 75/575; 75/577; 75/581
[58] Field of Search ......................... 75/573, 575, 577, 75/581

[56] References Cited

U.S. PATENT DOCUMENTS

| 4,556,418 | 12/1985 | Syska | 75/573 |
| 5,244,490 | 9/1993 | Agarwal | 75/577 |
| 5,772,727 | 6/1998 | De Haas et al. | 75/378 |

FOREIGN PATENT DOCUMENTS

| 53-25221 | 3/1978 | Japan . |
| 55-125211 | 9/1980 | Japan . |
| 56-51509 | 5/1981 | Japan . |
| 62-263906 | 11/1987 | Japan . |
| 63-195207 | 8/1988 | Japan . |
| 1-167506 | 7/1989 | Japan . |
| 1-195225 | 8/1989 | Japan . |
| 1-268809 | 10/1989 | Japan . |
| 2-263088 | 10/1990 | Japan . |
| 6-88107 | 3/1994 | Japan . |
| 6-264120 | 9/1994 | Japan . |
| 7-76713 | 3/1995 | Japan . |
| 7-228905 | 8/1995 | Japan . |

Primary Examiner—Melvyn Andrews
Attorney, Agent, or Firm—Nields, Lemack & Dingman

[57] ABSTRACT

Disclosed herein is a scrap melting process for the production of molten iron from scrap (as the source of iron) and of high-calorie exhaust gas (as a valuable fuel gas) from pulverized coal (as the principal source of heat and a partial source of high-calorie exhaust gas) and waste plastics (as the principal source of high-calorie exhaust gas and a partial source of heat). The process comprises charging a shaft furnace (equipped with a burner at the tuyere) with scrap (as the iron source) and coke and optional waste plastics from the furnace top and injecting pulverized coal (or pulverized coal plus waste plastics) and oxygen through the burner under specific conditions, so as to mix together pulverized coal (or pulverized coal plus waste plastics) and oxygen, thereby achieving rapid combustion of pulverized coal etc., thereby causing the sensible heat of the combustion gas to melt the scrap and produce molten iron therefrom and recovering the combustion gas as a fuel gas without intentional secondary combustion in the furnace.

49 Claims, 11 Drawing Sheets

SCRAP AND COKE

EXHAUST GAS

RACEWAY

COMBUSTION ZONE

SCRAP MELTING PROCESS

TECHNICAL FIELD

The present invention relates to a scrap melting process designed for the production of molten iron from scrap as well as high-calorie exhaust gas valuable as fuel gas from pulverized coal (serving also as the major heat source) and waste plastics (serving also as the secondary heat source).

BACKGROUND ART

The recent ever-increasing supply of scrap iron and steel has posed an important problem with its recycling for the effective use of resources. This has stimulated the development of a new technology for the efficient, economical production of molten iron from scrap.

It has been common practice to use an electric furnace for the production of molten iron from scrap. This process is uneconomical because of heavy consumption of electric energy.

Another way of producing molten iron (for foundry) is by the cupola process. This process suffers the disadvantage of requiring high-quality foundry lump coke as fuel, which is about four times as expensive as blast furnace coke, and hence is not in general use. The necessity for special foundry coke (which is coarser and less reactive and combustible than blast furnace coke) is due to the fact that combustion to promote the smooth melting of scrap in the cupola furnace should take place such that oxygen in the hot air blown from the tuyere is not rapidly cooled by coke at the raceway but is consumed near the scrap melting zone above the coke bed where the temperature reaches a maximum.

As a substitute for the conventional electric furnace process or cupola process mentioned above, there has been proposed a scrap melting process in "Tetsu-to-Hagane", vol. 79, No. 2, pp.139–146. According to this process, scrap melting is accomplished in a shaft furnace charged with scrap (as an iron source) and blast furnace coke which is burned by oxygen-enriched air (at normal temperature) blown together with pulverized coal through the tuyere. The resulting combustion gas produces sensible heat necessary for scrap melting, and scrap melting is promoted by the secondary combustion of the combustion gas which is induced by air blown through the shaft.

There is another scrap melting process as disclosed in Japanese Patent Laid-open No. 195225/1989. This process resorts to a shaft furnace and a separate combustion furnace in which a large amount of pulverized coal is burned. The resulting hot combustion gas is introduced into the shaft furnace charged with scrap and coke. At the same time, an oxygen-containing gas is supplied for the secondary combustion of the combustion gas which generates sensible heat necessary for scrap melting.

The foregoing two scrap melting processes are likely to be economical because they employ pulverized coal (as part of heat source) and inexpensive blast furnace coke to be charged into the furnace.

However, they are merely intended to save energy by reducing the fuel ratio (below 300 kg/t-pig). This object is achieved by blowing air (or oxygen-containing gas) into the combustion gas resulting from the combustion of pulverized coal so as to bring about the secondary combustion. In other words, their aim is a cost reduction through the reduction of fuel ratio and the use of pulverized coal as part of heat source. In fact, their aim differs from that of operating at a high fuel ratio with a large amount of pulverized coal to be intentionally converted into a large amount of combustion gas (or exhaust gas). They are not designed for operation under such conditions.

In addition, although the above-mentioned scrap melting processes employ pulverized coal as part of heat source for cost reduction, they do not fully achieve this object in view of the fact the fuel ratio is low but the coke ratio is high. It should be noted that the ratio (by weight) of pulverized coal to coke is lower than 1.0 (or 0.9 at the highest).

Another disadvantage of these conventional scrap melting processes is that the exhaust gas inevitably contains a large amount of nitrogen and carbon dioxide because air (as an oxygen-containing gas) is blown to effect the secondary combustion of the combustion gas of pulverized coal for the reduction of fuel ratio and air or oxygen-enriched air is used for the combustion of pulverized coal and the secondary combustion. Although such an exhaust gas is valuable as a fuel gas in its own way, it is not a high-calorie fuel gas suitable for efficient power generation or heating furnaces.

Regarding the calorific value of exhaust gas, the above-cited literature mentions that, by contrast with the cupola process, the proposed process yields a high-calorie exhaust gas that can be effectively utilized as a fuel gas. The fact is that the calorific value of the exhaust gas is only 2000 kcal/Nm$^3$ (or 8400 kJ/Nm$^3$) or so. The same literature gives experimental data obtained in the test run without secondary combustion; however, the present inventors' trial calculations indicate that the calorific value of the exhaust gas is 2300 kcal/Nm$^3$ at the highest. In other words, the exhaust gas obtained in the conventional process is not suitable for heating furnaces and efficient power generation and hence is not so valuable in view of the fact the fuel gas used for heating furnaces and efficient power generation has a calorific value higher than 2500 kcal/Nm$^3$. In addition, the conventional process, which is designed for operation at a low fuel ratio and hence emits a limited amount of exhaust gas with a low calorific value, cannot be a stable supply source for a large amount of high-quality fuel gas.

The second conventional process (proposed in the above-cited Japanese Patent) suffers the disadvantage of requiring a combustion furnace for the combustion of pulverized coal separately from the melting furnace. This leads to a high installation cost. This also poses an economical problem with partial loss of heat which occurs while the hot gas is being introduced from the combustion furnace to the shaft furnace through a gas duct.

An improvement on the above-mentioned cupola process has been proposed which involves blowing oxygen-enriched hot air together with pulverized coal from the tuyere. (Klaus Scheiding: Proceedings of the Eighth Japan-Germany Seminar, Oct. 6, 7, 1993 (Sendai, Japan), p. 22, "Hot Metal Production Based on Scrap, Coal and Oxygen") This improved cupola process suffers the disadvantage of requiring blast furnace coke of large size, which leads to high production cost. Like the above-mentioned prior art technologies, this improved cupola process is not intended to produce fuel gas by supplying a large amount of pulverized coal, nor is it designed for operation under such conditions. Moreover, the fact that it involves the blowing of hot air (which contains nitrogen) suggests the impossibility of producing high-calorie exhaust gas.

As mentioned above, the conventional scrap melting processes proposed so far are basically intended to save energy by the reduction of fuel ratio. Therefore, they merely give rise to an exhaust gas which is limited in calorific value and amount and hence of little economical value. In addition, they need pulverized coal as part of the heat source but the ratio of pulverized coal to coke is not sufficiently high because of incapability of efficient combustion of pulverized coal. This means that they do not make best use of pulverized coal for cost reduction.

In the meantime, the ever-increasing waste plastics as industrial waste and municipal waste has recently posed a serious problem with their disposal. Waste plastics (of polymeric hydrocarbons) are disposed of mostly by dumping on a reclaimed land because they cannot be disposed of by combustion. (They generate so much heat as to damage the incinerator during combustion.) Dumping of waste plastics is not desirable from the environmental point of view. Thus there is a demand for the development of a method for disposing of a large amount of waste plastics.

The problem with waste disposal is involved also in the steel industry. That is, the so-called integrated steel mill emits a large amount of dust, including blast furnace dust, converter dust, electric furnace dust, cupola dust, mill scale, shredder dust, and zinc dust. They contain zinc in comparatively high concentrations (1–2% for blast furnace dust and about 20% for cupola dust), and hence they cannot be disposed of by dumping on a reclaimed land for environmental protection. Thus there is a demand for the development of a process for their disposal.

A process for disposing of zinc-containing dust has been proposed in Japanese Patent Laid-open Nos. 25221/1978 and 125211/1980. This process consists of pelletizing zinc-containing dust, charging the pellets into a shaft furnace, reducing and evaporating zinc in the furnace, oxidizing zinc in the waste gas, and collecting the resulting zinc oxide. There is another process proposed in Japanese Patent Laid-open No. 263088/1990. According to this process, metal-containing powder (such as zinc dust emitted from a cupola) is repeatedly introduced into the cupola through the tuyere so that zinc in the dust is concentrated.

The first process mentioned above is not suitable costwise for disposal of a large amount of dust because of its necessity for pelletizing zinc-containing dust.

In addition, both the first and second processes mentioned above suffer the disadvantage that zinc vapor in the furnace condenses on the furnace wall before it reaches the furnace top, thereby causing the refractories to peel off. Such condensation occurs because the temperature at the top of a blast furnace or cupola is about 200–250° C. and the temperature of the shaft is about 400–800° C. at which zinc vapor condenses in the furnace.

The scrap melting process also involves a problem of avoiding the accumulation of zinc in the furnace and recovering zinc adequately because scrap (as the major raw material used for the scrap melting process) contains a large amount of zinc in the form of galvanized steel sheet and this zinc has an adverse effect on the refractories as mentioned above (after accumulation in the furnace) and deposits on the inner wall of the exhaust gas duct after discharge together with exhaust gas from the furnace.

The conventional scrap melting process mentioned above is not given any special attention for the disposal of zinc.

It is an object of the present invention to provide a scrap melting process of entirely new type, which, in contrast with the conventional one, is capable of melting scrap and producing molten iron more efficiently. In addition, it offers the following advantages.

Ability to produce a large amount of high-calorie exhaust gas valuable as fuel gas.

More economical operation than the conventional process owing to the utilization of high-calorie exhaust gas.

Ability to produce the high-calorie exhaust gas and/or heat partly from waste plastics. (This permits mass disposal and effective use of waste plastics.)

It is another object of the present invention to provide a new scrap melting process which permits the mass disposal and effective unitization of dust discharged from steel mills and also permits the recovery of zinc (in highly concentrated form) from scrap and dust without it accumulating in the furnace.

DISCLOSURE OF THE INVENTION

The present inventors found that the production of molten iron from scrap and the economical production of high-calorie exhaust gas are accomplished by operation with a high fuel ratio and high pulverized coal ratio (due to injection of a large amount of pulverized coal) under the following three special conditions.

(1) For combustion, pulverized coal and oxygen are injected together from the burner at the tuyere.

(2) The injection of pulverized coal and oxygen is accomplished in a special manner that ensures rapid combustion through sufficient mixing. The combustion of pulverized coal should preferably take place mostly in the burner without being affected by the furnace state. This is essential for the stable and efficient combustion of pulverized coal.

(3) The combustion gas of pulverized coal is kept from secondary combustion intentionally.

The present inventors also investigated the charging into the furnace of waste plastics as a source of heat for scrap melting and as a partial source of high-calorie exhaust gas. As the result, it was found that the scrap melting under the above-mentioned three conditions can be accomplished by injecting waste plastics together with pulverized coal through the burner and/or by charging waste plastics from the furnace top. In this way it is possible to efficiently pyrolyze waste plastics for conversion into fuel gas and to effectively utilize waste plastics as a source for heat and/or high-calorie exhaust gas, thereby disposing of a large amount waste plastics. In addition, the scrap melting process performed as mentioned above avoids the problems that would arise from charging waste plastics into the furnace. (Waste plastics usually contain about 20% polyvinyl chloride, which emits hydrochloric acid gas upon combustion, and waste plastics give rise to tarlike substances upon combustion which clog the exhaust gas duct.) Without such problems, the scrap melting process makes it possible to charge a large amount of waste plastics for disposal and for use as a source of high-calorie exhaust gas and/or a partial source of heat.

The present inventors also found that the scrap melting process can be run without any problem even when a large amount of dust is injected through the tuyere. In this case, dust as such can be used as a source of iron, heat, or flux. Zinc-containing dust recovered from the furnace exhaust gas may be fed into the furnace through the tuyere, with the furnace top temperature kept constant. By repeating this process it is possible to extract zinc from scrap and dust and recover it in its concentrated form in the dust without zinc depositing on the inner wall of the furnace.

These findings led to the present invention which has the following features.

The present invention covers a scrap melting process which is practiced by using a shaft furnace equipped with a burner at the tuyere. Scrap melting is accomplished by charging the shaft furnace with scrap (as an iron source) and coke through the furnace top and supplying the furnace with pulverized coal (along with waste plastics) and oxygen through the burner at the tuyere. The invention may assume a variety of embodiments depending on the method of supplying the furnace with pulverized coal and oxygen through the tuyere as explained below. (In the case where pulverized coal and waste plastics are used in combination, they are collectively called pulverized coal etc. in the following explanation.)

(A) Injection of pulverized coal etc. and oxygen into the furnace through the burner at the tuyere involves injection of pulverized coal etc. from the center (or the vicinity thereof) of the burner and injection of oxygen from its periphery. This mode of injection is designed to mix pulverized coal etc. with oxygen, thereby achieving rapid combustion of pulverized coal etc. in the combustion zone that forms in front of the tuyere.

(B) Injection of pulverized coal etc. and oxygen into the furnace through the burner at the tuyere involves injection of oxygen from the center (or the vicinity thereof) of the burner, injection of pulverized coal etc. from its periphery, and additional injection of oxygen from its periphery. This mode of injection is designed to mix pulverized coal etc. with oxygen, thereby achieving rapid combustion of pulverized coal etc. in the combustion zone that forms in front of the tuyere.

(C) In the case where the burner at the tuyere has a pre-combustion chamber in its forward opening, injection of pulverized coal etc. and oxygen into the furnace through the burner involves injection of pulverized coal etc. into the pre-combustion chamber from the center (or the vicinity thereof) of the burner and injection of oxygen from its periphery. This mode of injection is designed to mix pulverized coal etc. with oxygen, thereby achieving rapid combustion of pulverized coal etc. in the pre-combustion chamber and introducing the combustion gas into the furnace from the forward opening of the burner.

(D) In the case where the burner at the tuyere has a pre-combustion chamber in its forward opening, injection of pulverized coal etc. and oxygen into the furnace through the burner involves injection of oxygen into the pre-combustion chamber from the center (or the vicinity thereof) of the burner, injection of pulverized coal etc. from its periphery, and additional injection of oxygen from its periphery. This mode of injection is designed to mix pulverized coal etc. with oxygen, thereby achieving rapid combustion of pulverized coal etc. in the combustion zone that forms at the tuyere.

Charging of waste plastics into the furnace may be accomplished by any of the following embodiments.

(1) Charging from the top of the furnace.

(2) Injecting from the burner at the tuyere (as in the case of pulverized coal).

(3) Injecting into the pre-combustion chamber (as in the case of pulverized coal) or charging into the pre-combustion chamber from voluntary inlet port in the case where the burner has a pre-combustion chamber as mentioned in (C) and (D).

Thus, the present invention may greatly vary in its embodiment depending on the combination of (A) to (D) (regarding the method of injecting pulverized coal etc. and oxygen) and (1) to (3) (regarding the method of charging or injecting waste plastics).

In the case where the present invention also involves the disposal of dust, dust is injected into the furnace through the burner (which may have a pre-combustion chamber) and/or any other injection means at the tuyere. Therefore, the embodiments of the present invention may be varied further as the injection of dust is added to the above-mentioned combination of (A) to (D) and (1) to (3).

The following are the fundamental embodiments of the present invention.

(1) A scrap melting process which comprises charging a shaft furnace with scrap (as an iron source) and coke, and injecting pulverized coal, waste plastics (in the form of powder, granule, or chips), and oxygen into the furnace through a burner at the tuyere, with injection of pulverized coal and waste plastics from the center (or the vicinity thereof) of the burner and injection of oxygen from its periphery, so as to mix together pulverized coal, waste plastics, and oxygen, thereby achieving rapid combustion of pulverized coal and at least part of waste plastics in the combustion zone that forms in front of the tuyere, thereby causing the sensible heat of the combustion gas to melt the scrap and produce molten iron therefrom and recovering the combustion gas as a fuel gas without intentional secondary combustion in the furnace.

(2) A scrap melting process which comprises charging a shaft furnace with scrap (as an iron source) and coke, and injecting pulverized coal, waste plastics (in the form of powder, granule, or chips), and oxygen into the furnace through a burner at the tuyere, with injection of oxygen from the center (or the vicinity thereof) of the burner, injection of pulverized coal and waste plastics from its periphery, and additional injection of oxygen from its periphery, so as to mix together pulverized coal, waste plastics, and oxygen, thereby achieving rapid combustion of pulverized coal and at least part of waste plastics in the combustion zone that forms in front of the tuyere, thereby causing the sensible heat of the combustion gas to melt the scrap and produce molten iron therefrom and recovering the combustion gas as a fuel gas without intentional secondary combustion in the furnace.

(3) A scrap melting process that employs a shaft furnace equipped at its tuyere with a burner having a pre-combustion chamber in its forward opening, said process comprising charging the shaft furnace with scrap (as an iron source) and coke, and injecting pulverized coal and oxygen into the pre-combustion chamber of the burner and also injecting or charging waste plastics (in the form of powder, granule, chips, or lumps), with injection of at least pulverized coal from the center (or the vicinity thereof) of the burner and injection of oxygen from its periphery, so as to mix together pulverized coal and oxygen, thereby achieving rapid combustion of pulverized coal and at least part of waste plastics in the pre-combustion chamber, leading the combustion gas from the forward opening of the burner into the furnace, thereby causing the sensible heat of the combustion gas to melt the scrap and produce molten iron therefrom and recovering the combustion gas as a fuel gas without intentional secondary combustion in the furnace.

(4) A scrap melting process that employs a shaft furnace equipped at its tuyere with a burner having a pre-combustion chamber in its forward opening, said process comprising charging the shaft furnace with scrap (as an iron source) and coke, and injecting pulverized coal and oxygen into the pre-combustion chamber of the burner and also injecting or charging waste plastics (in the form of powder, granule, chips, or lumps), with injection of oxygen from the center (or the vicinity thereof) of the burner, injection of at least pulverized coal from its periphery, and additional injection of oxygen from its periphery, so as to mix together pulverized coal and oxygen, thereby achieving rapid combustion of pulverized coal and at least part of waste plastics in the pre-combustion chamber, leading the combustion gas from the forward opening of the burner into the furnace, thereby causing the sensible heat of the combustion gas to melt the scrap and produce molten iron therefrom and recovering the combustion gas as a fuel gas without intentional secondary combustion in the furnace.

(5) A scrap melting process which comprises charging a shaft furnace with scrap (as an iron source), coke, and waste plastics from the furnace top, and injecting pulverized coal and oxygen into the furnace through a burner at the tuyere, with injection of pulverized coal from the center (or the vicinity thereof) of the burner and injection of oxygen from its periphery, so as to mix together pulverized coal and oxygen, thereby achieving rapid combustion of pulverized coal in the combustion zone that forms in front of the tuyere, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

(6) A scrap melting process which comprises charging a shaft furnace with scrap (as an iron source), coke, and waste plastics from the furnace top, and injecting pulverized coal and oxygen into the furnace through a burner at the tuyere, with injection of oxygen from the center (or the vicinity thereof) of the burner, injection of pulverized coal from its periphery, and additional injection of oxygen from its periphery, so as to mix together pulverized coal and oxygen, thereby achieving rapid combustion of pulverized coal in the combustion zone that forms in front of the tuyere, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

(7) A scrap melting process which comprises charging a shaft furnace with scrap (as an iron source), coke, and waste plastics from the furnace top, and injecting pulverized coal, waste plastics (in the form of powder, granule, or chips), and oxygen into the furnace through a burner at the tuyere, with injection of pulverized coal and waste plastics from the center (or the vicinity thereof) of the burner and injection of oxygen from its periphery, so as to mix together pulverized coal, waste plastics, and oxygen, thereby achieving rapid combustion of pulverized coal and at least part of waste plastics in the combustion zone that forms in front of the tuyere, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

(8) A scrap melting process which comprises charging a shaft furnace with scrap (as an iron source), coke, and waste plastics from the furnace top, and injecting pulverized coal, waste plastics (in the form of powder, granule, or chips), and oxygen into the furnace through a burner at the tuyere, with injection of oxygen from the center (or the vicinity thereof) of the burner, injection of pulverized coal and waste plastics from its periphery, and additional injection of oxygen from its periphery, so as to mix together pulverized coal, waste plastics, and oxygen, thereby achieving rapid combustion of pulverized coal and at least part of waste plastics in the combustion zone that forms in front of the tuyere, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

(9) A scrap melting process that employs a shaft furnace equipped at its tuyere with a burner having a pre-combustion chamber in its forward opening, said process comprising charging the shaft furnace with scrap (as an iron source), coke, and waste plastics from the furnace top, and injecting pulverized coal and oxygen into the pre-combustion chamber of the burner, with injection of pulverized coal from the center (or the vicinity thereof) of the burner and injection of oxygen from its periphery, so as to mix together pulverized coal and oxygen, thereby achieving rapid combustion of pulverized coal in the pre-combustion chamber, leading the combustion gas from the forward opening of the burner into the furnace, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

(10) A scrap melting process that employs a shaft furnace equipped at its tuyere with a burner having a pre-combustion chamber in its forward opening, said process comprising charging the shaft furnace with scrap (as an iron source), coke, and waste plastics from the furnace top, and injecting pulverized coal and oxygen into the pre-combustion chamber of the burner, with injection of oxygen from the center (or the vicinity thereof) of the burner, injection of pulverized coal from its periphery, and additional injection of oxygen from its periphery, so as to mix together pulverized coal and oxygen, thereby achieving rapid combustion of pulverized coal in the pre-combustion chamber, leading the combustion gas from the forward opening of the burner into the furnace, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

(11) A scrap melting process that employs a shaft furnace equipped at its tuyere with a burner having a pre-combustion chamber in its forward opening, said process comprising charging the shaft furnace with scrap (as an iron source), coke, and waste plastics from the furnace top, and injecting pulverized coal and oxygen into the pre-combustion chamber of the burner and injecting or charging waste plastics (in the form of powder, granule, chips, or lumps) into the pre-combustion chamber of the burner, with injection of at least part of pulverized coal from the center (or the vicinity thereof) of the burner and injection of oxygen from its periphery, so as to mix together pulverized coal and oxygen, thereby achieving rapid combustion of pulverized coal in the pre-combustion chamber, leading the combustion gas from the forward opening of the burner into the furnace, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

(12) A scrap melting process that employs a shaft furnace equipped at its tuyere with a burner having a pre-combustion chamber in its forward opening, said process comprising charging the shaft furnace with scrap (as an iron source), coke, and waste plastics from the furnace top, and injecting pulverized coal and oxygen into the pre-combustion chamber of the burner and injecting or charging waste plastics (in the form of powder, granule, chips, or lumps) into the pre-combustion chamber of the burner, with injection of oxygen from the center (or the vicinity thereof) of the burner, injection of at least part of pulverized coal from its periphery, and additional injection of oxygen from its periphery, so as to mix together pulverized coal and oxygen, thereby achieving rapid combustion of pulverized coal and at least part of waste plastics in the pre-combustion chamber, leading the combustion gas from the forward opening of the burner into the furnace, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

In the scrap melting process defined in any of (1) to (4), (7), (8), (11), and (12) above, injection of waste plastics from the burner or injection or charging of waste plastics into the pre-combustion chamber may be carried out discontinuously or intermittently, and injection or charging of waste plastics may be carried out simultaneously with injection of pulverized coal or while stopping injection of pulverized coal temporarily. In other words, the process of the present invention involves these modes of injection or charging of waste plastics from the burner.

In the scrap melting process defined in any of (5) to (12) above, the furnace top temperature should preferably be kept at 400–600° C.

Especially in the scrap melting process defined in (3) and (11) above, it is desirable to inject waste plastics (in the form of powder, granule, or chips) into the pre-combustion chamber from the center (or the vicinity thereof) of the burner for efficient combustion of waste plastics. Also, in the scrap melting process defined in (4) and (12) above, it is desirable to inject waste plastics (in the form of powder, granule, or chips) into the pre-combustion chamber from the periphery of oxygen being injected from the center (or the vicinity thereof) of the burner for efficient combustion of waste plastics.

The process of the present invention permits the use of blast furnace coke as coke to be charged into the shaft furnace. Since the process of the present invention is designed for injection and efficient combustion of a large amount of pulverized coal alone or in combination with waste plastics, it is desirable to feed a specified amount of oxygen relative to the amount of pulverized coal supplied from the burner. In the case where pulverized coal alone is supplied from the burner, the amount of oxygen should be such that the ratio $PC/O_2$ is higher than 0.7 kg/Nm², where PC denotes the pulverized coal ratio (kg/t-pig) and $O_2$ denote the flow rate of oxygen (Nm³/t-pig). In the case where both pulverized coal and waste plastics are supplied from the burner, the amount of oxygen should be such that the ratio $(PC+SR)/O_2$ is higher than 0.7 kg/Nm³, where SR denotes the waste plastics ratio (kg/t-pig).

The process of the present invention should preferably be carried out under the following conditions.

The fuel ratio is higher than 300 kg/t-pig.

In the case where pulverized coal alone is supplied from the burner, the ratio of the pulverized coal ratio (kg/t-pig) to the top-charged coke ratio (kg/t-pig) is higher than 1.0.

In the case where both pulverized coal and waste plastics are supplied from the burner, the ratio of the sum of the pulverized coal ratio (kg/t-pig) and the waste plastics ratio (kg/t-pig) to the top-charged coke ratio (kg/t-pig) is higher than 1.0.

Operation under such conditions permits efficient scrap melting and stable production and supply of a large amount of high-calorie exhaust gas.

In the scrap melting process defined in any of (1), (5), and (7) above, injection of oxygen from the periphery of the injection means for pulverized coal alone or together with waste plastics (referred to as the solid fuel injector hereinafter) may be carried out such that oxygen is injected from the oxygen injector which encircles the periphery of the solid fuel injector, or oxygen is injected from a plurality of oxygen injector which are arranged at adequate intervals around the solid fuel injector. The position of the solid fuel injector may be slightly shifted from the center of the burner. What is required is that pulverized coal (alone or together with waste plastics) is injected from the center (or the vicinity thereof) of the burner and oxygen is injected from its periphery.

In the scrap melting process defined in any of (2), (6), and (8) above, injection of pulverized coal alone or together with waste plastics from the periphery of oxygen injected from the center (or the vicinity thereof) of the burner may be carried out such that pulverized coal alone or together with waste plastics is injected from the solid fuel injector that encircles the periphery of the oxygen injector, or pulverized coal alone or together with waste plastics is injected from a plurality of solid fuel injector arranged at adequate intervals around the oxygen injector. Also, injection of oxygen from the periphery of the solid fuel injector may be carried out such that oxygen is injected from the oxygen injector that encircles the solid fuel injector, or oxygen is injected from a plurality of oxygen injectors which are arranged at adequate intervals around the solid fuel injector. The position of the oxygen injector (or the position of the oxygen injector in the solid fuel injector) may be slightly shifted from the center of the burner. What is required is that oxygen is injected from the center (or the vicinity thereof) of the burner and pulverized coal alone or together with waste plastics is injected from its periphery.

In the scrap melting process defined in any of (3), (9), and (11) above, injection of oxygen from the periphery of the solid fuel injector in the pre-combustion chamber of the burner may be carried out such that oxygen is injected from the oxygen injector that encircles the solid fuel injector, or oxygen is injected from a plurality of oxygen injectors which are arranged at adequate intervals around the solid fuel injector. In addition, the position of the solid fuel injector may be slightly shifted from the center of the burner. What is required is that pulverized coal alone or together with waste plastics is injected from the center (or the vicinity thereof) of the burner and oxygen is injected from its periphery.

In the scrap melting process defined in any of (4), (10), and (12) above, injection of pulverized coal alone or together with waste plastics from the periphery of oxygen to be injected into the pre-combustion chamber in the burner from the center (or the vicinity thereof) of the burner may be carried out such that pulverized coal alone or together with waste plastics is injected from the solid fuel injector that encircles the oxygen injector, or pulverized coal alone or together with waste plastics is injected from a plurality of solid fuel injectors which are arranged at adequate intervals around the oxygen injector. Also, injection of oxygen from the periphery of the solid fuel injector may be carried out such that oxygen is injected from the oxygen injector that encircles the solid fuel injectors or oxygen is injected from a plurality of oxygen injectors which are arranged at adequate intervals around the solid fuel injector. In addition, the position of the oxygen injector (or the position of the oxygen injector inside the solid fuel injector) may be slightly shifted from the center of the burner. What is required is that oxygen is injected from the center (or the vicinity thereof) of the burner and pulverized coal alone or together with waste plastics is injected from its periphery.

In the scrap melting process defined in any of (1) to (4), (7), (8), (11), and (12) above, pulverized coal and waste plastics may be injected from separate injection holes of the burner.

Pulverized coal to be injected is not specifically restricted in grain size; however, the one containing more than 80% particles smaller than 74 $\mu$m in size is desirable.

Waste plastics (in the form of powder, granule, or chips) to be injected includes those which are obtained by crushing bulky (and platy) plastics, by crushing filmy plastics into small pieces, by melting or half-melting plastics and processing the melt into granules by crushing or cutting, or by half-melting plastics and quenching the melt, thereby giving solidified powder or granules. Waste plastics are not specifically restricted in grain size, and comparatively coarse ones are acceptable. However, the one having a particle diameter smaller than 10 mm, particularly smaller than 6 mm, is desirable. In the scrap melting process defined in any of (3), (4), (11), and (12) above, good combustion of waste plastics is achieved owing to the burner equipped with the pre-combustion chamber. Therefore, it is possible to charge bulky waste plastics into the pre-combustion chamber of the burner.

In the scrap melting process defined in any of (1) to (12), it is possible to inject dust into the furnace through the burner and/or any other injection means at the tuyere.

Examples of dust include blast furnace dust, converter dust, electric furnace dust, cupola dust, mill scale, shredder dust, zinc dust, and dust recovered from exhaust gas from the furnace. They may be used alone or in combination with one another. It is desirable that the furnace top temperature be kept at 400–800° C. and that at least part of dust to be injected into the furnace be zinc-containing dust recovered from the exhaust gas from the furnace.

Injection of dust into the furnace may be accomplished discontinuously or intermittently.

The present invention does not preclude charging the furnace with scrap along with any other iron source and any other materials.

BEST MODE FOR CARRYING OUT THE INVENTION

The scrap melting process of the present invention is designed to positively produce high-calorie exhaust gas in consequence of scrap melting. This object is achieved by supplying a large amount of pulverized coal alone or together with waste plastics (for a high fuel ratio) relative to the amount of coke. Their efficient combustion with a minimum amount of low-calorie components in the exhaust gas is accomplished by injecting pulverized coal (or pulverized coal plus waste plastics) together with oxygen (substantially pure oxygen) through the burner at the tuyere in such a manner that pulverized coal (or pulverized coal plus waste plastics) and oxygen rapidly mix together to give combustion gas for stable combustion, and by discharging the combustion gas (which contains pyrolysis gas originating from part of waste plastics if waste plastics is used) without intentional secondary combustion in the furnace. In this way it is possible to melt scrap and recover high-calorie exhaust gas at a low cost.

Moreover, waste plastics as part of the source of high-calorie exhaust gas is charged from the furnace top, and the resulting pyrolysis gas is recovered together with the combustion gas of pulverized coal etc. In this way it is possible to increase the calorific value of exhaust gas.

Charging waste plastics as part of the heat source and also as part of the source of high-calorie exhaust gas into the furnace permits the disposal and effective use of a large amount of waste plastics and leads to the saving of pulverized coal and the cost reduction of scrap melting.

The scrap melting process also includes charging one or more than one kind of dust as an iron source, heat source, or secondary raw material from the tuyere for the disposal and effective use of a large amount of dust. In addition, the scrap melting process includes recovering zinc-containing dust from the furnace exhaust gas and charging it into the furnace for recycling as at least part of dust to be injected from the tuyere. This extracts zinc from scrap and dust and causes extracted zinc to be concentrated in the recovered dust. Thus it is possible to recover zinc in the form of zinc-rich dust.

In what follows, the invention will be described in more detail with reference to the accompanying drawings.

Figure 1:
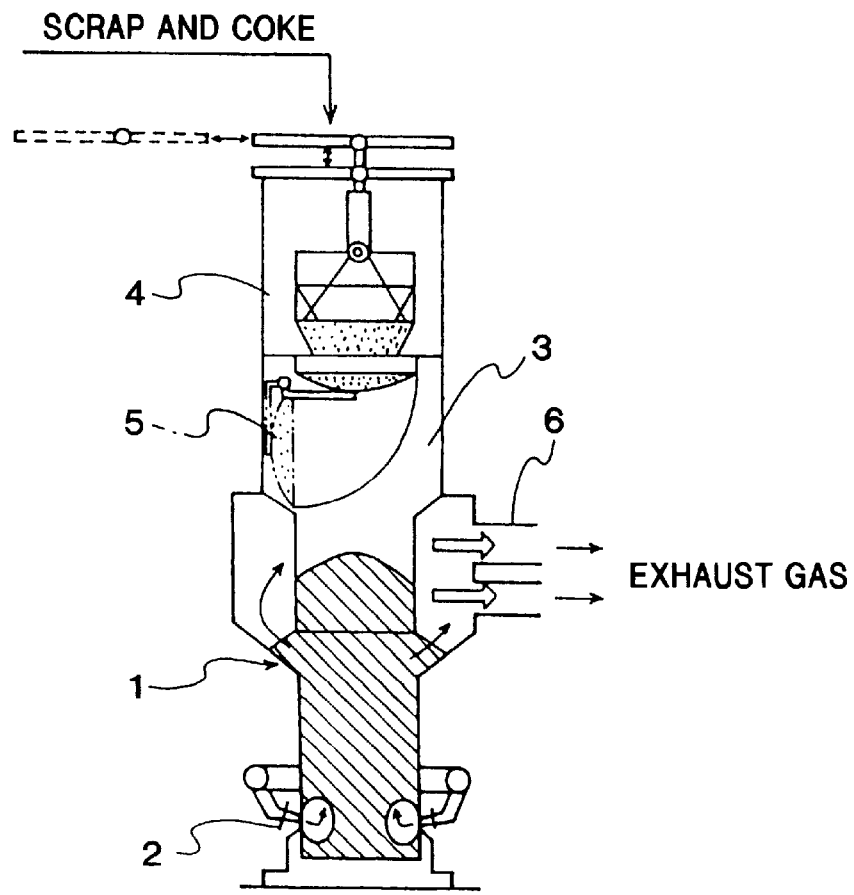
FIG. 1 is a schematic diagram showing an example of the shaft furnace used in practicing the scrap melting process according to the present invention.

FIG. 1 is a schematic diagram showing an example of the shaft furnace used for the scrap melting process of the present invention. There are shown a shaft furnace proper 1, a tuyere 2, and a furnace top 3. Above the furnace top 3 of the shaft furnace 1 is installed a raw material charger 4, which is isolated from the furnace by a closer 5. There is shown a duct 6 for the recovery of hot furnace top gas.

The shaft furnace 1 is charged with scrap (as an iron source) and coke through the raw material charger 4 at the top 3 of the shaft furnace 1. The shaft furnace 1 is also supplied with pulverized coal and oxygen through the burner at the tuyere 2. The coke to be charged from the furnace top is ordinary blast furnace coke having a grain size of 20–80 mm. The charged coke holds scrap charged into the furnace and also functions as part of heat source for scrap melting. In the present invention, however, pulverized coal (or pulverized coal plus waste plastics) injected from the tuyere plays a more important role as the heat source.

Waste plastics is charged into the furnace from the tuyere 2 or the furnace top 3 or both. The one charged from the tuyere functions as the source of heat and high-calorie gas, and the one charged from the furnace top 3 functions mainly as the source of high-calorie gas.

The waste plastics to be charged through the burner at the tuyere is usually in the form of powder, granule, or chips for good combustibility. By contrast, the one to be charged from the furnace top may be in any form.

Figure 2:
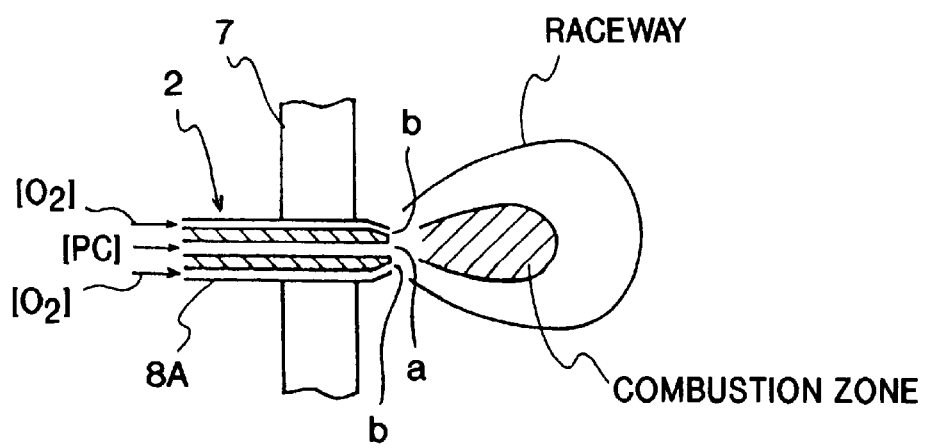
FIG. 2 is a schematic diagram showing one structure (in section) of the tuyere of the shaft furnace and the method of injecting pulverized coal and oxygen according to the present invention.

FIG. 2 shows how pulverized coal and oxygen are injected into the furnace through the burner 8A at the tuyere 2 that penetrates the furnace wall 7. In the case where pulverized coal and oxygen are injected from the tuyere, waste plastics is charged from the furnace top 3.

The burner 8A at the tuyere 2 shown in FIG. 2 is constructed such that pulverized coal [PC] is injected into the furnace through the solid fuel injector a at the center (or the vicinity thereof) of the burner and oxygen [$O_2$] (which may be cold oxygen) is injected into the furnace through the oxygen injector b which encircles the solid fuel injector a. The result of injection in this way is that pulverized coal [PC] being injected into the furnace is enclosed by oxygen [$O_2$] and pulverized coal mixes sufficiently with oxygen and burns rapidly to form the combustion zone and raceway at the tuyere. In other words, pulverized coal turns into combustion gas efficiently even when its amount is high relative to the unit amount of oxygen (or even when the PC/$O_2$ ratio is high). Incidentally, a small amount of nitrogen is used to convey pulverized coal [PC].

Figure 3:
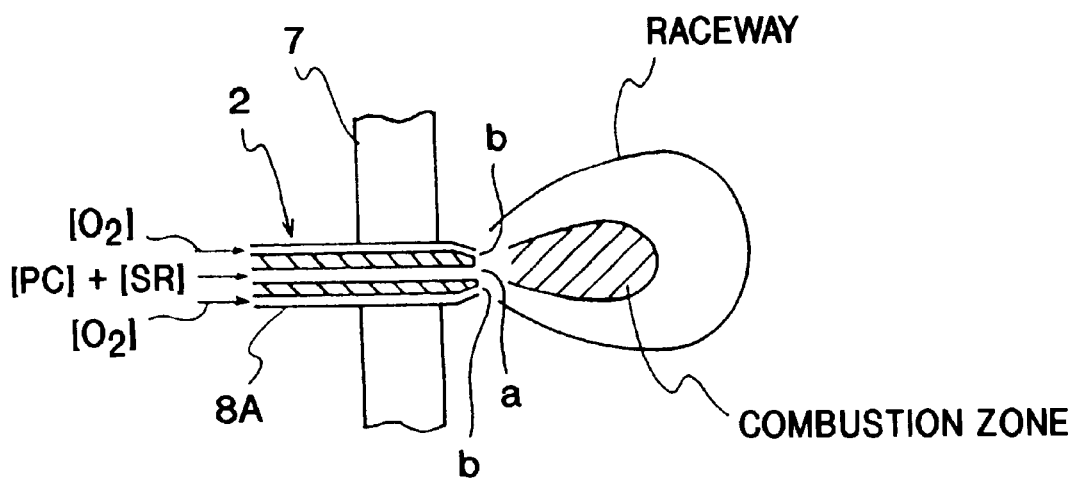
FIG. 3 is a schematic diagram showing another structure (in section) of the tuyere of the shaft furnace and the method of injecting pulverized coal, waste plastics and oxygen according to the present invention.

FIG. 3 shows how pulverized coal plus waste plastics and oxygen are injected into the furnace through the burner at the tuyere 2.

The burner 8A at the tuyere 2 shown in FIG. 3 is constructed such that pulverized coal [PC] and waste plastics [SR] (in the form of powder, granule, or chips) are injected into the furnace through the solid fuel injector a at the center (or the vicinity thereof) of the burner and oxygen [$O_2$] (or cold oxygen) is injected into the furnace through the oxygen injector b which encircles the solid fuel injector a. The result of injection in this way is that pulverized coal [PC] and waste plastics being injected into the furnace are enclosed by oxygen [$O_2$] and pulverized coal and waste plastics mix sufficiently with oxygen and pulverized coal and at least part of waste plastics burn rapidly to form the combustion zone and raceway at the tuyere. In other words, pulverized coal and waste plastics turn into combustion gas efficiently even when their amount is high relative to the unit amount of oxygen (or even when the ratio (PC+SR)/$O_2$ is high). Incidentally, a small amount of nitrogen is used to convey pulverized coal [PC] and waste plastics [SR].

Figure 22:
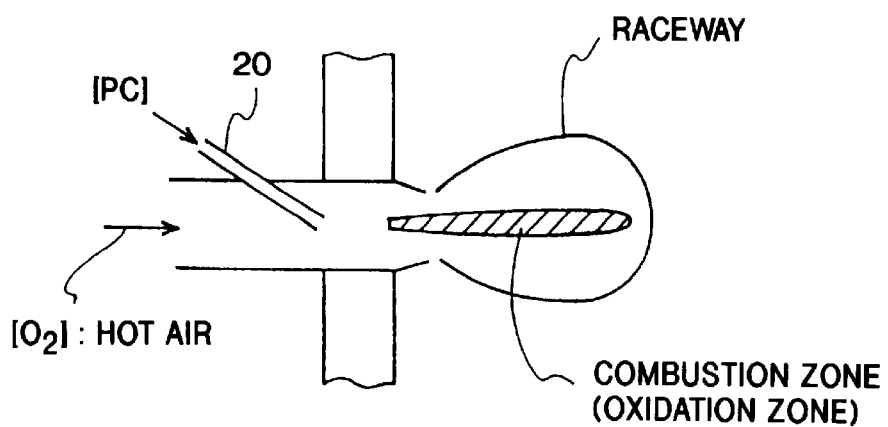
FIG. 22 is a schematic diagram showing the structure of the tuyere used in the prior art technology.

By contrast with the injection method in the present invention as shown in FIGS. 2 and 3, the known method as shown in FIG. 22, which employs a lance to inject pulverized coal (or pulverized coal plus waste plastics) or hot air or oxygen-enriched air in place of oxygen, suffers the disadvantage that pulverized coal and waste plastics do not hence it is impossible to inject a large amount of pulverized coal and waste plastics (at a high pulverized coal ratio).

The pulverized coal (or pulverized coal plus waste plastics) injected together with oxygen burns rapidly to form the combustion zone (at about 2000° C.) near the tuyere and generate heat for scrap melting. The resulting molten iron is discharged from the furnace. The rapid combustion of pulverized coal (or pulverized coal plus waste plastics) forms a reducing combustion gas, which melts and preheats scrap and rises through the furnace to be discharged from the furnace top. According to the present invention, the combustion gas is discharged from the furnace without intentional secondary combustion. In other words, unlike the conventional technology, neither air nor oxygen-enriched air is fed to the shaft to permit the combustion gas to undergo secondary combustion.

Being inferior to pulverized coal in combustibility, most waste plastics does not burn completely in the combustion zone; however, unburned waste plastics gasifies rapidly through pyrolysis in the furnace and the resulting high-calorie gas is discharged together with the above-mentioned combustion gas from the furnace top for recovery as a fuel gas.

Incidentally, injection of waste plastics from the solid fuel injector a may be carried out continuously, discontinuously, or intermittently, and waste plastics may be injected together with pulverized coal or in place of pulverized coal temporarily. This applies to the method shown in FIGS. 4, 10, and 11, mentioned later.

On the other hand, in the case where waste plastics is charged from the furnace top 3, the charged waste plastics mostly gasifies through pyrolysis at the furnace top by the heat of the combustion gas, and a high-calorie gas is formed. This high-calorie gas is discharged together with the above-mentioned combustion gas from the furnace and recovered for use as a fuel gas.

If a comparatively large amount of waste plastics is charged from the furnace top, some problems arise as follows.

Excess waste plastics decomposes to form a tarlike substance which sticks to the exhaust gas duct to cause clogging.

Excess waste plastics partly remains unpyrolyzed at the furnace top to prevent the exhaust gas from becoming a high-calorie gas.

Excess waste plastics fuses in the bed coke to greatly hinder the gas flow in the furnace.

Excess waste plastics becomes mist which, when discharged from the furnace, condenses in the duct to cause clogging.

Figure 17:
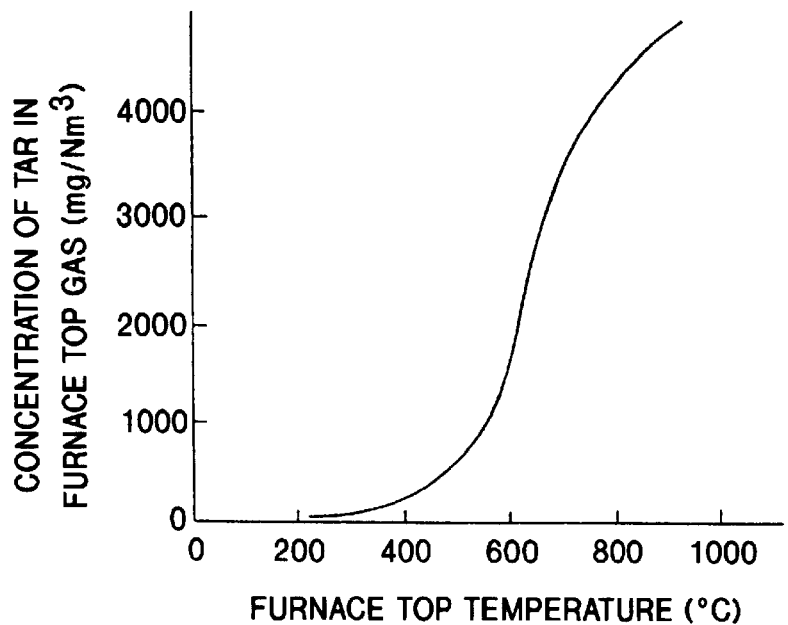
FIG. 17 is a graph showing the relation between the furnace top temperature and the tar concentration in the furnace top gas in the present invention.

In order to avoid these problems, it is desirable to keep the furnace top temperature at 400–600° C. With a furnace top temperature lower than 400° C., the pyrolysis of waste plastics does not proceed rapidly and smoothly at the furnace top, and this poses the above-mentioned problems. With a furnace top temperature higher than 600° C., waste plastics considerably gives rise to tarlike substance that clogs the exhaust gas duct. FIG. 17 shows the relation between the furnace top temperature and the tar concentration in the furnace top gas. It is noted that the tar concentration in the furnace top gas is low if the furnace top temperature is lower than 600° C.

By keeping the furnace top temperature at 400–600° C., it is possible to pyrolyze waste plastics rapidly and smoothly at the furnace top and to produce a high-calorie gas composed mainly of gaseous lower hydrocarbons.

According to the present invention, it is possible to obtain a high-calorie exhaust gas (higher than 2700 kcal/Nm$^3$) containing high-calorie components (such as CO, H$_2$, and lower hydrocarbons) in high concentrations and containing a very small amount of CO$_2$ and N$_2$, owing to the following.

The gas injected for combustion from the tuyere is oxygen (substantially pure oxygen).

A large amount of pulverized coal relative to the unit amount of oxygen can be gasified efficiently.

Waste plastics charged from the furnace top gives rise to a high-calorie gas through pyrolysis.

Waste plastics injected together with pulverized coal gives rise to a high-calorie gas through combustion or pyrolysis.

The combustion gas is kept from secondary combustion as mentioned above.

According to the present invention, pulverized coal (or pulverized coal plus waste plastics) burns very efficiently.

This permits stable operation despite the high PC/O$_2$ ratio or (PC+SR)/O$_2$ ratio above 0.7 kg/Nm$^3$, preferably above 1.0 kg/Nm$^3$, and also permits the injection of pulverized coal (or pulverized coal plus waste plastics) in an amount up to PC/O$_2$=1.4 kg/Nm$^3$ or (PC+SR)/O$_2$=1.4 kg/Nm$^3$, which is nearly a stoichiometric limit for their combustion.

Therefore, it is possible to efficiently burn a large amount of pulverized coal (or pulverized coal plus waste plastics), thereby to obtain a large amount of high-calorie exhaust gas. It is also possible to run while keeping the coke ratio low relative to the pulverized coal ratio (or pulverized coal ratio plus waste plastics ratio).

Figure 4:
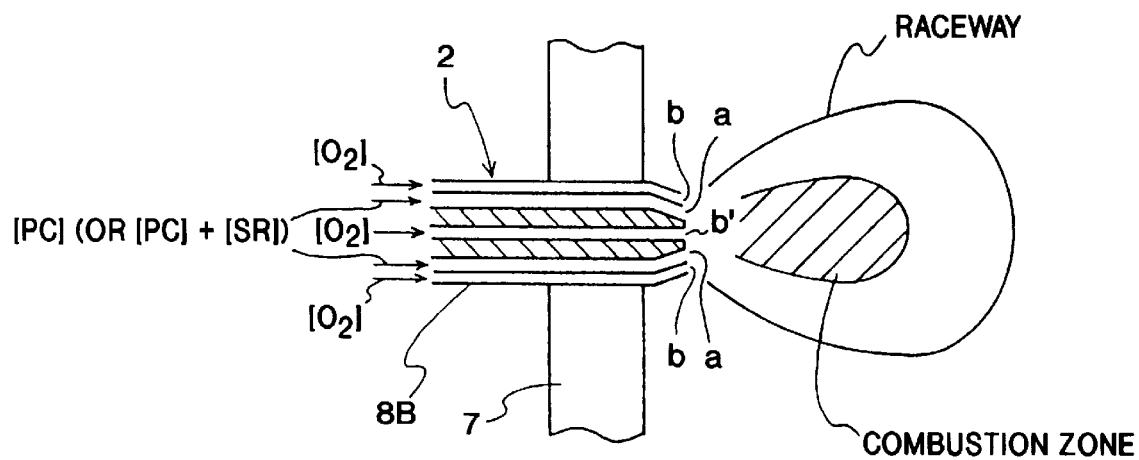
FIG. 4 is a schematic diagram showing another structure (in section) of the tuyere of the shaft furnace and the method of injecting pulverized coal etc. and oxygen according to the present invention.

FIG. 4 is a schematic diagram showing another method of injecting pulverized coal (or pulverized coal plus waste plastics) and oxygen into the furnace in the scrap melting process of the present invention. The burner 8B at the tuyere 2 permits oxygen [O$_2$] (which may be cold oxygen) to be injected from the oxygen injector b' at the center (or the vicinity thereof) of the burner, pulverized coal [PC] to be injected from the solid fuel injector a encircling it, and oxygen [O$_2$] (which may be cold oxygen) to be injected from the oxygen injector b encircling it. In other words, pulverized coal is injected as if it is sandwiched between two layers of oxygen. This mode of injection ensures the mixing of pulverized coal [PC] and oxygen [O$_2$] at the tuyere, the rapid combustion of pulverized coal, and the formation of the combustion zone and raceway at the tuyere. This injection method permits better contact between pulverized coal and oxygen than that shown in FIGS. 2 and 3, and hence leads to an advantage of realizing a high combustion efficiency of pulverized coal (or pulverized coal plus waste plastics).

This injection method, like that shown in FIG. 3, permits pulverized coal [PC] to be injected together with waste plastics [SR] (in the form of powder, granule, or chips) from the solid fuel injector a. In this case, at least part of waste plastics [SR] burns rapidly together with pulverized coal.

Figure 5:
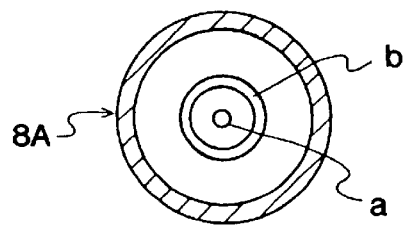
FIG. 5 is a schematic diagram showing (in section in the radial direction) one embodiment of the burner used for injection of pulverized coal etc. and oxygen as shown in FIGS. 2 and 3.
Figure 6:
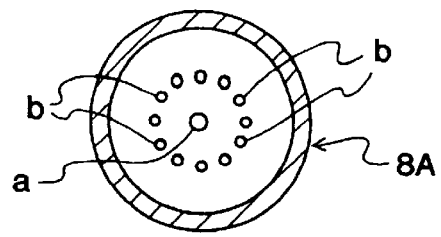
FIG. 6 is a schematic diagram showing (in section in the radial direction) another embodiment of the burner used for injection of pulverized coal etc. and oxygen as shown in FIGS. 2 and 3.

FIGS. 5 and 6 show how pulverized coal [PC] (or pulverized coal [PC] plus waste plastics [SR]) and oxygen [O$_2$] are injected in the scrap melting process shown in FIGS. 2 and 3. The embodiment shown in FIG. 5 is designed such that pulverized coal [PC] (or pulverized coal [PC] plus waste plastics [SR]) is injected from the solid fuel injector a at the center (or the vicinity thereof) of the burner and oxygen [O$_2$] is injected from the oxygen injector b which encircles the solid fuel injector a. The embodiment shown in FIG. 6 is designed such that oxygen [O$_2$] is injected from a plurality of oxygen injectors b arranged at adequate intervals around the solid fuel injector a.

Figure 7:
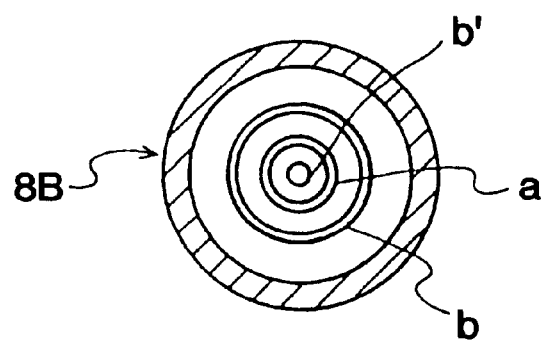
FIG. 7 is a schematic diagram showing (in section in the radial direction) one embodiment of the burner used for injection of pulverized coal etc. and oxygen as shown in FIG. 4.
Figure 8:
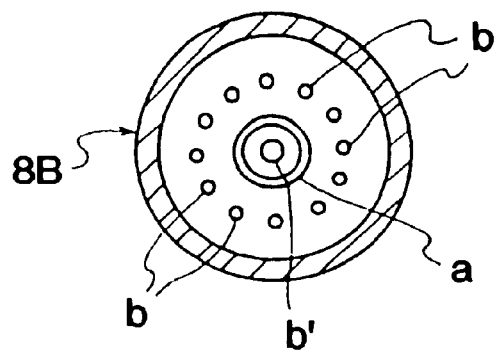
FIG. 8 is a schematic diagram showing (in section in the radial direction) another embodiment of the burner used for injection of pulverized coal etc. and oxygen as shown in FIG. 4.
Figure 9:
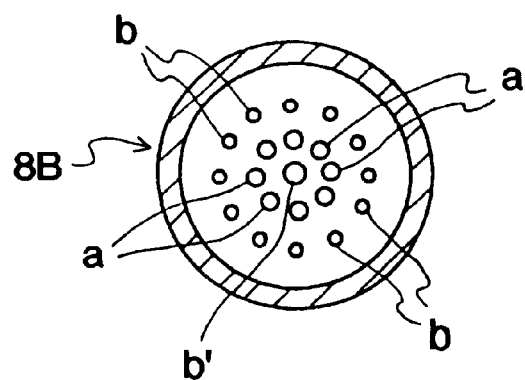
FIG. 9 is a schematic diagram showing (in section in the radial direction) another embodiment of the burner used for injection of pulverized coal etc. and oxygen as shown in FIG. 4.

FIGS. 7 to 9 show how pulverized coal [PC] (or pulverized coal [PC] plus waste plastics [SR]) and oxygen [O$_2$] are injected in the scrap melting process shown in FIG. 4. The embodiment shown in FIG. 7 is designed such that oxygen [O$_2$] is injected from the oxygen injector b' at the center (or the vicinity thereof) of the burner, pulverized coal [PC] (or pulverized coal [PC] plus waste plastics [SR]) is injected from the solid fuel injector a encircling the oxygen injector b', and oxygen [O$_2$] is injected from the oxygen injector b encircling it. The embodiment shown in FIG. 8 is designed such that pulverized coal [PC] (or pulverized coal [PC] plus waste plastics [SR]) is injected from the solid fuel injector a encircling the oxygen injector b' at the center (or the vicinity thereof) of the burner and oxygen [O$_2$] is injected from a plurality of oxygen injectors b arranged at adequate intervals around the solid fuel injector a. The embodiment shown in FIG. 9 is designed such that pulverized coal [PC] (or pulverized coal [PC] plus waste plastics [SR]) is injected from a plurality of solid fuel injectors a arranged at adequate intervals around the oxygen injector b' at the center (or the vicinity thereof) of the burner and oxygen [O$_2$] is injected from a plurality of oxygen injectors b arranged at adequate intervals around the solid fuel injector a.

Figure 10:
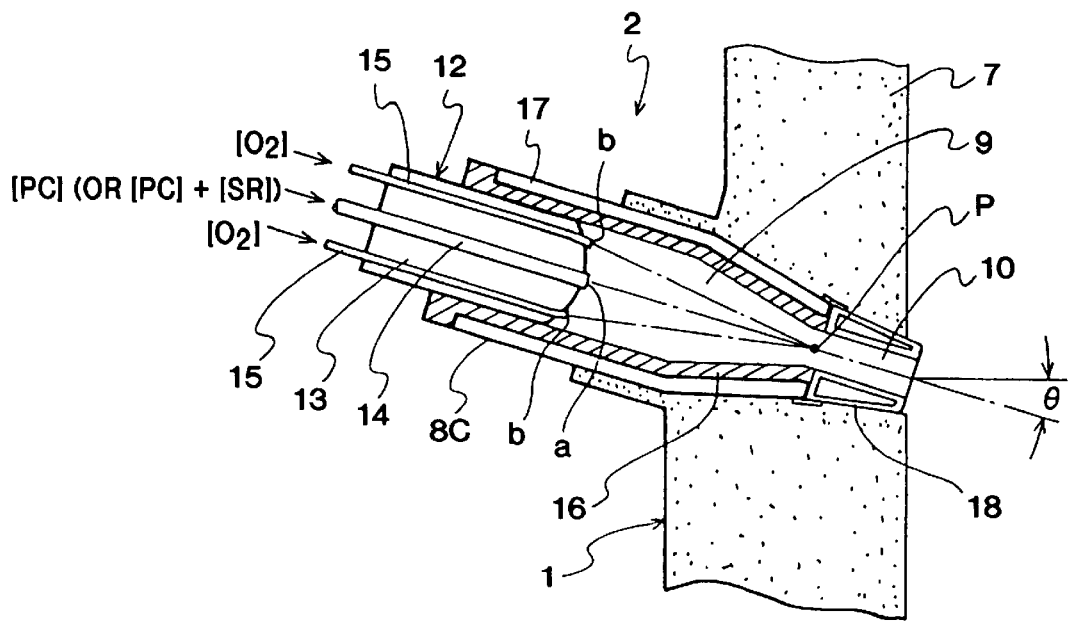
FIG. 10 is a schematic diagram showing one structure (in section) of the tuyere of the shaft furnace and the method of injecting pulverized coal etc. and oxygen according to the present invention.
Figure 11:
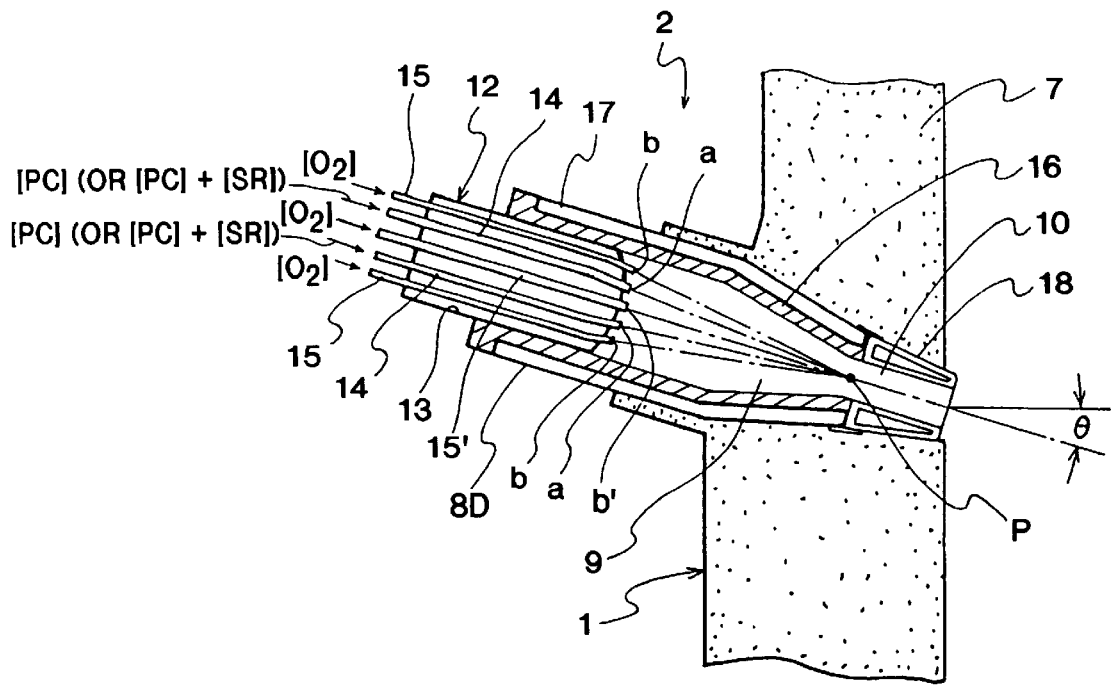
FIG. 11 is a schematic diagram showing another structure (in section) of the tuyere of the shaft furnace and the method of injecting pulverized coal etc. and oxygen according to the present invention.

FIGS. 10 and 11 are schematic drawings showing how pulverized coal (or pulverized coal plus waste plastics) and oxygen are injected in the scrap melting process according to the present invention. These embodiments are advantageous over those shown in FIGS. 2 to 4 in that pulverized coal (or pulverized coal plus waste plastics) can be burned efficiently and stably.

The embodiment shown in FIG. 10 is characterized in that the tuyere 2 is equipped with the burner 8C which has the pre-combustion chamber 9 for pulverized coal in the burner forward opening 10. Into the pre-combustion chamber 9 of the burner 8C are injected pulverized coal (or pulverized coal [PC] plus waste plastics [SR]) from the solid fuel injector a at the center (or the vicinity thereof) of the burner and oxygen (which may be cold oxygen) from the oxygen injector b arranged around it. In this case, pulverized coal [PC] is injected as if it is surrounded by oxygen [O$_2$], so that pulverized coal and oxygen become mixed rapidly in the pre-combustion chamber 9 and pulverized coal burns rapidly there. The resulting combustion gas is introduced into the furnace from the burner forward opening 8, and the heat of the combustion gas melts scrap to give molten iron, which is discharged from the furnace. As mentioned earlier, the combustion gas is discharged from the furnace for use as a fuel gas without intentional secondary combustion. In other words, this method permits pulverized coal to burn in the combustion burner, so that pulverized coal can be burned efficiently and stably regardless of the status in the furnace.

The embodiment shown in FIG. 11 is characterized in that the tuyere 2 is equipped with the burner 8D which has the pre-combustion chamber 9 for pulverized coal in the burner forward opening 10. Into the pre-combustion chamber 9 of the burner 8D are injected oxygen [O$_2$] from the oxygen injector b' at the center (or the vicinity thereof) of the burner, pulverized coal (or pulverized coal [PC] plus waste plastics [SR]) from the solid fuel injector a arranged around it, and oxygen [O$_2$] from the oxygen injector b arranged around it. In this case, pulverized coal [PC] is injected as if it is sandwiched between two layers of oxygen [O$_2$], so that pulverized coal and oxygen become mixed better than in the embodiment shown in FIG. 10. This increases the combustion efficiency of pulverized coal.

The burner used in the embodiments shown in FIGS. 10 and 11 is constructed as explained below. In FIG. 10, the burner proper 12 of the burner 8C is constructed of a cylindrical water-cooling jacket 13, a solid fuel supply pipe 14 penetrating it, and an oxygen supply pipe 15. These supply pipes have their open ends at the front surface of the burner proper 12 (or the front surface of the water-cooling jacket 13) so that the solid fuel injector a and the oxygen injector b are formed.

The pre-combustion chamber 9 is a cylindrical body formed between the burner proper 12 and the burner forward opening 10. It has its inner wall lined with a non-metallic refractory 16. While the burner is in use, this refractory 16 is kept red-hot so that its radiation heat ignites the pulverized coal and waste plastics fed into the pre-combustion chamber. In addition, the pre-combustion chamber 9 has a tapered end so that the combustion gas is injected into the furnace at a prescribed flow rate.

The pre-combustion chamber 9 is provided with a water-cooling jacket 17 on its outside, and the forward end of the burner is provided with a water-cooled tuyere 18. This tuyere is intended to protect the forward end of the burner from the hot furnace atmosphere; however, it may be omitted.

To ensure the rapid mixing of pulverized coal and oxygen and to ensure the efficient burning of pulverized coal in the pre-combustion chamber 9, the solid fuel injector a and the oxygen injector b are constructed such that the intersection p of the extension of their axes is at or inside the forward end of the exit of the pre-combustion chamber 9 (toward the burner).

The burner as a whole is fixed aslant to the furnace wall 7, with its axis inclined downward at an angle of θ. The aslant burner permits slag (molten ash of pulverized coal) to be smoothly discharged from the burner forward opening 10 and transferred into the furnace. To this end, the angle θ should preferably be such that the tapered part inside the pre-combustion chamber 9 is horizontal or the forward end is inclined downward.

The burner shown in FIG. 11 has the injectors a, b, and b'; the first one is a solid fuel supply pipe 14 penetrating the water-cooling jacket 13, with its forward end opened, and the second and third ones are oxygen supply pipes 15, 15' both penetrating the water-cooling jacket 13, with their forward ends opened. Except for these injectors, it is similar in structure to that shown in FIG. 10. Its detailed description is omitted by assigning like reference characters for the corresponding parts.

The burners shown in FIGS. 10 and 11 also permit pulverized coal [PC] to be injected together with waste plastics [SR] (in the form of powder, granule, or chips) from the solid fuel injector a. In this case, at least part of waste plastics burns rapidly along with pulverized coal.

Figure 12:
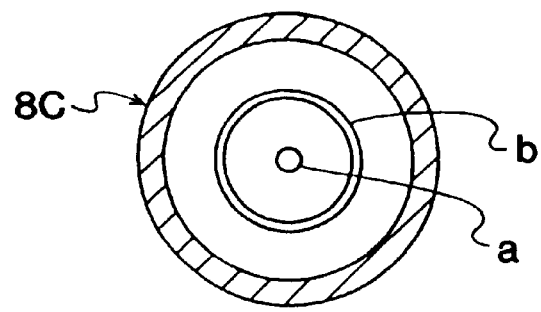
FIG. 12 is a schematic diagram showing (in section in the radial direction) one embodiment of the burner used for injection of pulverized coal etc. and oxygen as shown in FIG. 10.
Figure 13:
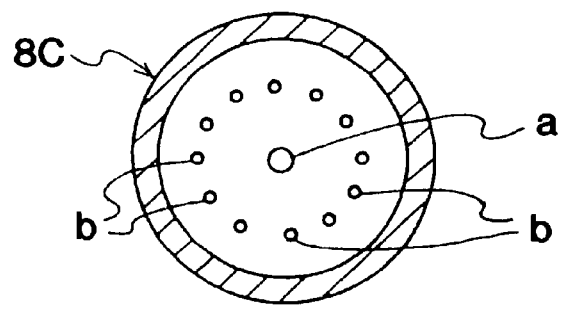
FIG. 13 is a schematic diagram showing (in section in the radial direction) another embodiment of the burner used for injection of pulverized coal etc. and oxygen as shown in FIG. 10.

FIGS. 12 and 13 show how pulverized coal [PC] (or pulverized coal [PC] plus waste plastics [SR]) and oxygen [O$_2$] are injected in the scrap melting process shown in FIG. 10. The embodiment shown in FIG. 12 is designed such that pulverized coal [PC] (or pulverized coal [PC] plus waste plastics [SR]) is injected from the solid fuel injector a at the center (or the vicinity thereof) of the burner, and oxygen [O$_2$] is injected from the oxygen injector b' encircling the solid fuel injector a. The embodiment shown in FIG. 13 is designed such that oxygen [O$_2$] is injected from a plurality of oxygen injectors b arranged at adequate intervals around the solid fuel injector a.

Figure 14:
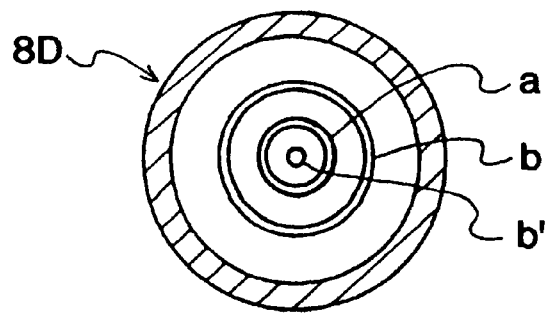
FIG. 14 is a schematic diagram showing (in section in the radial direction) one embodiment of the burner used for injection of pulverized coal etc. and oxygen as shown in FIG. 11.
Figure 15:
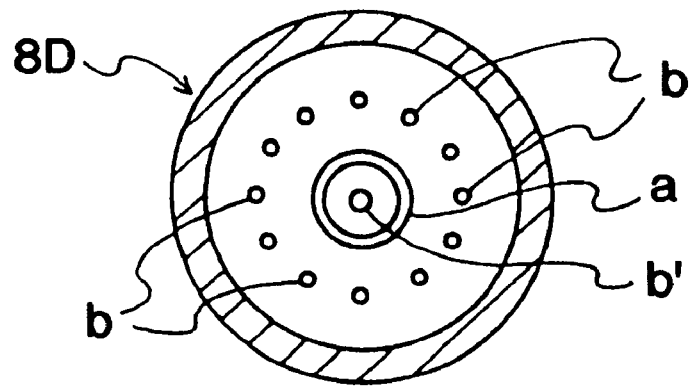
FIG. 15 is a schematic diagram showing (in section in the radial direction) another embodiment of the burner used for injection of pulverized coal etc. and oxygen as shown in FIG. 11.
Figure 16:
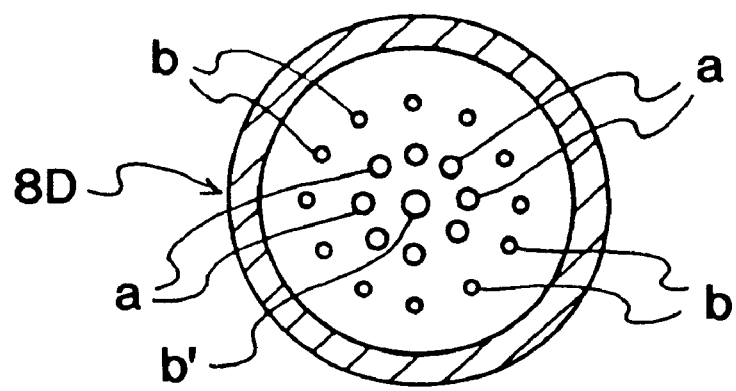
FIG. 16 is a schematic diagram showing (in section in the radial direction) another embodiment of the burner used for injection of pulverized coal etc. and oxygen as shown in FIG. 11.

FIGS. 14 to 16 show how pulverized coal [PC] (or pulverized coal [PC] plus waste plastics [SR]) and oxygen [O$_2$] are injected in the scrap melting process shown in FIG. 11. The embodiment shown in FIG. 14 is designed such that oxygen [O$_2$] is injected from the oxygen injector b' at the center (or the vicinity thereof) of the burner, pulverized coal [PC] (or pulverized coal [PC] plus waste plastics [SR]) is injected from the solid fuel injector a encircling the oxygen injector b', and oxygen [O$_2$] is injected from the oxygen injector b encircling it. The embodiment shown in FIG. 15 is designed such that pulverized coal [PC] (or pulverized coal [PC] plus waste plastics [SR]) is injected from the solid fuel injector a encircling the oxygen injector b' at the center (or the vicinity thereof) of the burner, and oxygen [O$_2$] is injected from a plurality of oxygen injectors b arranged at adequate intervals around the solid fuel injector a. The embodiment shown in FIG. 16 is designed such that pulverized coal [PC] (or pulverized coal [PC] plus waste plastics [SR]) is injected from a plurality of solid fuel injectors a arranged at adequate intervals around the oxygen injector b' at the center (or the vicinity thereof) of the burner, and oxygen [$O_2$] is injected from a plurality of oxygen injectors b arranged at adequate intervals around the solid fuel injector a.

The burner equipped with the pre-combustion chamber 9 as shown in FIGS. 10 and 11 permits waste plastics (in the form of bulk) to be charged into the pre-combustion chamber 9 in place of waste plastics (in the form of powder, granule, or chips) or simultaneously with its injection, so that at least part of the waste plastics burns. In this case, waste plastics in the form of bulk is charged into the pre-combustion chamber 9 from the charger separately formed in the burner.

For pulverized coal [PC] (or pulverized coal [PC] plus waste plastics [SR]) to be ignited and burned in the pre-combustion chamber 9, it may be necessary to use at all times an ignition burner (not shown) which is fueled with oil or LPG. Alternatively, it is possible to form the inner wall of the pre-combustion chamber 9 from a refractory and preheat the burner inside or ignite and burn pulverized coal with an ignition burner (or a pilot burner) at the initial stage of operation, so that the red-hot refractory emits radiation heat for the spontaneous ignition of pulverized coal etc. in the subsequent steady-state operation.

According to the present invention, the injection of waste plastics from the burners 8A to 8D or the injection or charging of waste plastics into the pre-combustion chamber 9 may be accomplished discontinuously or intermittently. In addition, the injection or charging of waste plastics may be accomplished simultaneously with the injection of pulverized coal or while the injection of pulverized coal is suspended temporarily.

In the case where pulverized coal and waste plastics are injected from any of the burners 8A to 8D, they may be injected through separate injection holes.

Figure 18:
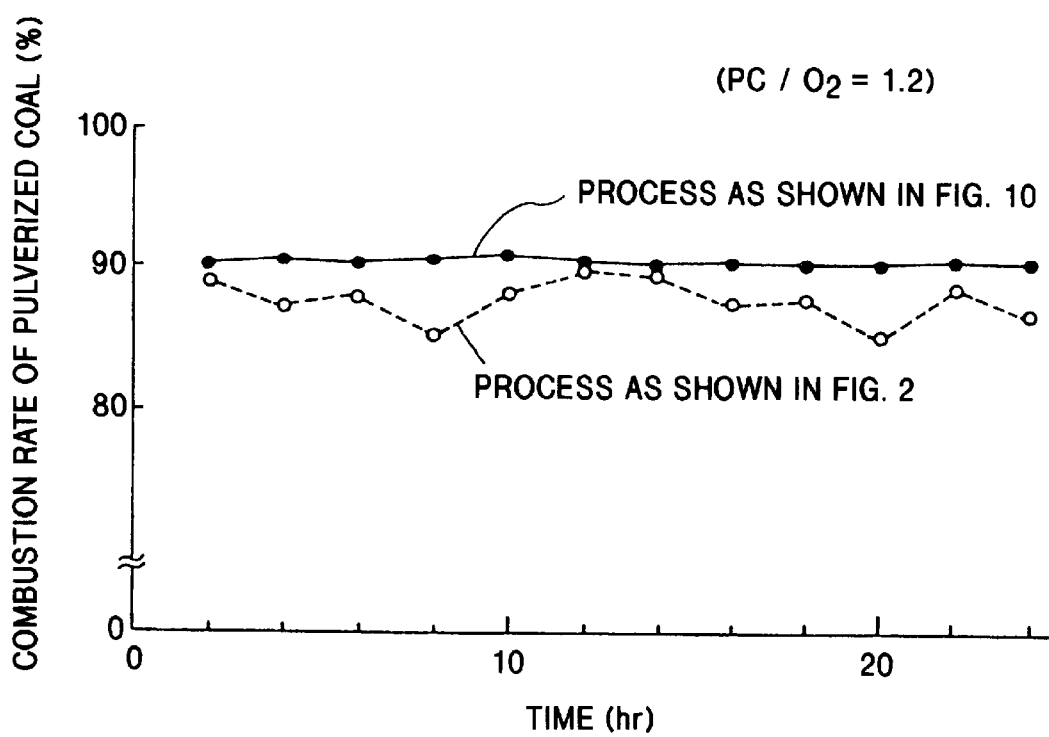
FIG. 18 is a graph showing the burning rate of pulverized coal which changes with time in the case where pulverized coal and oxygen are injected according to the present invention.

FIG. 18 shows how the combustion rate of pulverized coal changes with time in the case of rapid combustion at $PC/O_2=1.2$ kg/Nm$^3$ by the respective processes shown in FIGS. 2 and 10. It is noted that in general both of the processes ensure a high combustion rate of pulverized coal. In particular, however, the combustion rate slightly fluctuates with time in the case of the process shown in FIG. 2. A probable reason for this is that the combustion of pulverized coal is affected as the coke layer changes in the combustion space at the tuyere. By contrast, the combustion rate of pulverized coal is maintained high at all times in the case of the process shown in FIG. 10. This is because the pulverized coal supplied is gasified mostly in the pre-combustion chamber and the combustion of pulverized coal is little affected by the status in the furnace.

Figure 19:
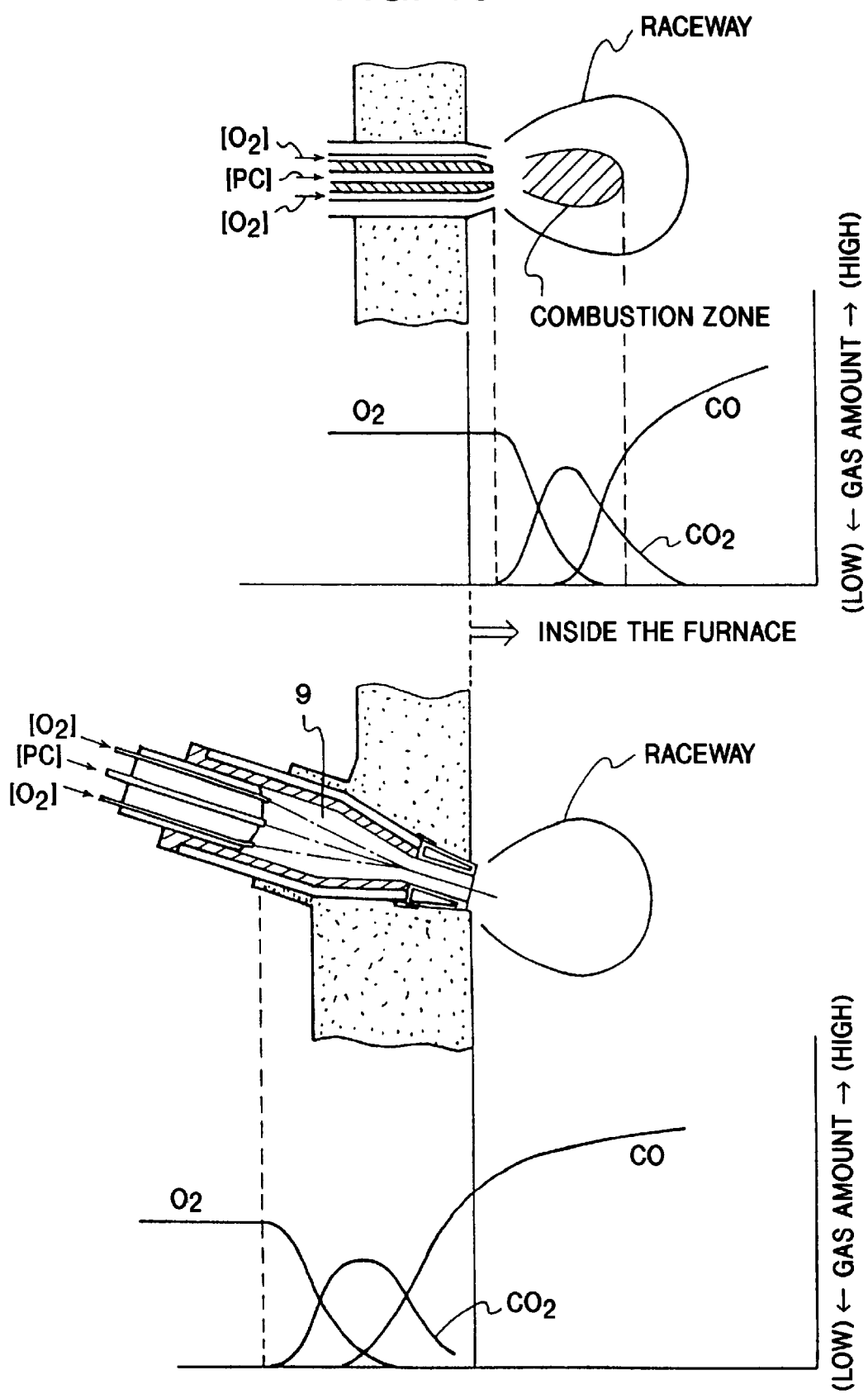
FIG. 19 is a schematic diagram showing an ideal state of combustion near the tuyere in the case where pulverized coal and oxygen are injected according to the present invention.

FIG. 19 depicts the respective idealized combustion states of pulverized coal in the vicinity of the tuyere in the processes shown in FIGS. 2 and 10.

In the process shown in FIG. 2, a combustion zone is formed at the tuyere and a so-called raceway is formed outside thereof. By contrast, in the process shown in FIG. 10, almost no combustion zone (oxidation zone) is formed but only a raceway is formed at the tuyere, because almost all the oxygen injected into the pre-combustion chamber 9 is rapidly consumed there and the combustion gas of pulverized coal is introduced into the furnace. ($CO_2$ occurs in the burner, but $CO_2$ accounts for very little but CO accounts for most in the combustion gas introduced into the furnace.)

As mentioned above, the process of the present invention makes it possible to efficiently convert a large amount of pulverized coal into combustion gas. Therefore, the process can be run with the coke ratio kept low relative to the pulverized coal ratio. Especially in the process shown in FIGS. 10 and 11, the supplied oxygen is rapidly consumed mostly in the pre-combustion chamber and hence the combustion zone is barely formed at the tuyere or formed in a very limited region. This suppresses the consumption (combustion) of coke at the tuyere and hence lowers the coke ratio.

The scrap melting process of the present invention makes it possible to inject dust into the furnace from the burner and/or another injector at the tuyere. The thus injected dust can be utilized in the furnace as the source of iron, heat, secondary raw material, and high-calorie exhaust gas. Most dust contains iron (iron oxide) which can be utilized as an iron source in the furnace. Shredder dust contains plastics which can be utilized as a heat source or a source of high-calorie exhaust gas. Examples of the dust that can be injected into the furnace include blast furnace dust, converter dust, electric furnace dust, cupola dust, mill scale, shredder dust, zinc dust (discharged from zinc-plating facilities), and zinc-containing dust recovered from the exhaust gas of the furnace. One or more than one kind of dust can be injected into the furnace from the tuyere. The zinc-containing dust recovered from the exhaust gas of the furnace is introduced into the furnace repeatedly so that zinc concentrates in the furnace and accumulates on dust to be recovered. In this way it is possible to recover zinc in a highly concentrated form. A detailed description of this will be given later.

Most dust needs less attention for combustibility than pulverized coal or waste plastics (in the form of powder, granule, or chips). Therefore, it may be injected into the furnace from the tuyere in any manner. For example, it may be injected from the burner (8A–8D in FIGS. 2 to 16) used for the injection of pulverized coal etc., or it may be injected from any other injection means. In the case where the burner shown in FIG. 2 is used, dust may be injected together with pulverized coal [PC] injected from the solid fuel injector a or injected from a separately installed injector.

Injection of dust into the furnace may be carried out discontinuously or intermittently. In the case of injection from the burner (8A–8D), dust may be injected together with pulverized coal and/or waste plastics or injected while the injection of pulverized coal and/or waste plastics is suspended temporarily. These modes of injection are meant by the injection of dust from the burner and/or any other injector in the process of the present invention.

In the case of dust containing a comparatively large amount of waste plastics and unburnt char (pulverized coal), it is desirable to inject it from the burner in the same manner as used for pulverized coal in order to ensure the combustion of unburnt char and waste plastics.

The following is a detailed description of the function and effect produced by the charging of waste plastics from the furnace top and the injection of pulverized coal plus waste plastics from the tuyere in the process of the present invention.

The process of the present invention is designed to charge waste plastics from the furnace top and optionally to inject or charge waste plastics from the burner at the tuyere in a specific manner, so as to utilize waste plastics as a source of high-calorie exhaust gas and also as part of heat source. The utilization of waste plastics in this manner is feasible due mostly to the scrap melting process in the mode of (1)–(3) mentioned above and the injection of a comparatively large amount of pulverized coal.

In general, the following problems arise if a comparatively large amount of waste plastics is charged from the furnace top or injected into the shaft furnace from the tuyere.

(1) Waste plastics (as municipal waste and industrial waste) usually contains about 20% polyvinyl chloride, which upon combustion emits a large amount of hydrochloric acid gas to greatly deteriorate the quality of exhaust gas as a fuel gas.

(2) Unburnt waste plastics is pyrolyzed in the furnace and the decomposition product (gas) reacts to form a tar precursor at the furnace top or in the waste gas duct. The resulting tarlike substance sticks to and accumulates on the inner wall of the waste gas duct to cause clogging.

(3) If the injected waste plastics does not burn rapidly and sufficiently at or near the tuyere, unburnt waste plastics melts and sticks together in the bed coke to obstruct ventilation in the furnace. This hinders the operation of the shaft furnace.

The scrap melting process of the present invention makes it possible to charge waste plastics into the furnace without posing the above-mentioned problems. The problem (1) is avoided in the process of the present invention because the concentration of HCl in exhaust gas is effectively reduced for the reasons explained below. One of the most effective way of reducing the concentration of HCl in exhaust gas is to have HCl captured by CaO, $Na_2O$, Fe, etc. contained in dust in the exhaust gas. According to the present invention, pulverized coal can be burned efficiently, so that exhaust gas contains a less amount of unburnt char compared with the amount of pulverized coal injected and hence the furnace top gas contains a comparatively small amount of dust. However, since the amount of HCl-capturing components in the furnace top gas is proportional to the amount of pulverized coal injected, there is a comparatively large amount of HCl-capturing components in the furnace top gas in the process of the present invention (in which a large amount of pulverized coal is injected) and hence HCl is captured highly efficiently by the HCl-capturing components.

As mentioned above, the process of the present invention permits pulverized coal to burn efficiently and hence the amount of unburnt char in exhaust gas is relatively small for the amount of pulverized coal injected. Nevertheless, a considerable amount of unburnt char is still contained in exhaust gas. This unburnt char strongly absorbs (by physical absorption) a large amount of HCl in exhaust gas and hence it reduces the concentration of HCl in exhaust gas upon contact with exhaust gas for a very short time. The HCl absorbed onto the surface of unburnt char gradually reacts with HCl-capturing components (such as CaO, $Na_2O$, and Fe) contained in dust and becomes fixed to dust. In other words, the HCl absorbed onto unburnt char is absorbed by the HCl-capturing components by chemical reactions with lapse of time and it is eventually fixed in the form of chloride such as $CaCl_2$, NaCl, and $FeCl_2$. And these chlorides are separated and removed, as part of dust, from the exhaust gas.

Since there is no intentional secondary combustion in the shaft or at the furnace top, the process of the present invention offers the advantage that unburnt char to absorb HCl is not lost in the shaft or at the furnace top. This leads to the effective absorption of HCl by unburnt char, and HCl, once absorbed by unburnt char, does not migrate to gas again.

For the effective reduction of HCl in exhaust gas by the above-mentioned mechanism, it is desirable to inject an adequate amount of pulverized coal corresponding to the amount of waste plastics charged from the furnace top and injected from the injector so that there exists an adequate amount of HCl-capturing components and unburnt char in proportion to the amount of waste plastics (or polyvinyl chloride, to be precise) charged into the furnace.

To be concrete, it is desirable that the amount (by weight) of pulverized coal to be injected be more than one-tenth the amount of waste plastics (top charge plus injection) and that the amount (by weight) of pulverized coal to be injected be more than the amount of polyvinyl chloride (top charge plus injection).

The above-mentioned problem (2) is avoided in the process of the present invention because a comparatively large amount of pulverized coal is injected from the tuyere so that the furnace top gas contains more than 5% hydrogen. This hydrogen stabilizes the decomposition products of waste plastics and prevents them from forming a tar precursor through their secondary reactions. Thus it is possible to prevent the occurrence of tarlike or waxlike substances which cause such troubles as the clogging of ducts.

The above-mentioned problem (3) is avoided in the process of the present invention because pulverized coal is injected in a special manner (by the mechanism (1) or (2) mentioned above) to ensure efficient combustion and waste plastics is also injected in a similar manner so that most of it rapidly burns at or near the tuyere. Consequently, only a small portion of waste plastics remains unburned at the bottom of the furnace, and there is no possibility that waste plastics stick together in the coke bed to prevent ventilation in the furnace.

As mentioned above, the scrap melting process of the present invention does not pose the problem involved in the process for producing molten iron by injecting waste plastics into the furnace. In other words, it has first become possible to inject waste plastics into the furnace for scrap melting by the present invention which is intended to economically produce molten iron and high-calorie exhaust gas mainly from scrap and pulverized coal (or pulverized coal plus waste plastics) and which is run by the aid of the above-mentioned means (1) to (3) at a high fuel ratio attained by the injection of a large amount of pulverized coal (or pulverized coal plus waste plastics).

As mentioned earlier, the process of the present invention is premised on keeping the fuel ratio higher than the conventional process and injecting a large amount of pulverized coal (or pulverized coal plus waste plastics). Specific values in practical operation are as follows.

Fuel ratio: 300 kg/t-pig or above

Ratio (by weight) of the pulverized coal ratio (kg/t-pig) to the coke ratio (kg/t-pig): 1.0 or above (in the case where pulverized coal alone is injected from the burner and coke is charged from the furnace top)

Ratio (by weight) of the pulverized coal ratio (kg/t-pig) plus the waste plastics ratio (kg/t-pig) to the coke ratio (kg/t-pig): 1.0 or above (in the case where pulverized coal and waste plastics are injected from the burner and coke is charged from the furnace top)

Operation in such a specific manner permits the efficient production of molten iron and the stable supply of a large amount of high-calorie exhaust gas. The practical upper limits of these ratios (given below) vary depending on the operation rate and the cost balance between the fuel consumed and the gas recovered.

Fuel ratio: 500 kg/t-pig

Ratio of pulverized coal ratio to coke ratio: 2.5

Ratio of [pulverized coal ratio plus waste plastics ratio] to coke ratio: 2.5

As mentioned above, the process of the present invention is premised on operating at a relatively higher fuel ratio than the conventional process. Therefore, it requires more fuel expense than the conventional process. However, it can be practiced at a considerably lower cost as a whole than the conventional process because it permits a large amount of pulverized coal (which is by far cheaper than coke) to be used as fuel (in combination with waste plastics as part of fuel), thereby relatively reducing the coke ratio, and it also permits a large amount of valuable high-calorie exhaust gas to be formed from cheap pulverized coal and waste plastics.

Injecting pulverized coal (and waste plastics) and oxygen simultaneously by the method specified in the present invention is helpful in ensuring the high yield and quality of molten iron. In the case of a hypothetical process in which coke alone (as a heat source) is charged into the furnace and oxygen is injected from the tuyere, a long oxygen zone extending inward would be formed at the tuyere. This oxygen zone oxidizes molten iron flowing nearby, and the resulting iron oxide migrates into slag and suspends in molten iron, which reduces the iron yield and deteriorates the quality of molten iron.

By contrast, the oxidation of slag mentioned above is not a problem in the process of the present invention, in which pulverized coal rapidly consumes oxygen at the tuyere and hence the oxygen zone is sufficiently small. Especially, in the process of the present invention as shown in FIGS. 10 and 11, pulverized coal rapidly consumes oxygen in the pre-combustion chamber and hence the combustion zone is barely formed at the tuyere or merely formed in an extremely limited region. Therefore, the oxidation of slag is scarcely a problem. The above-mentioned effect in the present invention is salient when the ratio of $PC/O_2$ or $(PC+SR)/O_2$ is greater than 0.7 kg/Nm$^3$, preferably greater than 1.0 kg/Nm$^3$.

The process of the present invention is designed such that pulverized coal (together with waste plastics) is allowed to burn rapidly and the resulting combustion gas is supplied to the tuyere to melt scrap smoothly. Therefore, unlike the cupola process, it dispenses with special foundry coke for the temperature profile control in the furnace. Although the process of the present invention needs coke to form the raceway under the melting zone and to hold the charged scrap, blast furnace coke can be used for this purpose.

The process of the present invention permits slag to readily melt and separate from the molten iron and accumulate thereon, so that slag is easily discharged from the furnace at the time of tapping without any hindrance to operation. (Slag is composed mainly of coal ash resulting from combustion of pulverized coal.)

The process of the present invention permits the burner to be used not only for the injection of pulverized coal (and waste plastics) and oxygen but also for the optional injection of steam or nitrogen (as a coolant) to control the combustion temperature.

The process of the present invention permits industrial oxygen (with a purity higher than 99%) to be used for injection from the burner. Although oxygen for this purpose should desirably be as pure as possible, industrial oxygen suffices. (Commercially available industrial oxygen has a purity of about 99.8–99.9%, and oxygen obtained from the oxygen plant in a steel mill has a purity of about 99.5%.) Oxygen of low purity (below 95%) does not burn pulverized coal (and waste plastics) efficiently and hence the resulting exhaust gas contains more low-calorie gas. This is contradictory to the object of the present invention. Oxygen injected from the tuyere in the present invention is supposed to have a purity higher than 95%.

Injecting dust from the tuyere produces the following functions and effects in the process of the present invention.

As mentioned above, the process of the present invention permits dust to be injected from the tuyere for use as a source of iron, heat, secondary raw material, or high-calorie exhaust gas. Dust should be handled differently according to its nature. Usually, dust discharged from an integrated steel mill contains a large amount of metal oxides (mainly iron oxide). Such dust tends to decrease the combustibility of pulverized coal etc. when it is injected from the tuyere, because it lowers the temperature at the tuyere due to reducing action by metal oxides it contains. The present inventors' experiment indicates that the temperature at the tuyere is decreased by 20–30° C. when iron oxide-based dust is injected from the tuyere at a rate of 50 kg/t under certain operating conditions.

In order to compensate for temperature decrease at the tuyere due to dust injection, it is necessary to increase the amount of oxygen ($O_2$) to be supplied to the tuyere. This object cannot be achieved by the conventional scrap melting process in which air or oxygen-enriched air is injected from the tuyere, because it is necessary to inject a large amount of air (or oxygen-enriched air) to supply the tuyere with sufficient oxygen. This results in the recovered exhaust gas decreasing in calorific value and increasing in volume (and hence fluctuation of operation). This is not the case with the scrap melting process of the present invention, in which oxygen alone is injected from the tuyere so that there exists sufficient oxygen at the tuyere and the exhaust gas does not excessively increase in volume.

The process of the present invention in which the burner equipped with the pre-combustion chamber is used permits pulverized coal to be partly replaced by waste plastics so that a large amount of dust is injected from the same burner as used for pulverized coal, because waste plastics does not give rise to ash slag unlike pulverized coal. This may be explained by the fact that if a large amount of dust (which is basically non-combustible) is injected into the pre-combustion chamber, there occurs a large amount of molten slag resulting from dust and coal ash which adversely affects the combustibility of pulverized coal etc., whereas if waste plastics is injected into the pre-combustion chamber as a partial substitute or as an entire but temporary substitute for pulverize coal, there will be less or no molten slag resulting from the combustion of pulverized coal.

The injecting of dust makes it possible to recover zinc in a concentrated form in the following manner if zinc exists in the furnace.

Economically, smelting of metallic zinc from a zinc-containing raw material requires that the zinc concentration in the raw material be at least 50 wt %. However, it is much lower in the case of dust discharged from furnaces and it is about 20% at the highest even in the case of cupola dust (which is said to have the highest zinc concentration.)

Smelting of metallic zinc needs a raw material containing more than 50 wt % zinc for economical reasons. Unfortunately, the zinc concentration is much lower than that in the case of dust discharged from furnaces and it is about 20% at the highest even in the case of cupola dust (which is said to contain zinc most of all). Therefore, it is difficult to recover zinc directly from such dust.

On the other hand, zinc is contained in comparatively high concentrations in scrap as the major raw material for the scrap melting process. To carry out the scrap melting process, it is necessary to prevent zinc from accumulating in the furnace and discharge it for recovery from the furnace as mentioned above.

According to the scrap melting process of the present invention, the concentration of zinc in the recovered dust is increased by repeatedly introducing recovered dust into the furnace while keeping the furnace top temperature at 400–800° C. (To this end, zinc-containing dust recovered from the exhaust gas is used as at least part of dust to be injected into the furnace.) In this way, zinc contained in scrap and dust can be recovered in its concentrated form (or in the form of dust containing zinc in high concentrations).

For zinc to be concentrated as mentioned above, it is necessary that zinc evaporates from scrap and dust in the furnace and the resulting zinc vapor efficiently condense on the dust surface at the furnace top.

Upon introduction of scrap and dust into the furnace, zinc contained therein evaporates in the region of the furnace where the temperature is about 800–900° C. (which is slightly lower than the boiling point 907° C.). The resulting zinc vapor rises, together with the furnace gas, through the furnace and condenses in the region of the furnace where the temperature is about 400–800° C. In other words, zinc vapor condenses on the dust surface (to be captured by dust) at the furnace top which is kept at about 400–800° C. The capturing of zinc by dust is accomplished very efficiently in the process of the present invention which employs the injection of oxygen from the tuyere and hence gives rise to a less amount of exhaust gas than the conventional process that employs the injection of air or oxygen-enriched air. The small amount of exhaust gas means that the gas flow rate is low and the dust residence time is long at the furnace top. This results in zinc vapor efficiently coming into contact with dust at the furnace top where the temperature is controlled as mentioned above.

If the furnace top temperature is lower than 400° C., zinc vapor condenses in the furnace shaft and sticks to and accumulates on the inner wall. By contrast, if the furnace top temperature is higher than 800° C., zinc vapor is discharged from the furnace without condensation in the furnace and the discharged zinc vapor condenses in the exhaust gas duct to cause clogging.

Figure 20:
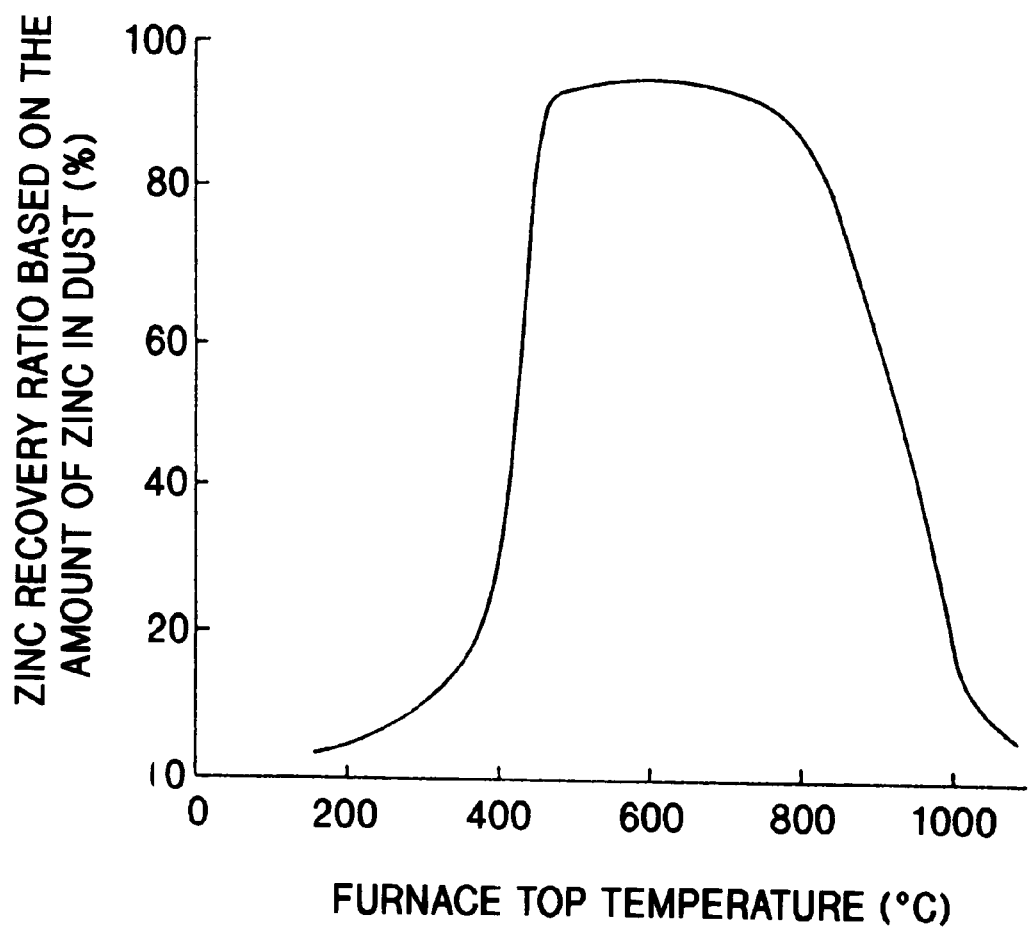
FIG. 20 is a graph showing the relation between the furnace top temperature and the zinc recovery ratio (based on the amount of zinc in dust) in the present invention.

FIG. 20 is a graph showing the relation between the furnace top temperature and the ratio of zinc recovery through dust. It is noted that the zinc recovery ratio is high when the furnace top temperature is in the range of 400–800° C., especially 450–750° C. Therefore, it is desirable to keep the furnace top temperature at 400–800° C., preferably 450–750° C.

This object is easily achieved in the process of the present invention, which does not involve the secondary combustion in the furnace unlike the conventional scrap melting process.

As mentioned above, the process of the present invention makes it possible to recover zinc-carrying dust from the exhaust gas and introduce the recovered dust into the tuyere repeatedly so that zinc accumulates on dust. Such zinc-carrying dust is partly discharged from the furnace intermittently so as to recover zinc in its concentrated form. Owing to this feature, the process of the present invention makes it possible to freely use scrap with a high zinc content as an iron source.

The recovery of dust from the exhaust gas is accomplished by means of a bag filter or cyclone installed in the exhaust gas duct for the furnace top gas. The recovered zinc-containing dust is injected, at least partly, into the furnace from the tuyere repeatedly, and discharged partly from the system intermittently. The discharged dust containing concentrated zinc is used as a raw material of zinc.

It is concluded from the foregoing that the process of the present invention offers the following advantages.

Efficient production of molten iron by scrap melting.

Mass production of high-calorie exhaust gas valuable as a fuel gas.

Usage of cheap pulverized coal (of steam coal) as the major heat source.

Usage of waste plastics as the source of high-calorie exhaust gas and also as the partial heat source.

Capability of gasifying a large amount of pulverized coal (together with waste plastics) with a comparatively small amount of oxygen by increasing the $PC/O_2$ ratio or the $(PC+SR)/O_2$ ratio.

Practicability with simple facilities.

Economical production of molten iron and high-calorie fuel gas from scrap, pulverized coal, and waste plastics as major raw materials.

Considerably lower production cost and running cost compared with the conventional technology owing to operation with a high pulverized coal ratio plus waste plastics ratio and owing to mass production of valuable high-calorie exhaust gas.

Disposal and effective use of a large amount of waste plastics.

Disposal and effective use of a large amount of dust discharged from ironworks.

Recovery of zinc from scrap and dust in its concentrated form, without zinc accumulating in the furnace.

EXAMPLES

Example 1

The process of the present invention was practiced at varied $PC/O_2$ ratios to produce molten iron from scrap by using a test furnace for scrap melting as shown in FIG. 1. The furnace has a volume of 2.5 m$^3$ and is capable of producing 10 tons of molten iron per day. It is equipped with a tuyere shown in any of FIGS. 2, 4, and 10. Scrap melting was accomplished by injecting pulverized coal and oxygen (at room temperature) into the furnace from the burner or into the pre-combustion chamber of the burner, with the combustion temperature at the tuyere kept at 2000° C. by injection of a coolant (nitrogen and/or steam). In this Example, only pulverized coal was injected from the tuyere to test its combustibility and waste plastics was charged from the furnace top at a rate of 10 kg/t-pig.

For comparison, scrap melting for molten iron production was carried out at varied $PC/O_2$ ratios by using a furnace shown in FIG. 1 which is equipped with a conventional tuyere shown in FIG. 22. This tuyere is so designed as to inject pulverized coal into oxygen-enriched hot air (at 800° C.) through the lance 20 according to the known cupola process. The $PC/O_2$ ratio was varied by adjusting the amount of oxygen in oxygen-enriched air and the amount of pulverized coal.

This example employed pulverized coal (with grains smaller than 74 $\mu$m accounting for 75%) having the analytical values shown in Table 1 and also employed blast furnace coke as coke.

To see the limit of injection of pulverized coal in the working example and comparative example, dust in the furnace top gas was sampled time to time and samples were tested for carbon concentration (%). The results are shown in FIG. 21.

Figure 21:
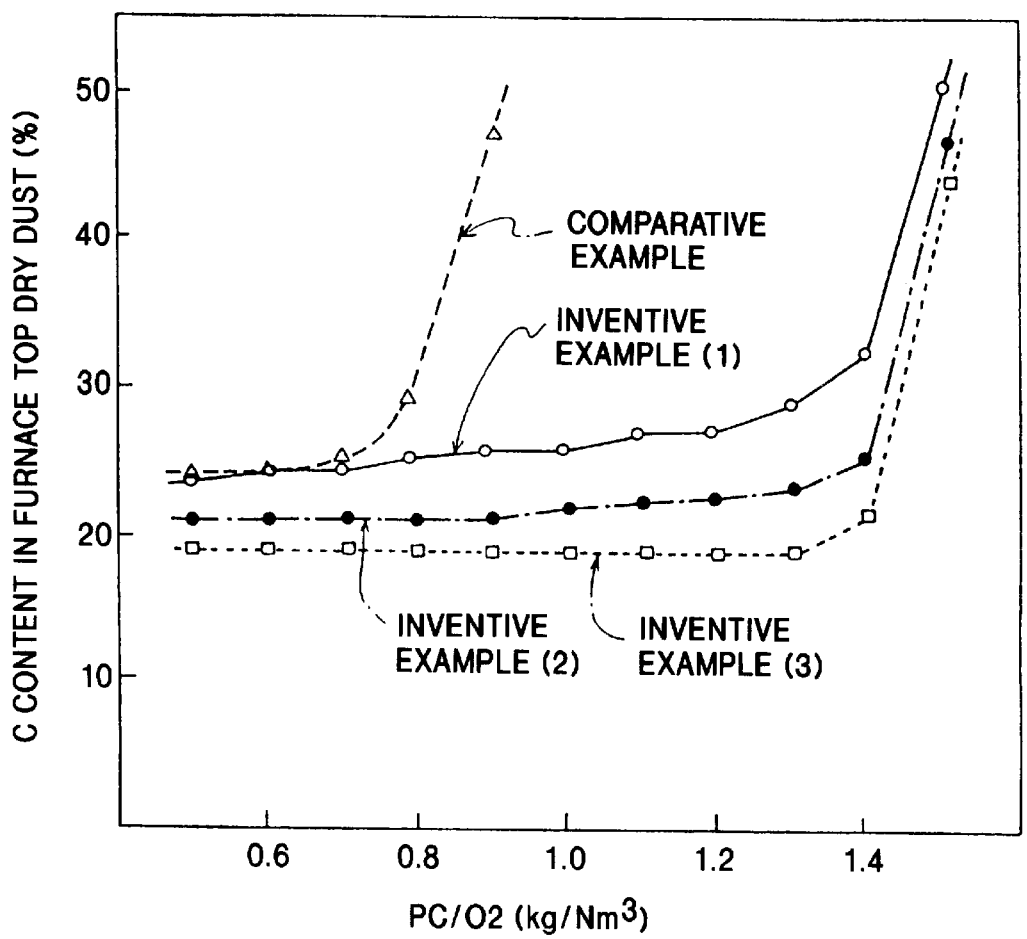
FIG. 21 is a graph showing the relation between the ratio <PC>/<O$_2$> and the carbon content in the furnace top dry gas in Example 1 (that employs the injector as shown in FIGS. 2, 4, and 10) and in Comparative Example (that employs the injector as shown in FIG. 22), where <PC> represents the amount of pulverized coal charged (kg/h) and <O$_2$> represents the flow rate of oxygen (Nm$^3$/h).

FIG. 21 is a graph showing the relation between the <PC>/<$O_2$> ratio and the carbon concentration in the furnace top dry dust. (<PC> stands for the amount (kg/h) of pulverized coal injected, and <$O_2$> stands for the flow rate (Nm$^3$/h) of oxygen.) It is noted that the comparative example greatly differs from the working examples in that the carbon concentration in the furnace top dust rapidly increases when the $PC/O_2$ ratio exceeds 0.7 kg/Nm$^3$. This suggests that, with the $PC/O_2$ ratio in such a region, pulverized coal does not burn completely in front of the tuyere and is discharged unburnt from the furnace top. In other words, the pulverized coal injected is not fully utilized as a fuel.

It is also noted that the working example (1) that employs the tuyere shown in FIG. 2 gives low carbon concentrations in the furnace top gas until the $PC/O_2$ ratio reaches about 1.4 $kg/Nm^3$. This suggests that a large amount of pulverized coal injected is efficiently burned and converted into the combustion gas in the furnace. It is also noted that the working example (2) that employs the tuyere shown in FIG. 4 permits the more efficient combustion of pulverized coal and that the working example (3) that employs the tuyere shown in FIG. 10 permits the most efficient combustion of pulverized coal. Incidentally, the stoichiometric upper limit of the $PC/O_2$ ratio is about 1.4 $kg/Nm^3$, and the fact that the carbon concentration in the furnace top dry gas rapidly increases when the $PC/O_2$ ratio approaches 1.4 $kg/Nm^3$ does not necessarily indicate the limitation of the process of the present invention.

It is apparent from this example that the process of the present invention permits pulverized coal to be converted into combustion gas through its efficient combustion even at a sufficiently high $PC/O_2$ ratio, because of the rapid mixing of pulverized coal and oxygen and hence the rapid combustion of pulverized coal at the tuyere. In addition, it was confirmed that the process of the present invention causes no hindrance to the melting of scrap and the production of molten iron.

Example 2

Molten iron was produced from scrap by using the same test furnace as used in Example 1, which is equipped with a tuyere shown in any of FIGS. 2, 3, 4, 10, and 22. Pulverized coal and coke were identical with those used in Example 1. Waste plastics (in the form of powder and granule) having an average particle diameter of 0.2–1 mm was used. In some comparative examples, air was introduced into the shaft to bring about the secondary combustion of combustion gas. The conditions and results of each run are shown in Tables 2 to 10.

No. 1 (in Table 2) represents the operation in which pulverized coal and waste plastics were not injected (but only oxygen was injected from the tuyere) and coke was the sole heat source (pulverized coal ratio: 0). Nos. 2 to 4 (in Table 2) represent the operations in which oxygen, pulverized coal, and a small amount of waste plastics (in the form of powder and granule) were injected from the burner. They differ in the pulverized coal ratio plus the waste plastics ratio which increases in the order of No. 2 to No. 4.

No. 1, in which pulverized coal and waste plastics were not injected, resulted in a high FeO content in slag owing to the large oxidation zone in the raceway. This led to a poor quality and low yield of molten iron. In addition, No. 1 necessarily led to a high production cost because it depends for heat source entirely on coke.

No. 2, in which pulverized coal was injected but the $(PC/SR)/O_2$ ratio was low, resulted in a high FeO content in slag (although not so high as in No. 1). No. 2 is costwise disadvantageous because the coke ratio is relatively high, that is, (pulverized coal ratio plus waste plastics ratio)/(coke ratio) is about 0.36.

By contrast, Nos. 3 and 4 resulted in a low FeO content in slag and gave rise to molten iron of good quality in high yields. In addition, Nos. 3 and 4 yielded a large amount of high-calorie exhaust gas (2700 $kcal/Nm^3$ or above) owing to efficient combustion despite the fact that a large amount of pulverized coal plus waste plastics in excess of the coke ratio was injected.

Nos. 5 and 6 (in Table 3) represent operations by the test furnace equipped with the tuyere shown in FIG. 4, and Nos. 7 and 8 (in Table 3) represent operations by the test furnace equipped with the tuyere shown in FIG. 10. In these operations, oxygen, pulverized coal, and a small amount of waste plastics (in the form of powder and granule) were injected from the burner under almost the same conditions as in Nos. 3 and 4. Operations in Nos. 5 to 8 were superior to those in Nos. 3 and 4 in the combustibility of pulverized coal and waste plastics. This results in a slight decrease in coke ratio and a decrease in the amount of furnace top gas.

Nos. 9 to 15 represent the operations in which the ratio of waste plastics injected from the tuyere is higher than that in Nos. 3 and 4 and the ratio of polyvinyl chloride resin in waste plastics increases in the order of No. 9 to No. 15. In all of these operations, the concentration of HCl in the exhaust gas was low.

Nos. 16 to 18 represent operations by the test furnace equipped with the tuyere shown in FIG. 4, and Nos. 19 to 21 represent operations by the test furnace equipped with the tuyere shown in FIG. 10. The conditions of these operations are similar to those of operations in Nos. 12 to 14. In all of these operations, the concentration of HCl in the exhaust gas was low.

Nos. 22 to 24 represent operations, with the waste plastics ratio greatly increased relative to the pulverized coal ratio. In these operations, the concentration of HCl in the exhaust gas was higher than that in operations of Nos. 10 to 21, because of the relatively low effect of reducing the concentration of HCl in the exhaust gas by the injection of a large amount of pulverized coal.

No. 25 represents the operation in which a conventional tuyere was used for the injection of pulverized coal plus waste plastics in an adequate amount and oxygen. (The first two components will be referred to as pulverize coal etc. hereinafter.) It is noted that the $(PC+SR)/O_2$ ratio is low because of the low combustion efficiency of pulverized coal etc. The result is the necessity of a large amount of coke relative to pulverized coal etc., which led to a high production cost. In addition, the lack of complete contact between pulverized coal etc. and oxygen at the tuyere resulted in a high FeO content in slag and a low quality and yield of molten iron.

No. 26 represents the operation that employs a conventional tuyere for the injection of oxygen-enriched air together with pulverized coal etc. In this operation, there is not complete contact between oxygen and pulverized coal etc. on account of the conventional tuyere and oxygen-enriched air. This led to a lower combustion efficiency of pulverized coal etc. than in No. 25. Therefore, it was necessary to increase the coke ratio, which led to a high production cost. In addition, the result of using oxygen-enriched air (66% $O_2$) is the exhaust gas having a low calorific value (2500 $kcal/Nm^3$ or below). As in the case above, the lack of complete contact between pulverized coal etc. and oxygen resulted in a high FeO content in slag and a low quality and yield of molten iron.

No. 27 represents the operation in which oxygen-enriched air and pulverized coal etc. were injected from a tuyere of conventional type and air was introduced into the shaft for secondary combustion. This operation realized a lower fuel ratio than that of No. 26 but was poor in the combustion efficiency of pulverized coal etc. for the same reason as in No. 26 and high in production cost because of the high coke ratio. In addition, this operation gave rise to an exhaust gas of extremely low calorific value (1800 kcal/Nm³ or below) on account of the injection of oxygen-enriched air (66% $O_2$) and the secondary combustion of combustion gas resulting from pulverized coal etc. As in the case of No. 26, the lack of complete contact between pulverized coal etc. and oxygen resulted in a high FeO content in slag and a low quality and yield of molten iron.

No. 28 represents the operation in which oxygen-enriched air and pulverized coal etc. were injected (such that the former encircled the latter) from the tuyere according to the method of the present invention. The injection of oxygen-enriched air did not bring about the complete contact between oxygen and pulverized coal etc. This resulted in a low combustion efficiency of pulverized coal etc. and made it necessary to increase the coke ratio, which led to a high production cost. The use of oxygen-enriched air (69% $O_2$) resulted in a low-calorie exhaust gas (2400 kcal/Nm³ or below). In addition, the incomplete contact between pulverized coal etc. and oxygen (due to the use of oxygen-enriched air) resulted in a higher FeO content in slag and a lower quality and yield of molten iron than in the operations of Nos. 3 and 4.

No. 29 represents the operation in which oxygen-enriched air and pulverized coal etc. were injected (such that the former encircled the latter) from the tuyere according to the method of the present invention and air was introduced into the shaft for secondary combustion. This operation realized a lower fuel ratio than that of No. 28 but was poor in the combustion efficiency of pulverized coal etc. for the same reason as in No. 28 and high in production cost because of the high coke ratio. The use of oxygen-enriched air (62% $O_2$) and the secondary combustion of combustion gas resulting from pulverized coal etc. gave rise to an exhaust gas of extremely low calorific value (1800 kcal/Nm³ or below). As in the case of No. 28, the lack of complete contact between pulverized coal etc. and oxygen resulted in a higher FeO content in slag and a lower quality and yield of molten iron than in the operations of Nos. 3 and 4.

Nos. 30 and 31 represent operations with a low fuel ratio. In the operation of No. 30, oxygen-enriched air and pulverized coal etc. were injected (such that the former encircled the latter) from the tuyere according to the method of the present invention. The injection of oxygen-enriched air did not bring about complete contact between oxygen and pulverized coal etc. This resulted in a low combustion efficiency of pulverized coal etc. and made it necessary to increase the coke ratio, which led to a high production cost. The use of oxygen-enriched air (63% $O_2$) resulted in a low-calorie exhaust gas (2300 kcal/Nm³ or below). The operation with a low combustion ratio gave rise to only a small amount of exhaust gas. In addition, the incomplete contact between pulverized coal etc. and oxygen (due to the use of oxygen-enriched air) resulted in a higher FeO content in slag and a lower quality and yield of molten iron than in the operations of Nos. 3 and 4.

No. 31 represents the operation in which oxygen-enriched air and pulverized coal etc. were injected (such that the former encircled the latter) from the tuyere according to the method of the present invention and air was introduced into the shaft for secondary combustion. This operation realized a lower fuel ratio than that of No. 30 but was poor in the combustion efficiency of pulverized coal etc. for the same reason as in No. 30 and high in production cost because of the high coke ratio. The use of oxygen-enriched air (63% $O_2$) and the secondary combustion of combustion gas resulting from pulverized coal etc. gave rise to an exhaust gas of extremely low calorific value (1800 kcal/Nm³ or below). The operation with a low combustion ratio gave rise to only a small amount of exhaust gas. As in the case of No. 30, the lack of complete contact between pulverized coal etc. and oxygen resulted in a higher FeO content in slag and a lower quality and yield of molten iron than in the operations of Nos. 3 and 4.

Nos. 32 and 33 represent the operations in which pulverized coal and a comparatively large amount of waste plastics were injected from the tuyere according to the method of the present invention and air was introduced into the shaft for secondary combustion. In these operations, unburnt char in the exhaust gas was lost by the secondary combustion and hence HCl released itself from unburnt char and moved into the exhaust gas. Thus the exhaust gas contained HCl in extremely high concentration.

Example 3

Molten iron was produced from scrap by using the same test furnace as used in Example 2. Pulverized coal and coke were identical with those used in Example 1. Waste plastics (in the form of powder and granule) having an average particle diameter of 0.2–1 mm was used. In some comparative examples, air was introduced into the shaft to bring about the secondary combustion of combustion gas. The conditions and results of each run are shown in Tables 11 to 24.

Nos. 1 and 2 (in Table 11) represent the operations in which pulverized coal and waste plastics were not injected (but only oxygen was injected from the tuyere) and coke was the sole heat source (pulverized coal ratio: 0). In operation No. 1, waste plastics was not charged from the furnace top, and in operation No. 2, waste plastics was charged from the furnace top. Nos. 3 to 5 represent the operations in which waste plastics was charged from the furnace top and oxygen and pulverized coal were injected from the burner. They differ in the pulverized coal ratio which increases in the order of No. 3 to No. 5. Nos. 6 to 8 represent the operations in which waste plastics was charged from the furnace top and oxygen, pulverized coal, and waste plastics were injected from the burner. They differ in the pulverized coal ratio plus waste plastics ratio which increases in the order of No. 6 to No. 8.

Nos. 1 and 2, in which pulverized coal and waste plastics were not injected from the tuyere, resulted in a high FeO content in slag owing to the large oxidation zone in the raceway. This led to a poor quality and low yield of molten iron. In addition, they necessarily led to a high production cost because they depend for heat source entirely on coke. Operation No. 1 gave rise to an exhaust gas having a relatively low calorific value because of the absence of waste plastics charged from the furnace top.

Nos. 3 and 6, in which pulverized coal was injected but the PC/$O_2$ ratio and (PC/SR)/$O_2$ ratio were low, resulted in a high FeO content in slag (although not so high as in Nos. 1 and 2). No. 2 is costwise disadvantageous because the coke ratio is relatively high, that is, pulverized coal ratio/coke ratio and (pulverized coal ratio plus waste plastics ratio)/(coke ratio) are about 0.42–0.43.

By contrast, Nos. 4, 5, 7, and 8 resulted in a low FeO content in slag and gave rise to molten iron of good quality in high yields. In addition, they yielded a large amount of high-calorie exhaust gas (4000 kcal/Nm³ or above) owing to efficient combustion despite the fact that a large amount of pulverized coal plus waste plastics in excess of the coke ratio was injected.

Nos. 9 to 12 represent operations by the test furnace equipped with the tuyere shown in FIG. 4, and Nos. 13 to 16 represent operations by the test furnace equipped with the tuyere shown in FIG. 10. In these operations, oxygen and pulverized coal (or pulverized coal plus waste plastics) were injected under almost the same conditions as those in Nos. 4, 5, 7, and 8 mentioned above. Compared with Nos. 4, 5, 7, and 8, these operations are characterized by the better combustibility of pulverized coal and waste plastics. This is indicated by a slightly decreased coke ratio and the reduction of furnace top dust.

Nos. 17 to 19 represent operations in which the ratio of waste plastics charged from the furnace top was increased more than in Nos. 4, 9, and 13. They gave rise to an exhaust gas having a higher calorific value than Nos. 4, 9, and 13.

Nos. 20 to 22 represent operations in which the furnace top temperature was lower than that in Nos. 4, 9, and 13. The lower furnace top temperature resulted in a low tar concentration in the furnace top gas but led to a slow pyrolysis of waste plastics charged from the furnace top in the upper part of the furnace. Therefore, they gave rise to an exhaust gas having a lower calorific value than No. 4. Nos. 23 to 25 represent the operations in which the furnace top temperature was kept lower than those of Nos. 17 to 19. They showed the similar tendency to that mentioned above. Nos. 26 to 28 represent the operations in which pulverized coal plus waste plastics were injected from the tuyere, with the furnace top temperature kept lower than that in Nos. 7, 11, and 15. They showed the similar tendency to that mentioned above.

Nos. 29 to 31 represent the operations in which waste plastics containing polyvinyl chloride resin was charged from the furnace top. It is noted that the concentration of HCl in the exhaust gas was low in all the operations.

Nos. 32 to 35 represent the operations in which the total amount of waste plastics charged from the furnace top and the tuyere was greatly increased relative to the pulverized coal ratio. In these operations, the effect of decreasing the concentration of HCl in the exhaust gas by the injection of a large amount of pulverized coal was relatively lessened and the concentration of HCl in the exhaust gas was relatively higher than in Nos. 7, 8, 11, 12, 15, and 16; however, the extent of increase is not a problem.

Nos. 36 and 37 represent the operations in which pulverized coal (or pulverized coal plus waste plastics [referred to as pulverized coal etc. hereinafter]) and oxygen were injected from the tuyere of conventional type. The $PC/O_2$ ratio or $(PC+SR)/O_2$ ratio was low due to the poor combustion efficiency of pulverized coal. Therefore, these operations needed a larger amount of coke relative to the amount of pulverized coal etc., and this led to a high production cost. In addition, incomplete contact between pulverized coal etc. and oxygen at the tuyere resulted in a high FeO content in slag and a low quality and yield of molten iron.

Nos. 38 and 39 represent the operations in which oxygen-enriched air and pulverized coal etc. were injected from the tuyere of conventional type. In these operations, complete contact between oxygen and pulverized coal etc. was not ensured because of injection of oxygen-enriched air from the conventional tuyere. This resulted in a lower combustion efficiency of pulverized coal etc. than in Nos. 36 and 37. To compensate for this, it was necessary to increase the coke ratio, which led to a high production cost. In addition, the use of oxygen-enriched air (66% $O_2$) gave rise to an exhaust gas of low calorific value (3000 $kcal/Nm^3$), and the incomplete contact between pulverized coal etc. and oxygen at the tuyere resulted in a high FeO content in slag and a low quality and yield of molten iron.

Nos. 40 and 41 represent the operations in which oxygen-enriched air and pulverized coal etc. were injected from the tuyere of conventional type and, at the same time, air (for secondary combustion) was introduced into the shaft. In these operations, the fuel ratio was lower than in Nos. 38 and 39; however, the efficiency of combustion of pulverized coal etc. was low and the coke ratio was high for the same reason as in Nos. 38 and 39. This led to a high production cost. The use of oxygen-enriched air (66% $O_2$) for secondary combustion of the combustion gas resulting from pulverized coal etc. gave rise to an exhaust gas of extremely low calorific value (2000 $kcal/Nm^3$ or below). The incomplete contact between pulverized coal etc. and oxygen resulted in a high FeO content in slag and a low quality and yield of molten iron.

Nos. 42 and 43 represent the operations in which oxygen-enriched air and pulverized coal etc. were injected (such that the former encircled the latter) from the tuyere according to the method of the present invention. The injection of oxygen-enriched air resulted in incomplete contact between oxygen and pulverized coal etc., and this led to a low combustion efficiency of pulverized coal etc., which made it necessary to increase the coke ratio and led to a high production cost. The use of oxygen-enriched air (69% $O_2$) gave rise to an exhaust gas of low calorific value (2900 $kcal/Nm^3$ or below). The incomplete contact between pulverized coal etc. and oxygen resulted in a higher FeO content in slag and a lower quality and yield of molten iron than in the operations of Nos. 4, 5, 7, and 8.

Nos. 44 and 45 represent the operations in which oxygen and pulverized coal etc. were injected (such that the former encircled the latter) from the tuyere according to the method of the present invention and air was introduced into the shaft for secondary combustion. In these operations, unburnt char in the exhaust gas was lost by the secondary combustion and hence HCl released itself from unburnt char and moved into the exhaust gas. Thus the exhaust gas contained HCl in high concentrations for the amount of polyvinyl chloride charged.

Nos. 46 and 47 represent the operations in which oxygen-enriched air and pulverized coal etc. were injected (such that the former encircled the latter) from the tuyere according to the method of the present invention and air was introduced into the shaft for secondary combustion. In these operations, the fuel ratio was lower than in Nos. 42 and 43; however, the efficiency of combustion of pulverized coal etc. was low and the coke ratio was high for the same reason as in Nos. 42 and 43. This led to a high production cost. The use of oxygen-enriched air (62% $O_2$) for secondary combustion of the combustion gas resulting from pulverized coal etc. gave rise to an exhaust gas of extremely low calorific value (1500 $kcal/Nm^3$ or below). The incomplete contact between pulverized coal etc. and oxygen resulted in a higher FeO content in slag and a lower quality and yield of molten iron than in Nos. 4, 5, 7, and 8.

Nos. 48 to 51 represent operations with a low fuel ratio. In the operations of Nos. 48 and 49, oxygen-enriched air and pulverized coal etc. were injected (such that the former encircled the latter) from the tuyere according to the method of the present invention. The injection of oxygen-enriched air did not ensure complete contact between oxygen and pulverized coal etc. This resulted in a low combustion efficiency of pulverized coal etc. and made it necessary to increase the coke ratio, which led to a high production cost. The use of oxygen-enriched air (63% $O_2$) resulted in a low-calorie exhaust gas (2700 kcal/Nm³ or below). The operation with a low combustion ratio gave rise to only a small amount of exhaust gas. In addition, the incomplete contact between pulverized coal etc. and oxygen (due to the use of oxygen-enriched air) resulted in a higher FeO content in slag and a lower quality and yield of molten iron than in the operations of Nos. 4, 5, 7, and 8.

Nos. 50 and 51 represent the operations in which oxygen-enriched air and pulverized coal etc. were injected (such that the former encircled the latter) from the tuyere according to the method of the present invention and air was introduced into the shaft for secondary combustion. In these operations, the fuel ratio was lower than in Nos. 48 and 49; however, the efficiency of combustion of pulverized coal etc. was low and the coke ratio was high for the same reason as in Nos. 48 and 49. This led to a high production cost. The use of oxygen-enriched air (63% $O_2$) for secondary combustion of the combustion gas resulting from pulverized coal etc. gave rise to an exhaust gas of extremely low calorific value (1700 kcal/Nm³ or below). The operation with a low combustion ratio gave only a small amount of exhaust gas. The incomplete contact between pulverized coal etc. and oxygen (as in Nos. 48 and 49) resulted in a higher FeO content in slag and a lower quality and yield of molten iron than in Nos. 4, 5, 7, and 8.

Example 4

Molten iron was produced from scrap by using the same test furnace as used in Example 2. Pulverized coal and coke were identical with those used in Example 1. Waste plastics (in the form of powder and granule) having an average particle diameter of 0.2–1 mm was used. Dust was injected from the tuyere used for the injection of pulverized coal etc. Dust is blast furnace dust having the composition as shown in Table 25. In some comparative examples, air was introduced into the shaft to bring about the secondary combustion of combustion gas. The conditions and results of each run are shown in Tables 26 to 46.

Nos. 1 and 2 represent the operations in which only oxygen was injected from the tuyere and pulverized coal and waste plastics were not injected and coke was used as a sole heat source. (The pulverized coal ratio: 0) No.1 represents the operation in which waste plastics was not charged from the furnace top, and No. 2 represents the operation in which waste plastics was charged from the furnace top.

Nos. 1 and 2, in which pulverized coal and waste plastics were not injected, resulted in a high FeO content in slag owing to the large oxidation zone in the raceway. This led to a poor quality and low yield of molten iron. In addition, they necessarily led to a high production cost because they depend for heat source entirely on coke.

Nos. 3 to 25 represent the operations in which waste plastics was injected from the tuyere according to the present invention. Nos. 26 to 58 represent the operations in which waste plastics was injected from the furnace top (or from the furnace top plus tuyere) according to the present invention.

Nos. 3 to 5 represent the operations in which oxygen, pulverized coal, and a small amount of waste plastics were charged from the burner. They differ in the pulverized coal ratio plus waste plastics ratio which increases in the order of No. 3 to No. 5.

The operation of No. 3 resulted in a high FeO content in slag (although not so high as in No. 1) owing to the low (PC+SR)/$O_2$ ratio despite the injection of pulverized coal. In this operation, the ratio of (pulverized coal ratio plus waste plastics ratio) to coke ratio is about 0.36 and the coke ratio is comparatively high. This is disadvantageous for production cost.

By contrast, the operations of Nos. 4 and 5 resulted in a low FeO content in slag and a high quality and yield of molten iron. The operations of Nos. 4 and 5 gave rise to a large amount of exhaust gas of high calorific value (2700 kcal/Nm³ or above) owing to efficient combustion despite the injection of a large amount of pulverized coal plus waste plastics in excess of the coke ratio.

Nos. 6 and 7 represent the operations by the test furnace equipped with the tuyere as shown in FIG. 4, and Nos. 8 and 9 represent the operations by the test furnace equipped with the tuyere as shown in FIG. 10. In these operations, oxygen, pulverized coal, and a small amount of waste plastics (in the form of powder or granule) were injected under almost the same conditions as those in Nos. 4 and 5 mentioned above. Compared with Nos. 4 and 5, these operations permitted better combustion of pulverized coal and waste plastics. The result is a slightly decreased coke ratio and a reduction of furnace top dust.

Nos. 10 to 16 represent the operations in which more waste plastics was injected from the tuyere than those of Nos. 4 and 5 and the amount of polyvinyl chloride in waste plastics increased in the order of No. 10 to No. 16. It is noted that in all the operations the concentration of HCl in the exhaust gas remained low.

Nos. 17 to 19 represent the operations by the test furnace equipped with the tuyere as shown in FIG. 4, and Nos. 20 to 22 represent the operations by the test furnace equipped with the tuyere as shown in FIG. 10. These operations were carried out under almost the same conditions as in Nos. 11, 13, and 15. It is noted that the concentration of HCl in the exhaust gas remained low.

Nos. 23 to 25 represent the operations in which the waste plastics ratio was greatly increased relative to the pulverized coal ratio. It is noted that the concentration of HCl in the exhaust gas was higher than in the operations of Nos. 11 to 22 because the injection of a large amount of pulverized coal relatively lessened the effect of decreasing the concentration of HCl in the exhaust gas.

Nos. 26 to 28 represent the operations in which waste plastics was charged from the furnace top and oxygen and pulverized coal were injected from the burner, with the amount of pulverized coal increasing in the order of No. 26 to No. 28. Nos. 29 to 31 represent the operations in which waste plastics was charged from the furnace top and oxygen, pulverized coal, and waste plastics were injected from the burner, with the amount of pulverized coal plus waste plastics increasing in the order of No. 29 to No. 31.

The operations of Nos. 26 and 29 resulted in a high FeO content in slag because of the low PC/$O_2$ ratio or (PC+SR)/$O_2$ ratio despite the injection of pulverized coal. In these operations, (pulverized coal ratio)/(coke ratio) or (pulverized coal ratio+waste plastics ratio)/(coke ratio) is about 0.42–0.43 or the coke ratio is relatively high, and this is disadvantageous for production cost.

By contrast, the operations of Nos. 27, 28, 30, and 31 resulted in a low FeO content in slag and a high quality and yield of molten iron. In addition, these operations gave rise to a large amount of exhaust gas of high calorific value (4000 kcal/Nm³ or above) because of the efficient combustion despite the injection of a large amount of pulverized coal plus waste plastics in excess of the coke ratio.

Nos. 32 to 35 represent the operations by the test furnace equipped with the tuyere shown in FIG. 4, and Nos. 36 to 39 represent the operations by the test furnace equipped with the tuyere shown in FIG. 10. In these operations, oxygen and pulverized coal (or pulverized coal plus waste plastics) were injected from the burner and the pulverized coal and waste plastics injected from the tuyere burned better than in the operations of Nos. 27, 28, 30, and 31. As the result, the coke ratio is low and the amount of furnace top dust is decreased.

Nos. 40 to 42 represent the operations in which the ratio of waste plastics charged from the furnace top was higher than in the operations of Nos. 27, 32, and 36. These operations gave rise to an exhaust gas of higher calorific value than those of Nos. 27, 32, and 36.

Nos. 43 to 45 represent the operations in which the furnace temperature is lower than in those of Nos. 27, 32, and 36. The decreased furnace top temperature lowers the tar concentration in the furnace top gas but, at the same time, slows down the pyrolysis of waste plastics (charged from the furnace top) at the furnace top. Therefore, these operations gave rise to an exhaust gas of lower calorific value than the operation of No. 27. Nos. 46 to 48 represent the operations in which the furnace top temperature was kept lower than in the operations of Nos. 40 to 42. These operations showed the tendency similar to that mentioned above. Nos. 49 to 51 represent the operations in which pulverized coal and waste plastics were injected from the tuyere and the furnace top temperature was kept lower than in the operations of Nos. 30, 34, and 38. These operations showed the tendency similar to that mentioned above.

Nos. 52 to 54 represent the operations in which waste plastics containing polyvinyl chloride was charged from the furnace top. All of these operations are characterized by the reduced concentrations of HCl in the exhaust gas.

Nos. 55 to 58 represent the operations in which the total amount of waste plastics charged from the furnace top and tuyere is greatly large for the pulverized coal ratio. These operations resulted in an increase in the concentration of HCl in the exhaust gas compared with the operations of Nos. 30, 31, 34, 35, 38, and 39, because such a mode of operation relatively lessens the effect of decreasing the concentration of HCl in the exhaust gas by the injection of a large amount of pulverized coal. However, the extent of increase is too small to cause a problem.

Nos. 59 and 60 represent the operations in which oxygen and pulverized coal (or pulverized coal plus waste plastics) [referred to as waste plastics etc. hereinafter] were injected from the tuyere of conventional type. Due to inefficient combustion of pulverized coal, the $PC/O_2$ ratio or $(PC+SR)/O_2$ ratio remained low. Therefore, these operations needed a large amount of coke for the amount of pulverized coal etc., which led to a high production cost. In addition, the incomplete contact between pulverized coal etc. and oxygen at the tuyere resulted in a high FeO content in slag and a low quality and yield of molten iron.

Nos. 61 and 62 represent the operations in which oxygen-enriched air and pulverized coal were injected from the tuyere of conventional type. The use of the conventional tuyere and oxygen-enriched air prevent the complete contact between oxygen and pulverized coal, and this resulted in a lower combustion efficiency of pulverized coal etc. than in the operations of Nos. 59 and 60 and made it necessary to increase the coke ratio. This leads to a high production cost. In addition, the oxygen-enriched air (66% $O_2$) gave rise to an exhaust gas of low calorific value (3000 $kcal/Nm^3$ or below). The incomplete contact between pulverized coal etc. and oxygen resulted in a high FeO content in slag and a low quality and yield of molten iron.

Nos. 63 and 64 represent the operations in which oxygen-enriched air and pulverized coal etc. were injected from the tuyere of conventional type and air for secondary combustion was introduced into the shaft. These operations are characterized by a lower fuel ratio than in the operations of Nos. 61 and 62; however, they suffer a low combustion efficiency of pulverized coal etc. for the same reasons as in the operations of Nos. 61 and 62. Therefore, they need a high coke ratio, which leads to a high production cost. The use of oxygen-enriched air (66% $O_2$) and the secondary combustion of combustion gas resulting from pulverized coal etc. resulted in an exhaust gas of extremely low calorific value (2000 $kcal/Nm^3$ or below). In addition, the incomplete contact between pulverized coal etc. and oxygen resulted in a high FeO content in slag and a low quality and yield of molten iron as in the operations of Nos. 61 and 62.

Nos. 65 and 66 represent the operations in which oxygen-enriched air and pulverized coal etc. were injected (such that the former encircled the latter) from the tuyere according to the method of the present invention. The injection of oxygen-enriched air does not permit the complete contact between oxygen and pulverized coal etc. This resulted in a low combustion efficiency of pulverized coal etc., a high coke ratio, and a high production cost. The use of oxygen-enriched air (69% $O_2$) resulted in an exhaust gas of low calorific value (2900 $kcal/Nm^3$ or below). In addition, the incomplete contact between pulverized coal etc. and oxygen resulted in a higher FeO content in slag than in the operations of Nos. 27, 28, 30, and 31, and a low quality and yield of molten iron.

Nos. 67 and 68 represent the operations in which oxygen and pulverized coal etc. were injected (such that the former encircled the latter) from the tuyere according to the method of the present invention and air for secondary combustion was introduced into the shaft. In these operations, unburnt char in the exhaust gas was lost by the secondary combustion and hence HCl released itself from unburnt char and moved into the exhaust gas. Thus the exhaust gas contained HCl in high concentrations for the amount of polyvinyl chloride charged.

Nos. 69 and 70 represent the operations in which oxygen-enriched air and pulverized coal etc. were injected (such that the former encircled the latter) from the tuyere according to the method of the present invention and air for secondary combustion was introduced into the shaft. These operations are characterized by a lower fuel ratio than in the operations of Nos. 65 and 66; however, they suffer a low combustion efficiency of pulverized coal etc. for the same reasons as in the operations of Nos. 65 and 66. Therefore, they need a high coke ratio, which leads to a high production cost. The use of oxygen-enriched air (62% $O_2$) and the secondary combustion of combustion gas resulting from pulverized coal etc. resulted in an exhaust gas of extremely low calorific value (1500 $kcal/Nm^3$ or below). In addition, as in Nos. 65 and 66, the incomplete contact between pulverized coal etc. and oxygen resulted in a higher FeO content in slag and a lower quality and yield of molten iron than in the operations of Nos. 27, 28, 30, and 31.

Nos. 71 to 74 represent the operations with a low fuel ratio. Nos. 71 and 72 represent the operations in which oxygen-enriched air and pulverized coal etc. were injected (such that the former encircled the latter) from the tuyere according to the method of the present invention. The injection of oxygen-enriched air does not permit a complete contact between oxygen and pulverized coal etc. This resulted in a low combustion efficiency of pulverized coal etc., a high coke ratio, and a high production cost. The use of oxygen-enriched air (63% $O_2$) resulted in an exhaust gas of low calorific value (2700 kcal/Nm$^3$ or below). In addition, the incomplete contact between pulverized coal etc. and oxygen resulted in a higher FeO content in slag than in the operations of Nos. 27, 28, 30, and 31, and a low quality and yield of molten iron.

Nos. 73 and 74 represent the operations in which oxygen-enriched air and pulverized coal etc. were injected (such that the former encircled the latter) from the tuyere according to the method of the present invention and air for secondary combustion was introduced into the shaft. These operations are characterized by a lower fuel ratio than in the operations of Nos. 71 and 72; however, they suffer a low combustion efficiency of pulverized coal etc. for the same reasons as in the operations of Nos. 71 and 72. Therefore, they need a high coke ratio, which leads to a high production cost. The use of oxygen-enriched air (63% $O_2$) and the secondary combustion of combustion gas resulting from pulverized coal etc. resulted in an exhaust gas of extremely low calorific value (1700 kcal/Nm$^3$ or below). In addition, as in Nos. 71 and 72, the incomplete contact between pulverized coal etc. and oxygen resulted in a higher FeO content in slag and a lower quality and yield of molten iron than in the operations of Nos. 27, 28, 30, and 31.

The above-mentioned operations, which were carried out by keeping the furnace top temperature at 400–800° C., are characterized in that the concentration of zinc in the recovered dust (or furnace top dust) is much higher than that in the dust (blast furnace dust) injected. Thus suggests that zinc contained in scrap (charged from the furnace top) or dust (injected) was adequately captured for concentration by the furnace top dust. In addition, the operations were smooth without duct clogging.

By contrast, in the operations carried out with the furnace top temperature kept at 250° C., the concentration of zinc in the recovered dust (furnace top dust) was almost the same as that in dust (blast furnace dust) injected. In addition, the operations suffered fluctuation in air pressure due to the sticking of zinc to the furnace.

Example 5

The operation by an actual furnace according to the present invention was simulated by using data obtained by the above-mentioned experiments with the test furnace. This simulation assumed a scrap melting furnace with a production capacity of 3000 tons/day. The results are shown in Table 47.

TABLE 1

| VM | FC | Ash |
|---|---|---|
| 33.3 | 59.3 | 7.4 |

TABLE 2

| No. | | | | 1 | 2 | 3 | 4 |
|---|---|---|---|---|---|---|---|
| Division *3 | | | | Com. | Inv. | Inv. | Inv. |
| Structure of tuyere | | | | FIG. 2 | FIG. 3 | FIG. 3 | FIG. 3 |
| [X·1] | [X·2] | | (kg/t · pig) | 540 | 334 | 194 | 106 |
| | [X·3] | | (kg/t · pig) | 120 | 120 | 120 | 120 |
| | [X·4] | | (kg/t · pig) | — | — | 4 | 7 |
| [X·5] | [X·6] | | (kg/t · pig) | — | 110 | 196 | 250 |
| | [X·7] | [X·8] | | — | — | — | — |
| | (kg/t · pig) | [X·9] | | — | 10 | 10 | 10 |
| | PC + SR/$O_2$ *1 | | (kg/Nm$^3$) | — | 0.5 | 1.0 | 1.4 |
| [X·10] | Oxygen *2 | | (Nm$^3$/t · pig) | 293 | 241 | 208 | 188 |
| | Air | | (Nm$^3$/t · pig) | — | — | — | — |
| | Steam | | (kg/t · pig) | 171 | 99 | 48 | 18 |
| | [X·11] | | (° C.) | 2200 | 2200 | 2200 | 2200 |
| | [X·12] | | (Nm$^3$/t · pig) | — | — | — | — |
| [X·13] | [X·14] | | (° C.) | 250 | 250 | 250 | 250 |
| | [X·15] | | (Nm$^3$/t · pig) | 1046 | 840 | 712 | 636 |
| | [X·16] | CO | (%) | 76.7 | 74.5 | 72.1 | 70.1 |
| | | $CO_2$ | (%) | 0.3 | 0.1 | — | — |
| | | $H_2$ | (%) | 22.5 | 22.9 | 23.3 | 23.5 |
| | | $CH_4$ | (%) | — | — | — | — |
| | | $C_2$ | (%) | — | — | — | — |
| | | $C_3$ | (%) | — | — | — | — |
| | | $C_4$ | (%) | — | — | — | — |
| | | $N_2$ | (%) | 0.5 | 2.5 | 4.6 | 6.4 |
| | | HCl | (ppm) | — | — | — | — |
| | [X·17] | | (kcal/Nm$^3$) | 2890 | 2837 | 2775 | 2721 |
| Slag | [X·18] | | (kg/t · pig) | 134 | 117 | 114 | 115 |
| | [X·19] | | (%) | 7.0 | 5.2 | 1.9 | 0.9 |
| | [X·20] | | | 1.1 | 1.1 | 1.1 | 1.1 |
| | [X·21] | | (° C.) | 1530 | 1540 | 1545 | 1530 |
| | [X·22] | | (° C.) | 1470 | 1495 | 1510 | 1505 |
| [X·23] | [X·24] | | (kg/t · pig) | 13.8 | 16.1 | 18.2 | 20.2 |
| | [X·25] | | (wt %) | 0.1 | 0.2 | 0.5 | 1.3 |
| | [X·26] | | (kg/t · pig) | 0.01 | 0.03 | 0.09 | 0.26 |
| [X·27] | | | (mg/Nm$^3$) | 7 | 15 | 21 | 41 |

*1 PC: Pulverized coal ratio (kg/t · pig)
SR: Waste plastics ratio, injected (kg/t · pig)
$O_2$: Flow rate of oxygen (Nm$^3$/t · pig)
*2 Amount of oxygen added to air in Nos. 26 to 31.
*3 Inv.: Inventive example
Com.: Comparative example TABLE 2-continued

| No. | 1 | 2 | 3 | 4 |
|---|---|---|---|---|

[X1]: Charging from furnace top
[X2]: Coke ratio
[X3]: Converter slag ratio
[X4]: Silica ratio
[X5]: Injection from tuyere
[X6]: Pulverized coal
[X7]: Waste plastics
[X8]: Polyvinyl chloride
[X9]: Other than polyvinyl chloride
[X10]: Air blowing
[X11]: Temperature in front of tuyere
[X12]: Air for secondary combustion
[X13]: Furnace top
[X14]: Furnace top temperature
[X15]: Amount of exhaust gas
[X16]: Composition of exhaust gas
[X17]: Calorific value of exhaust gas
[X18]: Slag ratio
[X19]: FeO content in slag
[X20]: CaO + MgO/$SiO_2$ in slag
[X21]: Temperature of slag
[X22]: Temperature of molten iron
[X23]: Furnace top dust
[X24]: Amount formed
[X25]: Concentration of tar
[X26]: Amount of tar formed
[X27]: Concentration of gaseous tar

TABLE 3

| No. | | | 5 | 6 | 7 | 8 |
|---|---|---|---|---|---|---|
| Division *3 | | | Inv. | Inv. | Inv. | Inv. |
| Structure of tuyere | | | FIG. 4 | FIG. 4 | FIG. 10 | FIG. 10 |
| [X1] | [X2] | (kg/t · pig) | 192 | 105 | 192 | 100 |
|  | [X3] | (kg/t · pig) | 121 | 120 | 122 | 119 |
|  | [X4] | (kg/t · pig) | 4 | 3 | 4 | 7 |
| [X5] | [X6] | (kg/t · pig) | 198 | 250 | 197 | 252 |
|  | [X7] | [X8] | — | — | — | — |
|  | (kg/t · pig) | [X9] | 10 | 10 | 10 | 10 |
|  | PC + SR/$O_2$ *1 | (kg/$Nm^3$) | 1.0 | 1.4 | 1.0 | 1.4 |
| [X10] | Oxygen *2 | ($Nm^3$/t · pig) | 210 | 188 | 207 | 188 |
|  | Air | ($Nm^3$/t · pig) | — | — | — | — |
|  | Steam | (kg/t · pig) | 48 | 18 | 47 | 16 |
|  | [X11] | (° C.) | 2200 | 2200 | 2200 | 2200 |
|  | [X12] | ($Nm^3$/t · pig) | — | — | — | — |
| [X13] | [X14] | (° C.) | 250 | 250 | 250 | 250 |
|  | [X15] | ($Nm^3$/t · pig) | 715 | 636 | 712 | 635 |
|  | [X16] | CO (%) | 72.1 | 70.1 | 72.0 | 70.0 |
|  |  | $CO_2$ (%) | — | — | — | — |
|  |  | $H_2$ (%) | 24.1 | 23.5 | 23.8 | 24.3 |
|  |  | $CH_4$ (%) | — | — | — | — |
|  |  | $C_2$ (%) | — | — | — | — |
|  |  | $C_3$ (%) | — | — | — | — |
|  |  | $C_4$ (%) | — | — | — | — |
|  |  | $N_2$ (%) | 3.8 | 6.4 | 4.2 | 5.7 |
|  |  | HCl (ppm) | — | — | — | — |
|  | [X17] | (kcal/$Nm^3$) | 2798 | 2721 | 2788 | 2740 |
| Slag | [X18] | (kg/t · pig) | 116 | 115 | 114 | 114 |
|  | [X19] | (%) | 1.7 | 0.8 | 1.7 | 0.6 |
|  | [X20] |  | 1.1 | 1.1 | 1.1 | 1.1 |
|  | [X21] | (° C.) | 1535 | 1540 | 1545 | 1540 |
|  | [X22] | (° C.) | 1510 | 1510 | 1520 | 1520 |
| [X23] | [X24] | (kg/t · pig) | 16.0 | 17.8 | 15.6 | 17.6 |
|  | [X25] | (wt %) | 0.9 | 1.1 | 1.1 | 0.8 |
|  | [X26] | (kg/t · pig) | 0.14 | 0.20 | 0.17 | 0.14 |
| [X27] |  | (mg/$Nm^3$) | 19 | 29 | 25 | 23 |

*1 PC: Pulverized coal ratio (kg/t · pig)
SR: Waste plastics ratio, injected (kg/t · pig)
$O_2$: Flow rate of oxygen ($Nm^3$/t · pig)
*2 Amount of oxygen added to air in Nos. 26 to 31.
*3 Inv.: Inventive example
Com.: Comparative example
[X1]: Charging from furnace top TABLE 3-continued

| No. | 5 | 6 | 7 | 8 |
|---|---|---|---|---|

[X2]: Coke ratio
[X3]: Converter slag ratio
[X4]: Silica ratio
[X5]: Injection from tuyere
[X6]: Pulverized coal
[X7]: Waste plastics
[X8]: Polyvinyl chloride
[X9]: Other than polyvinyl chloride
[X10]: Air blowing
[X11]: Temperature in front of tuyere
[X12]: Air for secondary combustion
[X13]: Furnace top
[X14]: Furnace top temperature
[X15]: Amount of exhaust gas
[X16]: Composition of exhaust gas
[X17]: Calorific value of exhaust gas
[X18]: Slag ratio
[X19]: FeO content in slag
[X20]: CaO + MgO/SiO$_2$ in slag
[X21]: Temperature of slag
[X22]: Temperature of molten iron
[X23]: Furnace top dust
[X24]: Amount formed
[X25]: Concentration of tar
[X26]: Amount of tar formed
[X27]: Concentration of gaseous tar

TABLE 4

| | No. | | | 9 | 10 | 11 | 12 |
|---|---|---|---|---|---|---|---|
| Division *3 | | | | Inv. | Inv. | Inv. | Inv. |
| Structure of tuyere | | | | FIG. 3 | FIG. 3 | FIG. 3 | FIG. 3 |
| [X1] | [X2] | | (kg/t · pig) | 195 | 194 | 195 | 189 |
| | [X3] | | (kg/t · pig) | 121 | 123 | 122 | 123 |
| | [X4] | | (kg/t · pig) | 6 | 5 | 6 | 6 |
| [X5] | [X6] | | (kg/t · pig) | 132 | 140 | 131 | 127 |
| | [X7] | [X8] | | — | 10 | 10 | 20 |
| | (kg/t · pig) | [X9] | | 80 | 70 | 75 | 80 |
| | PC + SR/O$_2$ *1 | | (kg/Nm$^3$) | 0.9 | 1.0 | 1.0 | 1.0 |
| [X10] | Oxygen *2 | | (Nm$^3$/t · pig) | 225 | 224 | 223 | 231 |
| | Air | | (Nm$^3$/t · pig) | — | — | — | — |
| | Steam | | (kg/t · pig) | 9 | 8 | 9 | 8 |
| | [X11] | | (° C.) | 2300 | 2300 | 2300 | 2300 |
| | [X12] | | (Nm$^3$/t · pig) | — | — | — | — |
| [X13] | [X14] | | (° C.) | 250 | 250 | 250 | 250 |
| | [X15] | | (Nm$^3$/t · pig) | 692 | 673 | 695 | 702 |
| | [X16] | CO | (%) | 69.0 | 71.5 | 68.8 | 72.5 |
| | | CO$_2$ | (%) | 0 | 0.3 | 0.1 | 0.2 |
| | | H$_2$ | (%) | 27.4 | 24.4 | 27.3 | 23.4 |
| | | CH$_4$ | (%) | — | — | — | — |
| | | C$_2$ | (%) | — | — | — | — |
| | | C$_3$ | (%) | — | — | — | — |
| | | C$_4$ | (%) | — | — | — | — |
| | | N$_2$ | (%) | 3.6 | 3.8 | 3.8 | 3.9 |
| | | HCl | (ppm) | 0 | 3 | 3 | 4 |
| | [X17] | | (kcal/Nm$^3$) | 2790 | 2788 | 2781 | 2792 |
| Slag | [X18] | | (kg/t · pig) | 98 | 99 | 98 | 98 |
| | [X19] | | (%) | 0.9 | 0.9 | 1.0 | 0.8 |
| | [X20] | | | 1.1 | 1.1 | 1.1 | 1.1 |
| | [X21] | | (° C.) | 1545 | 1545 | 1540 | 1550 |
| | [X22] | | (° C.) | 1510 | 1515 | 1510 | 1520 |
| [X23] | [X24] | | (kg/t · pig) | 17.4 | 17.6 | 17.3 | 17.3 |
| | [X25] | | (wt %) | 1.7 | 1.6 | 1.6 | 2.0 |
| | [X26] | | (kg/t · pig) | 0.30 | 0.28 | 0.28 | 0.35 |
| [X27] | | | (mg/Nm$^3$) | 89 | 72 | 55 | 118 |

*1 PC: Pulverized coal ratio (kg/t · pig)
SR: Waste plastics ratio, injected (kg/t · pig)
O$_2$: Flow rate of oxygen (Nm$^3$/t · pig)
*2 Amount of oxygen added to air in Nos. 26 to 31.
*3 Inv.: Inventive example
Com.: Comparative example
[X1]: Charging from furnace top
[X2]: Coke ratio

TABLE 4-continued

| No. | 9 | 10 | 11 | 12 |
|---|---|---|---|---|

[X3]: Converter slag ratio
[X4]: Silica ratio
[X5]: Injection from tuyere
[X6]: Pulverized coal
[X7]: Waste plastics
[X8]: Polyvinyl chloride
[X9]: Other than polyvinyl chloride
[X10]: Air blowing
[X11]: Temperature in front of tuyere
[X12]: Air for secondary combustion
[X13]: Furnace top
[X14]: Furnace top temperature
[X15]: Amount of exhaust gas
[X16]: Composition of exhaust gas
[X17]: Calorific value of exhaust gas
[X18]: Slag ratio
[X19]: FeO content in slag
[X20]: CaO + MgO/SiO$_2$ in slag
[X21]: Temperature of slag
[X22]: Temperature of molten iron
[X23]: Furnace top dust
[X24]: Amount formed
[X25]: Concentration of tar
[X26]: Amount of tar formed
[X27]: Concentration of gaseous tar

TABLE 5

| No. | | | | 13 | 14 | 15 | 16 |
|---|---|---|---|---|---|---|---|
| Division *3 | | | | Inv. | Inv. | Inv. | Inv. |
| Structure of tuyere | | | | FIG. 3 | FIG. 3 | FIG. 3 | FIG. 4 |
| [X1] | [X2] | | (kg/t · pig) | 191 | 190 | 192 | 193 |
| | [X3] | | (kg/t · pig) | 122 | 124 | 123 | 121 |
| | [X4] | | (kg/t · pig) | 5 | 5 | 5 | 4 |
| [X5] | [X6] | | (kg/t · pig) | 124 | 140 | 93 | 140 |
| | [X7] | [X8] | | 30 | 50 | 50 | 10 |
| | (kg/t · pig) | [X9] | | 70 | 50 | 80 | 70 |
| | PC + SR/O$_2$ *1 | | (kg/Nm$^3$) | 1.0 | 1.1 | 1.0 | 1.0 |
| [X10] | Oxygen *2 | | (Nm$^3$/t · pig) | 228 | 224 | 224 | 224 |
| | Air | | (Nm$^3$/t · pig) | — | — | — | — |
| | Steam | | (kg/t · pig) | 9 | 9 | 9 | 8 |
| | [X11] | | (° C.) | 2300 | 2300 | 2300 | 2300 |
| | [X12] | | (Nm$^3$/t · pig) | — | — | — | — |
| [X13] | [X14] | | (° C.) | 250 | 250 | 250 | 250 |
| | [X15] | | (Nm$^3$/t · pig) | 685 | 680 | 714 | 674 |
| | [X16] | CO | (%) | 69.7 | 72.5 | 77.3 | 75.4 |
| | | CO$_2$ | (%) | 0.1 | 0.3 | 0.2 | 0.1 |
| | | H$_2$ | (%) | 26.5 | 23.6 | 18.7 | 21.0 |
| | | CH$_4$ | (%) | — | — | — | — |
| | | C$_2$ | (%) | — | — | — | — |
| | | C$_3$ | (%) | — | — | — | — |
| | | C$_4$ | (%) | — | — | — | — |
| | | N$_2$ | (%) | 3.7 | 3.6 | 3.8 | 3.5 |
| | | HCl | (ppm) | 7 | 6 | 7 | 2 |
| | [X17] | | (kcal/Nm$^3$) | 2788 | 2798 | 2822 | 2818 |
| Slag | [X18] | | (kg/t · pig) | 96 | 100 | 90 | 98 |
| | [X19] | | (%) | 0.8 | 1.0 | 1.3 | 0.9 |
| | [X20] | | | 1.1 | 1.1 | 1.1 | 1.1 |
| | [X21] | | (° C.) | 1535 | 1540 | 1530 | 1550 |
| | [X22] | | (° C.) | 1505 | 1505 | 1500 | 1525 |
| [X23] | [X24] | | (kg/t · pig) | 17.1 | 17.5 | 14.2 | 17.4 |
| | [X25] | | (wt %) | 1.7 | 2.4 | 2.4 | 1.1 |
| | [X26] | | (kg/t · pig) | 0.29 | 0.42 | 0.34 | 0.19 |
| [X27] | | | (mg/Nm$^3$) | 89 | 140 | 165 | 58 |

*1 PC: Pulverized coal ratio (kg/t · pig)
SR: Waste plastics ratio, injected (kg/t · pig)
O$_2$: Flow rate of oxygen (Nm$^3$/t · pig)
*2 Amount of oxygen added to air in Nos. 26 to 31.
*3 Inv.: Inventive example
Com.: Comparative example
[X1]: Charging from furnace top
[X2]: Coke ratio
[X3]: Converter slag ratio TABLE 5-continued

| No. | 13 | 14 | 15 | 16 |
|---|---|---|---|---|

[X4]: Silica ratio
[X5]: Injection from tuyere
[X6]: Pulverized coal
[X7]: Waste plastics
[X8]: Polyvinyl chloride
[X9]: Other than polyvinyl chloride
[X10]: Air blowing
[X11]: Temperature in front of tuyere
[X12]: Air for secondary combustion
[X13]: Furnace top
[X14]: Furnace top temperature
[X15]: Amount of exhaust gas
[X16]: Composition of exhaust gas
[X17]: Calorific value of exhaust gas
[X18]: Slag ratio
[X19]: FeO content in slag
[X20]: CaO + MgO/SiO$_2$ in slag
[X21]: Temperature of slag
[X22]: Temperature of molten iron
[X23]: Furnace top dust
[X24]: Amount formed
[X25]: Concentration of tar
[X26]: Amount of tar formed
[X27]: Concentration of gaseous tar

TABLE 6

| | No. | | 17 | 18 | 19 | 20 |
|---|---|---|---|---|---|---|
| Division *3 | | | Inv. | Inv. | Inv. | Inv. |
| Structure of tuyere | | | FIG. 4 | FIG. 4 | FIG. 10 | FIG. 10 |
| [X1] | [X2] | (kg/t · pig) | 188 | 190 | 193 | 188 |
| | [X3] | (kg/t · pig) | 121 | 124 | 121 | 121 |
| | [X4] | (kg/t · pig) | 4 | 5 | 4 | 4 |
| [X5] | [X6] | (kg/t · pig) | 127 | 140 | 140 | 127 |
| | [X7] | [X8] | 20 | 50 | 10 | 20 |
| | (kg/t · pig) | [X9] | 80 | 50 | 70 | 80 |
| | PC + SR/O$_2$ *1 | (kg/Nm$^3$) | 1.0 | 1.1 | 1.0 | 1.0 |
| [X10] | Oxygen *2 | (Nm$^3$/t · pig) | 231 | 224 | 224 | 230 |
| | Air | (Nm$^3$/t · pig) | — | — | — | — |
| | Steam | (kg/t · pig) | 8 | 9 | 8 | 8 |
| | [X11] | (° C.) | 2300 | 2300 | 2300 | 2300 |
| | [X12] | (Nm$^3$/t · pig) | — | — | — | — |
| [X13] | [X14] | (° C.) | 250 | 250 | 250 | 250 |
| | [X15] | (Nm$^3$/t · pig) | 702 | 680 | 674 | 700 |
| | [X16] | CO (%) | 72.8 | 71.9 | 72.7 | 73.2 |
| | | CO$_2$ (%) | 0.2 | 0.2 | 0.1 | 0.1 |
| | | H$_2$ (%) | 23.3 | 24.6 | 23.6 | 23.2 |
| | | CH$_4$ (%) | — | — | — | — |
| | | C$_2$ (%) | — | — | — | — |
| | | C$_3$ (%) | — | — | — | — |
| | | C$_4$ (%) | — | — | — | — |
| | | N$_2$ (%) | 3.7 | 3.3 | 3.6 | 3.5 |
| | | HCl (ppm) | 4 | 5 | 2 | 3 |
| | [X17] | (kcal/Nm$^3$) | 2799 | 2805 | 2804 | 2808 |
| Slag | [X18] | (kg/t · pig) | 98 | 100 | 99 | 98 |
| | [X19] | (%) | 0.8 | 0.9 | 0.9 | 0.8 |
| | [X20] | | 1.1 | 1.1 | 1.1 | 1.1 |
| | [X21] | (° C.) | 1535 | 1545 | 1540 | 1530 |
| | [X22] | (° C.) | 1515 | 1520 | 1520 | 1500 |
| [X23] | [X24] | (kg/t · pig) | 17.2 | 17.3 | 17.1 | 17.0 |
| | [X25] | (wt %) | 2.0 | 2.3 | 0.8 | 1.8 |
| | [X26] | (kg/t · pig) | 0.34 | 0.40 | 0.14 | 0.31 |
| [X27] | | (mg/Nm$^3$) | 121 | 131 | 65 | 135 |

*1 PC: Pulverized coal ratio (kg/t · pig)
SR: Waste plastics ratio, injected (kg/t · pig)
O$_2$: Flow rate of oxygen (Nm$^3$/t · pig)
*2 Amount of oxygen added to air in Nos. 26 to 31.
*3 Inv.: Inventive example
Com.: Comparative example
[X1]: Charging from furnace top
[X2]: Coke ratio
[X3]: Converter slag ratio
[X4]: Silica ratio

TABLE 6-continued

| No. | 17 | 18 | 19 | 20 |
|---|---|---|---|---|

[※5]: Injection from tuyere
[※6]: Pulverized coal
[※7]: Waste plastics
[※8]: Polyvinyl chloride
[※9]: Other than polyvinyl chloride
[※10]: Air blowing
[※11]: Temperature in front of tuyere
[※12]: Air for secondary combustion
[※13]: Furnace top
[※14]: Furnace top temperature
[※15]: Amount of exhaust gas
[※16]: Composition of exhaust gas
[※17]: Calorific value of exhaust gas
[※18]: Slag ratio
[※19]: FeO content in slag
[※20]: CaO + MgO/SiO$_2$ in slag
[※21]: Temperature of slag
[※22]: Temperature of molten iron
[※23]: Furnace top dust
[※24]: Amount formed
[※25]: Concentration of tar
[※26]: Amount of tar formed
[※27]: Concentration of gaseous tar

TABLE 7

| No. | | | 21 | 22 | 23 | 24 |
|---|---|---|---|---|---|---|
| Division *3 | | | Inv. | Inv. | Inv. | Inv. |
| Structure of tuyere | | | FIG. 10 | FIG. 3 | FIG. 3 | FIG. 3 |
| [※1] | [※2] | (kg/t · pig) | 190 | 193 | 193 | 193 |
| | [※3] | (kg/t · pig) | 124 | 122 | 122 | 122 |
| | [※4] | (kg/t · pig) | 5 | 5 | 6 | 5 |
| [※5] | [※6] | (kg/t · pig) | 140 | 69 | 46 | 22 |
| | [※7] | [※8] | 50 | 20 | 20 | 20 |
| | (kg/t · pig) | [※9] | 50 | 125 | 140 | 155 |
| | PC + SR/O$_2$ *1 | (kg/Nm$^3$) | 1.1 | 1.0 | 0.9 | 0.9 |
| [※10] | Oxygen *2 | (Nm$^3$/t · pig) | 224 | 223 | 223 | 223 |
| | Air | (Nm$^3$/t · pig) | — | — | — | — |
| | Steam | (kg/t · pig) | 9 | 9 | 8 | 9 |
| | [※11] | (° C.) | 2300 | 2300 | 2300 | 2300 |
| | [※12] | (Nm$^3$/t · pig) | — | — | — | — |
| [※13] | [※14] | (° C.) | 250 | 250 | 250 | 250 |
| | [※15] | (Nm$^3$/t · pig) | 680 | 710 | 729 | 738 |
| | [※16] | CO (%) | 72.4 | 73.7 | 75.7 | 78.9 |
| | | CO$_2$ (%) | 0.1 | 0.2 | 0.3 | 0.2 |
| | | H$_2$ (%) | 24.2 | 22.6 | 20.7 | 17.4 |
| | | CH$_4$ (%) | — | — | — | — |
| | | C$_2$ (%) | — | — | — | — |
| | | C$_3$ (%) | — | — | — | — |
| | | C$_4$ (%) | — | — | — | — |
| | | N$_2$ (%) | 3.3 | 3.5 | 3.3 | 3.5 |
| | | HCl (ppm) | 2 | 27 | 53 | 95 |
| | [※17] | (kcal/Nm$^3$) | 2810 | 2808 | 2819 | 2831 |
| Slag | [※18] | (kg/t · pig) | 99 | 82 | 77 | 73 |
| | [※19] | (%) | 0.8 | 1.3 | 1.2 | 1.8 |
| | [※20] | | 1.1 | 1.1 | 1.1 | 1.1 |
| | [※21] | (° C.) | 1540 | 1540 | 1545 | 1530 |
| | [※22] | (° C.) | 1505 | 1510 | 1520 | 1500 |
| [※23] | [※24] | (kg/t · pig) | 16.9 | 15.0 | 14.7 | 14.4 |
| | [※25] | (wt %) | 1.9 | 2.8 | 2.6 | 3.7 |
| | [※26] | (kg/t · pig) | 0.32 | 0.42 | 0.38 | 0.53 |
| [※27] | | (mg/Nm$^3$) | 157 | 218 | 251 | 315 |

*1 PC: Pulverized coal ratio (kg/t · pig)
SR: Waste plastics ratio, injected (kg/t · pig)
O$_2$: Flow rate of oxygen (Nm$^3$/t · pig)
*2 Amount of oxygen added to air in Nos. 26 to 31.
*3 Inv.: Inventive example
Com.: Comparative example
[※1]: Charging from furnace top
[※2]: Coke ratio
[※3]: Converter slag ratio
[※4]: Silica ratio
[※5]: Injection from tuyere TABLE 7-continued

| No. | 21 | 22 | 23 | 24 |
|---|---|---|---|---|

[X·6]: Pulverized coal
[X·7]: Waste plastics
[X·8]: Polyvinyl chloride
[X·9]: Other than polyvinyl chloride
[X·10]: Air blowing
[X·11]: Temperature in front of tuyere
[X·12]: Air for secondary combustion
[X·13]: Furnace top
[X·14]: Furnace top temperature
[X·15]: Amount of exhaust gas
[X·16]: Composition of exhaust gas
[X·17]: Calorific value of exhaust gas
[X·18]: Slag ratio
[X·19]: FeO content in slag
[X·20]: CaO + MgO/$SiO_2$ in slag
[X·21]: Temperature of slag
[X·22]: Temperature of molten iron
[X·23]: Furnace top dust
[X·24]: Amount formed
[X·25]: Concentration of tar
[X·26]: Amount of tar formed
[X·27]: Concentration of gaseous tar

TABLE 8

| No. | | | 25 | 26 | 27 |
|---|---|---|---|---|---|
| Division *3 | | | Com. | Com. | Com. |
| Structure of tuyere | | | FIG. 22 | FIG. 22 | FIG. 22 |
| [X·1] | [X·2] | (kg/t · pig) | 298 | 322 | 275 |
| | [X·3] | (kg/t · pig) | 121 | 124 | 110 |
| | [X·4] | (kg/t · pig) | 6 | 5 | 5 |
| [X·5] | [X·6] | (kg/t · pig) | 105 | 90 | 81 |
| | [X·7] | [X·8] | — | — | — |
| | (kg/t · pig) | [X·9] | 50 | 50 | 50 |
| | PC + SR/$O_2$ *1 | (kg/$Nm^3$) | 0.7 | 0.7 | 0.8 |
| [X·10] | Oxygen *2 | ($Nm^3$/t · pig) | 221 | 174 | 142 |
| | Air | ($Nm^3$/t · pig) | — | 131 | 105 |
| | Steam | (kg/t · pig) | 73 | 39 | 26 |
| | [X·11] | (° C.) | 2200 | 2200 | 2200 |
| | [X·12] | ($Nm^3$/t · pig) | — | — | 100 |
| [X·13] | [X·14] | (° C.) | 250 | 250 | 285 |
| | [X·15] | ($Nm^3$/t · pig) | 734 | 704 | 690 |
| | [X·16] | CO (%) | 75.5 | 67.0 | 48.6 |
| | | $CO_2$ (%) | — | 0.1 | 10.1 |
| | | $H_2$ (%) | 21.8 | 18.1 | 11.7 |
| | | $CH_4$ (%) | — | — | — |
| | | $C_2$ (%) | — | — | — |
| | | $C_3$ (%) | — | — | — |
| | | $C_4$ (%) | — | — | — |
| | | $N_2$ (%) | 2.7 | 14.8 | 29.6 |
| | | HCl (ppm) | — | — | — |
| | [X·17] | (kcal/$Nm^3$) | 2840 | 2489 | 1768 |
| Slag | [X·18] | (kg/t · pig) | 120 | 119 | 113 |
| | [X·19] | (%) | 4.1 | 4.5 | 4.6 |
| | [X·20] | | 1.1 | 1.1 | 1.1 |
| | [X·21] | (° C.) | 1535 | 1540 | 1550 |
| | [X·22] | (° C.) | 1500 | 1510 | 1515 |
| [X·23] | [X·24] | (kg/t · pig) | 14.6 | 14.2 | 13.5 |
| | [X·25] | (wt %) | 1.5 | 0.7 | 0.8 |
| | [X·26] | (kg/t · pig) | 0.22 | 0.10 | 0.11 |
| [X·27] | | (mg/$Nm^3$) | 67 | 21 | 33 |

*1 PC: Pulverized coal ratio (kg/t · pig)
SR: Waste plastics ratio, injected (kg/t · pig)
$O_2$: Flow rate of oxygen ($Nm^3$/t · pig)
*2 Amount of oxygen added to air in Nos. 26 to 31.
*3 Inv.: Inventive example
Com.: Comparative example
[X·1]: Charging from furnace top
[X·2]: Coke ratio
[X·3]: Converter slag ratio
[X·4]: Silica ratio
[X·5]: Injection from tuyere
[X·6]: Pulverized coal
[X·7]: Waste plastics
[X·8]: Polyvinyl chloride
[X·9]: Other than polyvinyl chloride
[X·10]: Air blowing
[X·11]: Temperature in front of tuyere
[X·12]: Air for secondary combustion
[X·13]: Furnace top
[X·14]: Furnace top temperature
[X·15]: Amount of exhaust gas
[X·16]: Composition of exhaust gas
[X·17]: Calorific value of exhaust gas
[X·18]: Slag ratio
[X·19]: FeO content in slag
[X·20]: CaO + MgO/$SiO_2$ in slag
[X·21]: Temperature of slag
[X·22]: Temperature of molten iron
[X·23]: Furnace top dust
[X·24]: Amount formed
[X·25]: Concentration of tar
[X·26]: Amount of tar formed
[X·27]: Concentration of gaseous tar

TABLE 9

| No. | | | 28 | 29 | 30 |
|---|---|---|---|---|---|
| Division *3 | | | Com. | Com. | Com. |
| Structure of tuyere | | | FIG. 3 | FIG. 3 | FIG. 3 |
| [X·1] | [X·2] | (kg/t · pig) | 212 | 184 | 155 |
| | [X·3] | (kg/t · pig) | 121 | 113 | 97 |
| | [X·4] | (kg/t · pig) | 5 | 6 | 4 |
| [X·5] | [X·6] | (kg/t · pig) | 148 | 125 | 90 |
| | [X·7] | [X·8] | — | — | — |
| | (kg/t · pig) | [X·9] | 50 | 50 | 50 |
| | PC + SR/$O_2$ *1 | (kg/$Nm^3$) | 1.0 | 1.0 | 0.8 |
| [X·10] | Oxygen *2 | ($Nm^3$/t · pig) | 175 | 148 | 147 |
| | Air | ($Nm^3$/t · pig) | 113 | 133 | 131 |
| | Steam | (kg/t · pig) | 18 | 10 | 23 |
| | [X·11] | (° C.) | 2200 | 2200 | 2200 |
| | [X·12] | ($Nm^3$/t · pig) | — | 100 | — |
| [X·13] | [X·14] | (° C.) | 250 | 285 | 185 |
| | [X·15] | ($Nm^3$/t · pig) | 673 | 687 | 610 |
| | [X·16] | CO (%) | 64.2 | 48.4 | 64.0 |
| | | $CO_2$ (%) | — | 10.4 | — |
| | | $H_2$ (%) | 16.4 | 11.6 | 12.9 |

TABLE 9-continued

| | | No. | 28 | 29 | 30 |
|---|---|---|---|---|---|
| | $CH_4$ | (%) | — | — | — |
| | $C_2$ | (%) | — | — | — |
| | $C_3$ | (%) | — | — | — |
| | $C_4$ | (%) | — | — | — |
| | $N_2$ | (%) | 19.4 | 29.6 | 23.1 |
| | HCl | (ppm) | — | — | — |
| | [X·17] | (kcal/Nm³) | 2360 | 1759 | 2264 |
| Slag | [X·18] | (kg/t · pig) | 104 | 101 | 94 |
| | [X·19] | (%) | 2.3 | 2.3 | 2.3 |
| | [X·20] | | 1.1 | 1.1 | 1.1 |
| | [X·21] | (° C.) | 1545 | 1550 | 1535 |
| | [X·22] | (° C.) | 1520 | 1515 | 1495 |
| [X·23] | [X·24] | (kg/t · pig) | 17.1 | 16.2 | 16.6 |
| | [X·25] | (wt %) | 0.8 | 1.3 | 1.1 |
| | [X·26] | (kg/t · pig) | 0.14 | 0.21 | 0.18 |
| [X·27] | | (mg/Nm³) | 49 | 55 | 38 |

*1 PC: Pulverized coal ratio (kg/t · pig)
SR: Waste plastics ratio, injected (kg/t · pig)
$O_2$: Flow rate of oxygen (Nm³/t · pig)
*2 Amount of oxygen added to air in Nos. 26 to 31.
*3 Inv.: Inventive example
Com.: Comparative example
[X·1]: Charging from furnace top
[X·2]: Coke ratio
[X·3]: Converter slag ratio
[X·4]: Silica ratio
[X·5]: Injection from tuyere
[X·6]: Pulverized coal
[X·7]: Waste plastics
[X·8]: Polyvinyl chloride
[X·9]: Other than polyvinyl chloride
[X·10]: Air blowing
[X·11]: Temperature in front of tuyere
[X·12]: Air for secondary combustion
[X·13]: Furnace top
[X·14]: Furnace top temperature
[X·15]: Amount of exhaust gas
[X·16]: Composition of exhaust gas
[X·17]: Calorific value of exhaust gas
[X·18]: Slag ratio
[X·19]: FeO content in slag
[X·20]: CaO + MgO/$SiO_2$ in slag
[X·21]: Temperature of slag
[X·22]: Temperature of molten iron
[X·23]: Furnace top dust
[X·24]: Amount formed
[X·25]: Concentration of tar
[X·26]: Amount of tar formed
[X·27]: Concentration of gaseous tar

TABLE 10

| | | No. | 31 | 32 | 33 |
|---|---|---|---|---|---|
| Division *3 | | | Com. | Com. | Com. |
| Structure of tuyere | | | FIG. 3 | FIG. 3 | FIG. 3 |
| [X·1] | [X·2] | (kg/t · pig) | 130 | 160 | 160 |
| | [X·3] | (kg/t · pig) | 95 | 123 | 124 |
| | [X·4] | (kg/t · pig) | 4 | 6 | 5 |
| [X·5] | [X·6] | (kg/t · pig) | 65 | 125 | 140 |
| | [X·7] | [X·8] | — | 20 | 50 |
| (kg/t · pig) | | [X·9] | 50 | 80 | 50 |
| | PC + SR/$O_2$ *1 | (kg/Nm³) | 0.8 | 1.0 | 1.1 |
| [X·10] | Oxygen *2 | (Nm³/t · pig) | 122 | 225 | 224 |
| | Air | (Nm³/t · pig) | 107 | — | — |
| | Steam | (kg/t · pig) | 20 | 9 | 9 |
| | [X·11] | (° C.) | 2200 | 2300 | 2300 |
| | [X·12] | (Nm³/t · pig) | 75 | 200 | 200 |
| [X·13] | [X·14] | (° C.) | 225 | 295 | 285 |
| | [X·15] | (Nm³/t · pig) | 565 | 725 | 707 |
| | [X·16] | CO (%) | 48.0 | 65.7 | 66.5 |
| | | $CO_2$ (%) | 10.7 | 11.6 | 10.9 |
| | | $H_2$ (%) | 11.1 | 19.0 | 18.8 |
| | | $CH_4$ (%) | — | — | — |

TABLE 10-continued

| | | No. | 31 | 32 | 33 |
|---|---|---|---|---|---|
| | $C_2$ | (%) | — | — | — |
| | $C_3$ | (%) | — | — | — |
| | $C_4$ | (%) | — | — | — |
| | $N_2$ | (%) | 30.2 | 3.7 | 3.8 |
| | HCl | (ppm) | — | 138 | 507 |
| | [X·17] | (kcal/Nm³) | 1735 | 2283 | 2289 |
| Slag | [X·18] | (kg/t · pig) | 82 | 94 | 95 |
| | [X·19] | (%) | 2.4 | 1.0 | 0.7 |
| | [X·20] | | 1.1 | 1.1 | 1.1 |
| | [X·21] | (° C.) | 1530 | 1535 | 1535 |
| | [X·22] | (° C.) | 1500 | 1505 | 1510 |
| [X·23] | [X·24] | (kg/t · pig) | 15.5 | 12.9 | 13.0 |
| | [X·25] | (wt %) | 0.9 | 0.1 | 0.1 |
| | [X·26] | (kg/t · pig) | 0.14 | 0.01 | 0.01 |
| [X·27] | | (mg/Nm³) | 28 | 3 | 2 |

*1 PC: Pulverized coal ratio (kg/t · pig)
SR: Waste plastics ratio, injected (kg/t · pig)
$O_2$: Flow rate of oxygen (Nm³/t · pig)
*2 Amount of oxygen added to air in Nos. 26 to 31.
*3 Inv.: Inventive example
Com.: Comparative example
[X·1]: Charging from furnace top
[X·2]: Coke ratio
[X·3]: Converter slag ratio
[X·4]: Silica ratio
[X·5]: Injection from tuyere
[X·6]: Pulverized coal
[X·7]: Waste plastics
[X·8]: Polyvinyl chloride
[X·9]: Other than polyvinyl chloride
[X·10]: Air blowing
[X·11]: Temperature in front of tuyere
[X·12]: Air for secondary combustion
[X·13]: Furnace top
[X·14]: Furnace top temperature
[X·15]: Amount of exhaust gas
[X·16]: Composition of exhaust gas
[X·17]: Calorific value of exhaust gas
[X·18]: Slag ratio
[X·19]: FeO content in slag
[X·20]: CaO + MgO/$SiO_2$ in slag
[X·21]: Temperature of slag
[X·22]: Temperature of molten iron
[X·23]: Furnace top dust
[X·24]: Amount formed
[X·25]: Concentration of tar
[X·26]: Amount of tar formed
[X·27]: Concentration of gaseous tar

TABLE 11

| | No. | | 1 | 2 | 3 | 4 |
|---|---|---|---|---|---|---|
| Division *3 | | | Com. | Com. | Inv. | Inv. |
| Structure of tuyere | | | FIG. 2 | FIG. 2 | FIG. 2 | FIG. 2 |
| [X·1] | [X·2] | (kg/t · pig) | 420 | 404 | 282 | 191 |
| | [X·3] | (kg/t · pig) | 120 | 120 | 120 | 120 |
| | [X·4] | (kg/t · pig) | — | — | — | 5 |
| [X·5] | [X·7] | [X·8] | — | — | — | — |
| | (kg/t · pig) | [X·9] | — | 20 | 20 | 20 |
| | [X·6] | (kg/t · pig) | — | — | 120 | 216 |
| | [X·7] | [X·8] | — | — | — | — |
| | (kg/t · pig) | [X·9] | — | — | — | — |
| | PC/O$_2$ *1 | (kg/Nm$^3$) | — | — | 0.61 | 1.02 |
| | PC + SR/O$_2$ *1 | (kg/Nm$^3$) | — | — | — | — |
| [X·10] | Oxygen *2 | (Nm$^3$/t · pig) | 221 | 222 | 197 | 212 |
| | Air | (Nm$^3$/t · pig) | — | — | — | — |
| | Steam | (kg/t · pig) | 128 | 129 | 66 | 38 |
| | [X·11] | (° C.) | 2300 | 2300 | 2300 | 2300 |
| | [X·12] | (Nm$^3$/t · pig) | — | — | — | — |
| [X·13] | [X·14] | (° C.) | 510 | 510 | 510 | 510 |
| | [X·15] | (Nm$^3$/t · pig) | 760 | 765 | 643 | 668 |
| | [X·16] | CO (%) | 79.8 | 72.0 | 70.5 | 71.0 |
| | | CO$_2$ (%) | — | — | — | — |
| | | H$_2$ (%) | 14.7 | 17.9 | 14.3 | 15.0 |
| | | CH$_4$ (%) | — | 2.4 | 4.8 | 5.0 |
| | | C$_2$ (%) | — | 0.7 | 1.4 | 1.5 |
| | | C$_3$ (%) | — | 1.2 | 3.1 | 3.0 |
| | | C$_4$ (%) | — | 0.6 | 0.7 | 1.0 |
| | | N$_2$ (%) | 5.5 | 5.2 | 5.2 | 3.5 |
| | | HCl (ppm) | — | — | — | — |
| | [X·17] | (kcal/Nm$^3$) | 2788 | 3368 | 3968 | 4098 |
| Slag | [X·18] | (kg/t · pig) | 126 | 124 | 114 | 117 |
| | [X·19] | (%) | 4.8 | 4.7 | 1.3 | 0.9 |
| | [X·20] | | 1.1 | 1.1 | 1.1 | 1.1 |
| | [X·21] | (° C.) | 1540 | 1530 | 1525 | 1535 |
| | [X·22] | (° C.) | 1515 | 1510 | 1500 | 1500 |
| [X·23] | [X·24] | (kg/t · pig) | 13.0 | 12.9 | 13.2 | 20.1 |
| | [X·25] | (wt %) | 1.0 | 6.9 | 4.8 | 0.9 |
| | [X·26] | (kg/t · pig) | 0.1 | 0.9 | 0.2 | 0.1 |
| [X·27] | | (mg/Nm$^3$) | 50 | 857 | 732 | 645 |

*1 PC: Pulverized coal ratio (kg/t · pig)
SR: Waste plastics ratio, injected (kg/t · pig)
O$_2$: Flow rate of oxygen (Nm$^3$/t · pig)
*2 Amount of oxygen added to air in Nos. 26 to 31.
*3 Inv.: Inventive example
Com.: Comparative example
[X·1]: Charging from furnace top
[X·2]: Coke ratio
[X·3]: Converter slag ratio
[X·4]: Silica ratio
[X·5]: Injection from tuyere
[X·6]: Pulverized coal
[X·7]: Waste plastics
[X·8]: Polyvinyl chloride
[X·9]: Other than polyvinyl chloride
[X·10]: Air blowing
[X·11]: Temperature in front of tuyere
[X·12]: Air for secondary combustion
[X·13]: Furnace top
[X·14]: Furnace top temperature
[X·15]: Amount of exhaust gas
[X·16]: Composition of exhaust gas
[X·17]: Calorific value of exhaust gas
[X·18]: Slag ratio
[X·19]: FeO content in slag
[X·20]: CaO + MgO/SiO$_2$ in slag
[X·21]: Temperature of slag
[X·22]: Temperature of molten iron
[X·23]: Furnace top dust
[X·24]: Amount formed
[X·25]: Concentration of tar
[X·26]: Amount of tar formed
[X·27]: Concentration of gaseous tar

TABLE 12

| No. | | 5 | 6 | 7 | 8 |
|---|---|---|---|---|---|
| Division *3 | | Inv. | Inv. | Inv. | Inv. |
| Structure of tuyere | | FIG. 2 | FIG. 3 | FIG. 3 | FIG. 3 |
| [X1] | [X2] (kg/t · pig) | 259 | 281 | 194 | 265 |
| | [X3] (kg/t · pig) | 121 | 120 | 120 | 121 |
| | [X4] (kg/t · pig) | 5 | 4 | 4 | 5 |
| | [X7]    [X8] | — | — | — | — |
| | (kg/t · pig) [X9] | 20 | 20 | 20 | 20 |
| [X5] | [X6] (kg/t · pig) | 282 | 74 | 133 | 115 |
| | [X7]    [X8] | — | — | — | — |
| | (kg/t · pig) [X9] | — | 45 | 80 | 105 |
| | PC/O$_2$ *1 (kg/Nm$^3$) | 1.38 | — | — | — |
| | PC + SR/O$_2$*1 (kg/Nm$^3$) | — | 0.60 | 1.00 | 1.36 |
| [X10] | Oxygen *2 (Nm$^3$/t · pig) | 204 | 198 | 214 | 206 |
| | Air (Nm$^3$/t · pig) | — | — | — | — |
| | Steam (kg/t · pig) | 7 | 66 | 8 | 7 |
| | [X11] (° C.) | 2300 | 2300 | 2300 | 2300 |
| | [X12] (Nm$^3$/t · pig) | — | — | — | — |
| [X13] | [X14] (° C.) | 510 | 510 | 510 | 510 |
| | [X15] (Nm$^3$/t · pig) | 621 | 654 | 686 | 630 |
| | [X16]  CO (%) | 62.9 | 76.6 | 65.3 | 1.3 |
| | CO$_2$ (%) | — | — | — | — |
| | H$_2$ (%) | 21.5 | 15.1 | 22.9 | 25.1 |
| | CH$_4$ (%) | 5.8 | 3.0 | 5.7 | 5.9 |
| | C$_2$ (%) | 1.5 | 0.7 | 1.2 | 1.3 |
| | C$_3$ (%) | 3.0 | 1.1 | 2.9 | 3.0 |
| | C$_4$ (%) | 1.1 | 0.3 | 0.9 | 0.9 |
| | N$_2$ (%) | 4.2 | 3.2 | 1.1 | 2.5 |
| | HCl (ppm) | — | — | — | — |
| | [X17] (kcal/Nm$^3$) | 4117 | 3380 | 4096 | 4084 |
| Slag | [X18] (kg/t · pig) | 115 | 104 | 108 | 100 |
| | [X19] (%) | 0.8 | 1.6 | 1.4 | 1.0 |
| | [X20] | 1.1 | 1.1 | 1.1 | 1.1 |
| | [X21] (° C.) | 1540 | 1540 | 1545 | 1550 |
| | [X22] (° C.) | 1510 | 1520 | 1520 | 1520 |
| [X23] | [X24] (kg/t · pig) | 21.3 | 13.0 | 14.8 | 18.5 |
| | [X25] (wt %) | 0.5 | 0.5 | 2.9 | 3.7 |
| | [X26] (kg/t · pig) | 0.1 | 0.1 | 0.1 | 0.7 |
| [X27] | (mg/Nm$^3$) | 520 | 798 | 725 | 859 |

*1 PC: Pulverized coal ratio (kg/t · pig) SR: Waste plastics ratio, injected (kg/t · pig) O$_2$: Flow rate of oxygen (Nm$^3$/t · pig)
*2 Amount of oxygen added to air in Nos. 38 to 43, Nos. 46 to 51.
*3 Inv.: Inventive example Com.: Comparative example
[X1] : Charging from furnace top
[X2] : Coke ratio
[X3] : Converter slag ratio
[X4] : Silica ratio
[X5] : Injection from tuyere
[X6] : Pulverized coal
[X7] : Waste plastics
[X8] : Polyvinyl chloride
[X9] : Other than polyvinyl chloride
[X10] : Air blowing
[X11] : Temperature in front of tuyere
[X12] : Air for secondary combustion
[X13] : Furnace top
[X14] : Furnace top temperature
[X15] : Amount of exhaust gas
[X16] : Composition of exhaust gas
[X17] : Calorific value of exhaust gas
[X18] : Slag ratio
[X19] : FeO content in slag
[X20] : CaO + MgO/SiO$_2$ in slag
[X21] : Temperature of slag
[X22] : Temperature of molten iron
[X23] : Furnace top dust
[X24] : Amount formed
[X25] : Concentration of tar
[X26] : Amount of tar formed
[X27] : Concentration of gaseous tar

TABLE 13

| No. | | 9 | 10 | 11 | 12 |
|---|---|---|---|---|---|
| Division *3 | | Inv. | Inv. | Inv. | Inv. |
| Structure of tuyere | | FIG. 4 | FIG. 4 | FIG. 4 | FIG. 4 |
| [X1] | [X2] (kg/t · pig) | 190 | 257 | 193 | 264 |
| | [X3] (kg/t · pig) | 120 | 120 | 120 | 120 |
| | [X4] (kg/t · pig) | 5 | 5 | 4 | 4 |
| | [X7]    [X8] | — | — | — | — |
| | (kg/t · pig) [X9] | 20 | 20 | 20 | 20 |
| [X5] | [X6] (kg/t · pig) | 218 | 282 | 133 | 175 |
| | [X7]    [X8] | — | — | — | — |
| | (kg/t · pig) [X9] | — | — | 80 | 105 |
| | PC/O$_2$ *1 (kg/Nm$^3$) | 1.02 | 1.38 | — | — |
| | PC + SR/O$_2$*1 (kg/Nm$^3$) | — | — | 1.00 | 1.36 |
| [X10] | Oxygen *2 (Nm$^3$/t · pig) | 212 | 204 | 214 | 205 |
| | Air (Nm$^3$/t · pig) | — | — | — | — |
| | Steam (kg/t · pig) | 38 | 7 | 8 | 7 |
| | [X11] (° C.) | 2300 | 2300 | 2300 | 2300 |
| | [X12] (Nm$^3$/t · pig) | — | — | — | — |
| [X13] | [X14] (° C.) | 510 | 510 | 510 | 510 |
| | [X15] (Nm$^3$/t · pig) | 670 | 622 | 688 | 631 |
| | [X16]  CO (%) | 70.5 | 62.0 | 64.9 | 61.5 |
| | CO$_2$ (%) | — | — | — | — |
| | H$_2$ (%) | 15.0 | 22.0 | 25.2 | 26.8 |
| | CH$_4$ (%) | 4.3 | 5.0 | 4.9 | 5.0 |
| | C$_2$ (%) | 1.2 | 1.7 | 0.9 | 0.9 |
| | C$_3$ (%) | 2.9 | 3.0 | 1.8 | 2.1 |
| | C$_4$ (%) | 1.1 | 1.0 | 0.2 | 0.3 |
| | N$_2$ (%) | 5.0 | 5.3 | 2.1 | 3.4 |
| | HCl (ppm) | — | — | — | — |
| | [X17] (kcal/Nm$^3$) | 3985 | 4036 | 3599 | 3637 |
| Slag | [X18] (kg/t · pig) | 117 | 114 | 108 | 101 |
| | [X19] (%) | 1.0 | 0.8 | 0.9 | 0.9 |
| | [X20] | 1.1 | 1.1 | 1.1 | 1.1 |
| | [X21] (° C.) | 1545 | 1535 | 1540 | 1545 |
| | [X22] (° C.) | 1515 | 1500 | 1505 | 1520 |
| [X23] | [X24] (kg/t · pig) | 19.0 | 19.2 | 13.3 | 16.8 |
| | [X25] (wt %) | 0.2 | 0.2 | 0.1 | 0.2 |
| | [X26] (kg/t · pig) | 0.04 | 0.02 | 0.01 | 0.03 |
| [X27] | (mg/Nm$^3$) | 300 | 299 | 431 | 459 |

*1 PC: Pulverized coal ratio (kg/t · pig) SR: Waste plastics ratio, injected (kg/t · pig) O$_2$: Flow rate of oxygen (Nm$^3$/t · pig)
*2 Amount of oxygen added to air in Nos. 38 to 43, Nos. 46 to 51.
*3 Inv.: Inventive example Com.: Comparative example
[X1] : Charging from furnace top
[X2] : Coke ratio
[X3] : Converter slag ratio
[X4] : Silica ratio
[X5] : Injection from tuyere
[X6] : Pulverized coal
[X7] : Waste plastics
[X8] : Polyvinyl chloride
[X9] : Other than polyvinyl chloride
[X10] : Air blowing
[X11] : Temperature in front of tuyere
[X12] : Air for secondary combustion
[X13] : Furnace top
[X14] : Furnace top temperature
[X15] : Amount of exhaust gas
[X16] : Composition of exhaust gas
[X17] : Calorific value of exhaust gas
[X18] : Slag ratio
[X19] : FeO content in slag
[X20] : CaO + MgO/SiO$_2$ in slag
[X21] : Temperature of slag
[X22] : Temperature of molten iron
[X23] : Furnace top dust
[X24] : Amount formed
[X25] : Concentration of tar
[X26] : Amount of tar formed
[X27] : Concentration of gaseous tar

TABLE 14

| No. | | 13 | 14 | 15 | 16 |
|---|---|---|---|---|---|
| Division *3 | | Inv. | Inv. | Inv. | Inv. |
| Structure of tuyere | | FIG. 10 | FIG. 10 | FIG. 10 | FIG. 10 |
| [X1] | [X2] (kg/t · pig) | 190 | 256 | 192 | 264 |
| | [X3] (kg/t · pig) | 120 | 121 | 120 | 121 |
| | [X4] (kg/t · pig) | 4 | 5 | 5 | 5 |
| | [X7] [X8] (kg/t · pig) [X9] | — | — | — | — |
| | | 20 | 20 | 20 | 20 |
| [X5] | [X6] (kg/t · pig) | 219 | 282 | 133 | 177 |
| | [X7] [X8] (kg/t · pig) [X9] | — | — | — | — |
| | | — | — | 80 | 105 |
| | PC/O$_2$ *1 (kg/Nm$^3$) | 1.03 | 1.38 | — | — |
| | PC + SR/O$_2$*1 (kg/Nm$^3$) | — | — | 1.00 | 1.36 |
| [X10] | Oxygen *2 (Nm$^3$/t · pig) | 212 | 204 | 214 | 205 |
| | Air (Nm$^3$/t · pig) | — | — | — | — |
| | Steam (kg/t · pig) | 38 | 7 | 8 | 7 |
| | [X11] (° C.) | 2300 | 2300 | 2300 | 2300 |
| | [X12] (Nm$^3$/t · pig) | — | — | — | — |
| [X13] | [X14] (° C.) | 510 | 510 | 510 | 510 |
| | [X15] (Nm$^3$/t · pig) | 670 | 623 | 683 | 630 |
| | [X16] CO (%) | 71.0 | 64.2 | 61.1 | 62.5 |
| | CO$_2$ (%) | — | — | — | — |
| | H$_2$ (%) | 16.7 | 23.1 | 28.9 | 27.5 |
| | CH$_4$ (%) | 3.9 | 4.1 | 3.1 | 4.2 |
| | C$_2$ (%) | 0.9 | 1.0 | 0.6 | 0.7 |
| | C$_3$ (%) | 2.1 | 2.3 | 1.0 | 0.9 |
| | C$_4$ (%) | 0.3 | 0.5 | 0.1 | 0.2 |
| | N$_2$ (%) | 5.1 | 4.8 | 5.2 | 4.0 |
| | HCl (ppm) | — | — | — | — |
| | [X17] (kcal/Nm$^3$) | 3569 | 3660 | 3184 | 3307 |
| Slag | [X18] (kg/t · pig) | 116 | 115 | 108 | 102 |
| | [X19] (%) | 0.9 | 0.8 | 0.7 | 0.7 |
| | [X20] | 1.1 | 1.1 | 1.1 | 1.1 |
| | [X21] (° C.) | 1530 | 1545 | 1535 | 1530 |
| | [X22] (° C.) | 1495 | 1515 | 1515 | 1510 |
| [X23] | [X24] (kg/t · pig) | 18.8 | 19.1 | 13.2 | 16.5 |
| | [X25] (wt %) | 0.1 | 0.1 | 0.1 | 0.1 |
| | [X26] (kg/t · pig) | 0.02 | 0.02 | 0.01 | 0.02 |
| [X27] | (mg/Nm$^3$) | 58 | 65 | 103 | 121 |

*1 PC: Pulverized coal ratio (kg/t · pig) SR: Waste plastics ratio, injected (kg/t · pig) O$_2$: Flow rate of oxygen (Nm$^3$/t · pig)
*2 Amount of oxygen added to air in Nos. 38 to 43, Nos. 46 to 51.
*3 Inv.: Inventive example Com.: Comparative example
[X1] : Charging from furnace top
[X2] : Coke ratio
[X3] : Converter slag ratio
[X4] : Silica ratio
[X5] : Injection from tuyere
[X6] : Pulverized coal
[X7] : Waste plastics
[X8] : Polyvinyl chloride
[X9] : Other than polyvinyl chloride
[X10] : Air blowing
[X11] : Temperature in front of tuyere
[X12] : Air for secondary combustion
[X13] : Furnace top
[X14] : Furnace top temperature
[X15] : Amount of exhaust gas
[X16] : Composition of exhaust gas
[X17] : Calorific value of exhaust gas
[X18] : Slag ratio
[X19] : FeO content in slag
[X20] : CaO + MgO/SiO$_2$ in slag
[X21] : Temperature of slag
[X22] : Temperature of molten iron
[X23] : Furnace top dust
[X24] : Amount formed
[X25] : Concentration of tar
[X26] : Amount of tar formed
[X27] : Concentration of gaseous tar

TABLE 15

| No. | | 17 | 18 | 19 |
|---|---|---|---|---|
| Division *3 | | Inv. | Inv. | Inv. |
| Structure of tuyere | | FIG. 2 | FIG. 4 | FIG. 10 |
| [X1] | [X2] (kg/t · pig) | 182 | 182 | 181 |
| | [X3] (kg/t · pig) | 123 | 120 | 121 |
| | [X4] (kg/t · pig) | 6 | 4 | 4 |
| | [X7] [X8] (kg/t · pig) [X9] | — | — | — |
| | | 40 | 40 | 40 |
| [X5] | [X6] (kg/t · pig) | 207 | 207 | 209 |
| | [X7] [X8] (kg/t · pig) [X9] | — | — | — |
| | | — | — | — |
| | PC/O$_2$ *1 (kg/Nm$^3$) | 1.01 | 1.01 | 1.02 |
| | PC + SR/O$_2$*1 (kg/Nm$^3$) | — | — | — |
| [X10] | Oxygen *2 (Nm$^3$/t · pig) | 205 | 205 | 204 |
| | Air (Nm$^3$/t · pig) | — | — | — |
| | Steam (kg/t · pig) | 37 | 37 | 36 |
| | [X11] (° C.) | 2300 | 2300 | 2300 |
| | [X12] (Nm$^3$/t · pig) | — | — | — |
| [X13] | [X14] (° C.) | 510 | 510 | 510 |
| | [X15] (Nm$^3$/t · pig) | 673 | 673 | 675 |
| | [X16] CO (%) | 62.3 | 56.4 | 58.9 |
| | CO$_2$ (%) | — | — | — |
| | H$_2$ (%) | 21.4 | 27.9 | 25.1 |
| | CH$_4$ (%) | 5.8 | 6.1 | 5.6 |
| | C$_2$ (%) | 1.9 | 1.9 | 1.5 |
| | C$_3$ (%) | 3.5 | 3.2 | 3.0 |
| | C$_4$ (%) | 1.8 | 1.5 | 0.9 |
| | N$_2$ (%) | 3.3 | 3.0 | 5.0 |
| | HCl (ppm) | — | — | — |
| | [X17] (kcal/Nm$^3$) | 4460 | 4327 | 4015 |
| Slag | [X18] (kg/t · pig) | 110 | 110 | 109 |
| | [X19] (%) | 0.8 | 0.8 | 0.7 |
| | [X20] | 1.1 | 1.1 | 1.1 |
| | [X21] (° C.) | 1540 | 1530 | 1550 |
| | [X22] (° C.) | 1515 | 1510 | 1520 |
| [X23] | [X24] (kg/t · pig) | 17.9 | 17.6 | 17.6 |
| | [X25] (wt %) | 2.1 | 0.4 | 0.3 |
| | [X26] (kg/t · pig) | 0.2 | 0.1 | 0.1 |
| [X27] | (mg/Nm$^3$) | 708 | 451 | 102 |

*1 PC: Pulverized coal ratio (kg/t · pig) SR: Waste plastics ratio, injected (kg/t · pig) O$_2$: Flow rate of oxygen (Nm$^3$/t · pig)
*2 Amount of oxygen added to air in Nos. 38 to 43, Nos. 46 to 51.
*3 Inv.: Inventive example Com.: Comparative example
[X1] : Charging from furnace top
[X2] : Coke ratio
[X3] : Converter slag ratio
[X4] : Silica ratio
[X5] : Injection from tuyere
[X6] : Pulverized coal
[X7] : Waste plastics
[X8] : Polyvinyl chloride
[X9] : Other than polyvinyl chloride
[X10] : Air blowing
[X11] : Temperature in front of tuyere
[X12] : Air for secondary combustion
[X13] : Furnace top
[X14] : Furnace top temperature
[X15] : Amount of exhaust gas
[X16] : Composition of exhaust gas
[X17] : Calorific value of exhaust gas
[X18] : Slag ratio
[X19] : FeO content in slag
[X20] : CaO + MgO/SiO$_2$ in slag
[X21] : Temperature of slag
[X22] : Temperature of molten iron
[X23] : Furnace top dust
[X24] : Amount formed
[X25] : Concentration of tar
[X26] : Amount of tar formed
[X27] : Concentration of gaseous tar

TABLE 16

| No. | | 20 | 21 | 22 |
|---|---|---|---|---|
| Division *3 | | Inv. | Inv. | Inv. |
| Structure of tuyere | | FIG. 2 | FIG. 4 | FIG. 10 |
| [X·1] | [X·2] (kg/t · pig) | 181 | 180 | 180 |
| | [X·3] (kg/t · pig) | 121 | 120 | 120 |
| | [X·4] (kg/t · pig) | 5 | 4 | 4 |
| | [X·7]    [X·8] | — | — | — |
| | (kg/t · pig) [X·9] | 20 | 20 | 20 |
| [X·5] | [X·6] (kg/t · pig) | 214 | 212 | 214 |
| | [X·7]    [X·8] | — | — | — |
| | (kg/t · pig) [X·9] | — | — | — |
| | PC/O$_2$ *1 (kg/Nm$^3$) | 1.01 | 1.00 | 1.00 |
| | PC + SR/O$_2$*1 (kg/Nm$^3$) | — | — | — |
| [X·10] | Oxygen *2 (Nm$^3$/t · pig) | 212 | 212 | 213 |
| | Air (Nm$^3$/t · pig) | — | — | — |
| | Steam (kg/t · pig) | 43 | 43 | 43 |
| | [X·11] (° C.) | 2200 | 2200 | 2200 |
| | [X·12] (Nm$^3$/t · pig) | — | — | — |
| [X·13] | [X·14] (° C.) | 250 | 250 | 250 |
| | [X·15] (Nm$^3$/t · pig) | 682 | 682 | 685 |
| | [X·16]   CO (%) | 72.5 | 76.3 | 74.5 |
| | CO$_2$ (%) | — | — | — |
| | H$_2$ (%) | 13.8 | 13.2 | 14.7 |
| | CH$_4$ (%) | 4.9 | 3.9 | 3.6 |
| | C$_2$ (%) | 0.9 | 0.9 | 0.3 |
| | C$_3$ (%) | 2.7 | 1.2 | 1.1 |
| | C$_4$ (%) | 0.5 | 0.6 | 0.1 |
| | N$_2$ (%) | 4.7 | 3.9 | 5.7 |
| | HCl (ppm) | — | — | — |
| | [X·17] (kcal/Nm$^3$) | 3810 | 3535 | 3241 |
| Slag | [X·18] (kg/t · pig) | 114 | 115 | 114 |
| | [X·19] (%) | 1.1 | 1.0 | 0.9 |
| | [X·20] | 1.1 | 1.1 | 1.1 |
| | [X·21] (° C.) | 1525 | 1535 | 1540 |
| | [X·22] (° C.) | 1490 | 1505 | 1515 |
| [X·23] | [X·24] (kg/t · pig) | 19.7 | 19.1 | 19.0 |
| | [X·25] (wt %) | 1.3 | 0.9 | — |
| | [X·26] (kg/t · pig) | 0.1 | 0.2 | — |
| [X·27] | (mg/Nm$^3$) | 112 | 52 | 30 |

*1 PC: Pulverized coal ratio (kg/t · pig) SR: Waste plastics ratio, injected (kg/t · pig) O$_2$: Flow rate of oxygen (Nm$^3$/t · pig)
*2 Amount of oxygen added to air in Nos. 38 to 43, Nos. 46 to 51.
*3 Inv.: Inventive example Com.: Comparative example
[X·1] : Charging from furnace top
[X·2] : Coke ratio
[X·3] : Converter slag ratio
[X·4] : Silica ratio
[X·5] : Injection from tuyere
[X·6] : Pulverized coal
[X·7] : Waste plastics
[X·8] : Polyvinyl chloride
[X·9] : Other than polyvinyl chloride
[X·10] : Air blowing
[X·11] : Temperature in front of tuyere
[X·12] : Air for secondary combustion
[X·13] : Furnace top
[X·14] : Furnace top temperature
[X·15] : Amount of exhaust gas
[X·16] : Composition of exhaust gas
[X·17] : Calorific value of exhaust gas
[X·18] : Slag ratio
[X·19] : FeO content in slag
[X·20] : CaO + MgO/SiO$_2$ in slag
[X·21] : Temperature of slag
[X·22] : Temperature of molten iron
[X·23] : Furnace top dust
[X·24] : Amount formed
[X·25] : Concentration of tar
[X·26] : Amount of tar formed
[X·27] : Concentration of gaseous tar

TABLE 17

| No. | | 23 | 24 | 25 |
|---|---|---|---|---|
| Division *3 | | Inv. | Inv. | Inv. |
| Structure of tuyere | | FIG. 2 | FIG. 4 | FIG. 10 |
| [X·1] | [X·2] (kg/t · pig) | 171 | 170 | 170 |
| | [X·3] (kg/t · pig) | 119 | 121 | 120 |
| | [X·4] (kg/t · pig) | 4 | 4 | 4 |
| | [X·7]    [X·8] | — | — | — |
| | (kg/t · pig) [X·9] | 40 | 40 | 40 |
| [X·5] | [X·6] (kg/t · pig) | 208 | 208 | 210 |
| | [X·7]    [X·8] | — | — | — |
| | (kg/t · pig) [X·9] | — | — | — |
| | PC/O$_2$ *1 (kg/Nm$^3$) | 1.00 | 1.00 | 1.00 |
| | PC + SR/O$_2$*1 (kg/Nm$^3$) | — | — | — |
| [X·10] | Oxygen *2 (Nm$^3$/t · pig) | 208 | 210 | 210 |
| | Air (Nm$^3$/t · pig) | — | — | — |
| | Steam (kg/t · pig) | 43 | 45 | 44 |
| | [X·11] (° C.) | 2200 | 2200 | 2200 |
| | [X·12] (Nm$^3$/t · pig) | — | — | — |
| [X·13] | [X·14] (° C.) | 250 | 250 | 250 |
| | [X·15] (Nm$^3$/t · pig) | 689 | 691 | 694 |
| | [X·16]   CO (%) | 70.1 | 72.9 | 68.6 |
| | CO$_2$ (%) | — | — | — |
| | H$_2$ (%) | 14.9 | 14.1 | 17.9 |
| | CH$_4$ (%) | 5.2 | 5.1 | 5.0 |
| | C$_2$ (%) | 1.3 | 1.0 | 0.8 |
| | C$_3$ (%) | 2.9 | 1.7 | 2.7 |
| | C$_4$ (%) | 0.9 | 0.7 | 0.2 |
| | N$_2$ (%) | 4.7 | 4.5 | 4.8 |
| | HCl (ppm) | — | — | — |
| | [X·17] (kcal/Nm$^3$) | 4006 | 3707 | 3705 |
| Slag | [X·18] (kg/t · pig) | 115 | 116 | 115 |
| | [X·19] (%) | 0.9 | 0.9 | 1.0 |
| | [X·20] | 1.1 | 1.1 | 1.1 |
| | [X·21] (° C.) | 1545 | 1545 | 1540 |
| | [X·22] (° C.) | 1525 | 1520 | 1510 |
| [X·23] | [X·24] (kg/t · pig) | 18.3 | 18.0 | 18.2 |
| | [X·25] (wt %) | 7.6 | 0.1 | 0.1 |
| | [X·26] (kg/t · pig) | 0.6 | 0.02 | 0.02 |
| [X·27] | (mg/Nm$^3$) | 184 | 295 | 71 |

*1 PC: Pulverized coal ratio (kg/t · pig) SR: Waste plastics ratio, injected (kg/t · pig) O$_2$: Flow rate of oxygen (Nm$^3$/t · pig)
*2 Amount of oxygen added to air in Nos. 38 to 43, Nos. 46 to 51.
*3 Inv.: Inventive example Com.: Comparative example
[X·1] : Charging from furnace top
[X·2] : Coke ratio
[X·3] : Converter slag ratio
[X·4] : Silica ratio
[X·5] : Injection from tuyere
[X·6] : Pulverized coal
[X·7] : Waste plastics
[X·8] : Polyvinyl chloride
[X·9] : Other than polyvinyl chloride
[X·10] : Air blowing
[X·11] : Temperature in front of tuyere
[X·12] : Air for secondary combustion
[X·13] : Furnace top
[X·14] : Furnace top temperature
[X·15] : Amount of exhaust gas
[X·16] : Composition of exhaust gas
[X·17] : Calorific value of exhaust gas
[X·18] : Slag ratio
[X·19] : FeO content in slag
[X·20] : CaO + MgO/SiO$_2$ in slag
[X·21] : Temperature of slag
[X·22] : Temperature of molten iron
[X·23] : Furnace top dust
[X·24] : Amount formed
[X·25] : Concentration of tar
[X·26] : Amount of tar formed
[X·27] : Concentration of gaseous tar

TABLE 18

| No. | | | 26 | 27 | 28 |
|---|---|---|---|---|---|
| Division *3 | | | Inv. | Inv. | Inv. |
| Structure of tuyere | | | FIG. 3 | FIG. 4 | FIG. 10 |
| [X1] | [X2] (kg/t · pig) | | 177 | 176 | 176 |
| | [X3] (kg/t · pig) | | 119 | 120 | 121 |
| | [X4] (kg/t · pig) | | 4 | 4 | 5 |
| | [X7] | [X8] | — | — | — |
| | (kg/t · pig) | [X9] | 20 | 20 | 20 |
| [X5] | [X6] (kg/t · pig) | | 135 | 138 | 137 |
| | [X7] | [X8] | — | — | — |
| | (kg/t · pig) | [X9] | 81 | 81 | 81 |
| | PC/$O_2$ *1 (kg/Nm$^3$) | | — | — | — |
| | PC + SR/$O_2$*1 (kg/Nm$^3$) | | 0.99 | 1.00 | 0.99 |
| [X10] | Oxygen *2 (Nm$^3$/t · pig) | | 218 | 220 | 220 |
| | Air (Nm$^3$/t · pig) | | — | — | — |
| | Steam (kg/t · pig) | | 15 | 16 | 15 |
| | [X11] (° C.) | | 2200 | 2200 | 2200 |
| | [X12] (Nm$^3$/t · pig) | | — | — | — |
| [X13] | [X14] (° C.) | | 250 | 250 | 250 |
| | [X15] (Nm$^3$/t · pig) | | 692 | 704 | 700 |
| | [X16] | CO (%) | 69.1 | 69.2 | 67.7 |
| | | $CO_2$ (%) | — | — | — |
| | | $H_2$ (%) | 17.1 | 22.1 | 24.9 |
| | | $CH_4$ (%) | 4.2 | 3.7 | 2.1 |
| | | $C_2$ (%) | 0.6 | 0.2 | 0.3 |
| | | $C_3$ (%) | 1.9 | 1.2 | 0.7 |
| | | $C_4$ (%) | 0.3 | 0.1 | 0.1 |
| | | $N_2$ (%) | 6.8 | 3.5 | 4.2 |
| | | HCl (ppm) | — | — | — |
| | [X17] (kcal/Nm$^3$) | | 3462 | 3286 | 3086 |
| Slag | [X18] (kg/t · pig) | | 105 | 108 | 106 |
| | [X19] (%) | | 1.6 | 1.6 | 1.4 |
| | [X20] | | 1.1 | 1.1 | 1.1 |
| | [X21] (° C.) | | 1510 | 1535 | 1540 |
| | [X22] (° C.) | | 1490 | 1500 | 1515 |
| [X23] | [X24] (kg/t · pig) | | 15.1 | 15.0 | 14.8 |
| | [X25] (wt %) | | 5.2 | — | — |
| | [X26] (kg/t · pig) | | 0.3 | — | — |
| [X27] | (mg/Nm$^3$) | | 213 | 291 | 64 |

*1 PC: Pulverized coal ratio (kg/t · pig) SR: Waste plastics ratio, injected (kg/t · pig) $O_2$: Flow rate of oxygen (Nm$^3$/t · pig)
*2 Amount of oxygen added to air in Nos. 38 to 43, Nos. 46 to 51.
*3 Inv.: Inventive example Com.: Comparative example
[X1] : Charging from furnace top
[X2] : Coke ratio
[X3] : Converter slag ratio
[X4] : Silica ratio
[X5] : Injection from tuyere
[X6] : Pulverized coal
[X7] : Waste plastics
[X8] : Polyvinyl chloride
[X9] : Other than polyvinyl chloride
[X10] : Air blowing
[X11] : Temperature in front of tuyere
[X12] : Air for secondary combustion
[X13] : Furnace top
[X14] : Furnace top temperature
[X15] : Amount of exhaust gas
[X16] : Composition of exhaust gas
[X17] : Calorific value of exhaust gas
[X18] : Slag ratio
[X19] : FeO content in slag
[X20] : CaO + MgO/$SiO_2$ in slag
[X21] : Temperature of slag
[X22] : Temperature of molten iron
[X23] : Furnace top dust
[X24] : Amount formed
[X25] : Concentration of tar
[X26] : Amount of tar formed
[X27] : Concentration of gaseous tar

TABLE 19

| No. | | | 29 | 30 | 31 |
|---|---|---|---|---|---|
| Division *3 | | | Inv. | Inv. | Inv. |
| Structure of tuyere | | | FIG. 3 | FIG. 4 | FIG. 10 |
| [X1] | [X2] (kg/t · pig) | | 185 | 182 | 182 |
| | [X3] (kg/t · pig) | | 120 | 121 | 122 |
| | [X4] (kg/t · pig) | | 4 | 4 | 5 |
| | [X7] | [X8] | 6 | 3 | 9 |
| | (kg/t · pig) | [X9] | 24 | 27 | 21 |
| [X5] | [X6] (kg/t · pig) | | 178 | 178 | 180 |
| | [X7] | [X8] | — | 6 | 9 |
| | (kg/t · pig) | [X9] | 30 | 24 | 21 |
| | PC/$O_2$ *1 (kg/Nm$^3$) | | — | — | — |
| | PC + SR/$O_2$*1 (kg/Nm$^3$) | | 1.00 | 1.00 | 1.01 |
| [X10] | Oxygen *2 (Nm$^3$/t · pig) | | 208 | 209 | 208 |
| | Air (Nm$^3$/t · pig) | | — | — | — |
| | Steam (kg/t · pig) | | 8 | 9 | 8 |
| | [X11] (° C.) | | 2300 | 2300 | 2300 |
| | [X12] (Nm$^3$/t · pig) | | — | — | — |
| [X13] | [X14] (° C.) | | 510 | 510 | 510 |
| | [X15] (Nm$^3$/t · pig) | | 643 | 655 | 644 |
| | [X16] | CO (%) | 70.5 | 70.2 | 71.6 |
| | | $CO_2$ (%) | — | — | — |
| | | $H_2$ (%) | 15.2 | 12.8 | 14.7 |
| | | $CH_4$ (%) | 5.1 | 4.9 | 4.8 |
| | | $C_2$ (%) | 1.1 | 1.2 | 1.2 |
| | | $C_3$ (%) | 2.0 | 2.0 | 2.1 |
| | | $C_4$ (%) | 0.4 | 0.5 | 0.5 |
| | | $N_2$ (%) | 5.7 | 7.2 | 5.1 |
| | | HCl (ppm) | 20 | 39 | 49 |
| | [X17] (kcal/Nm$^3$) | | 3656 | 3611 | 3715 |
| Slag | [X18] (kg/t · pig) | | 106 | 103 | 105 |
| | [X19] (%) | | 0.9 | 0.9 | 0.8 |
| | [X20] | | 1.1 | 1.1 | 1.1 |
| | [X21] (° C.) | | 1535 | 1540 | 1550 |
| | [X22] (° C.) | | 1500 | 1505 | 1525 |
| [X23] | [X24] (kg/t · pig) | | 16.6 | 16.2 | 16.0 |
| | [X25] (wt %) | | 0.2 | 0.1 | 0.1 |
| | [X26] (kg/t · pig) | | 0.03 | 0.02 | 0.02 |
| [X27] | (mg/Nm$^3$) | | 425 | 378 | 401 |

*1 PC: Pulverized coal ratio (kg/t · pig) SR: Waste plastics ratio, injected (kg/t · pig) $O_2$: Flow rate of oxygen (Nm$^3$/t · pig)
*2 Amount of oxygen added to air in Nos. 38 to 43, Nos. 46 to 51.
*3 Inv.: Inventive example Com.: Comparative example
[X1] : Charging from furnace top
[X2] : Coke ratio
[X3] : Converter slag ratio
[X4] : Silica ratio
[X5] : Injection from tuyere
[X6] : Pulverized coal
[X7] : Waste plastics
[X8] : Polyvinyl chloride
[X9] : Other than polyvinyl chloride
[X10] : Air blowing
[X11] : Temperature in front of tuyere
[X12] : Air for secondary combustion
[X13] : Furnace top
[X14] : Furnace top temperature
[X15] : Amount of exhaust gas
[X16] : Composition of exhaust gas
[X17] : Calorific value of exhaust gas
[X18] : Slag ratio
[X19] : FeO content in slag
[X20] : CaO + MgO/$SiO_2$ in slag
[X21] : Temperature of slag
[X22] : Temperature of molten iron
[X23] : Furnace top dust
[X24] : Amount formed
[X25] : Concentration of tar
[X26] : Amount of tar formed
[X27] : Concentration of gaseous tar

TABLE 20

| No. | | 32 | 33 | 34 | 35 |
|---|---|---|---|---|---|
| Division *3 | | Inv. | Inv. | Inv. | Inv. |
| Structure of tuyere | | FIG. 3 | FIG. 3 | FIG. 4 | FIG. 10 |
| [X1] | [X2] (kg/t · pig) | 187 | 185 | 185 | 184 |
| | [X3] (kg/t · pig) | 121 | 120 | 120 | 122 |
| | [X4] (kg/t · pig) | 5 | 4 | 4 | 5 |
| | [X7]  [X8] | — | — | — | — |
| | (kg/t · pig) [X9] | 20 | 20 | 20 | 20 |
| [X5] | [X6] (kg/t · pig) | 69 | 46 | 46 | 46 |
| | [X7]  [X8] | 20 | 20 | 20 | 20 |
| | (kg/t · pig) [X9] | 125 | 140 | 140 | 140 |
| | PC/O$_2$ *1 (kg/Nm$^3$) | — | — | — | — |
| | PC + SR/O$_2$*1 (kg/Nm$^3$) | 0.95 | 0.92 | 0.92 | 0.92 |
| [X10] | Oxygen *2 (Nm$^3$/t · pig) | 225 | 224 | 224 | 223 |
| | Air (Nm$^3$/t · pig) | — | — | — | — |
| | Steam (kg/t · pig) | 9 | 8 | 3 | 8 |
| | [X11] (° C.) | 2300 | 2300 | 2300 | 2300 |
| | [X12] (Nm$^3$/t · pig) | — | — | — | — |
| [X13] | [X14] (° C.) | 510 | 510 | 510 | 510 |
| | [X15] (Nm$^3$/t · pig) | 720 | 719 | 719 | 715 |
| | [X16]  CO (%) | 57.6 | 60.7 | 62.6 | 64.2 |
| | CO$_2$ (%) | — | — | — | — |
| | H$_2$ (%) | 27.9 | 25.2 | 23.7 | 24.5 |
| | CH$_4$ (%) | 4.7 | 4.5 | 4.6 | 5.1 |
| | C$_2$ (%) | 1.1 | 1.0 | 1.0 | 1.3 |
| | C$_3$ (%) | 2.9 | 2.7 | 2.5 | 2.2 |
| | C$_4$ (%) | 0.6 | 0.5 | 0.4 | 0.6 |
| | N$_2$ (%) | 5.2 | 5.4 | 5.2 | 2.1 |
| | HCl (ppm) | 78 | 67 | 105 | 127 |
| | [X17] (kcal/Nm$^3$) | 3805 | 3727 | 3684 | 3834 |
| Slag | [X18] (kg/t · pig) | 93 | 86 | 86 | 85 |
| | [X19] (%) | 1.3 | 1.3 | 1.2 | 1.8 |
| | [X20] | 1.1 | 1.1 | 1.1 | 1.1 |
| | [X21] (° C.) | 1535 | 1545 | 1540 | 1535 |
| | [X22] (° C.) | 1505 | 1520 | 1510 | 1510 |
| [X23] | [X24] (kg/t · pig) | 15.9 | 15.6 | 15.3 | 14.5 |
| | [X25] (wt %) | 2.8 | 2.1 | 2.2 | 3.0 |
| | [X26] (kg/t · pig) | 0.4 | 0.3 | 0.3 | 0.4 |
| [X27] | (mg/Nm$^3$) | 375 | 357 | 404 | 389 |

*1 PC: Pulverized coal ratio (kg/t · pig) SR: Waste plastics ratio, injected (kg/t · pig) O$_2$: Flow rate of oxygen (Nm$^3$/t · pig)
*2 Amount of oxygen added to air in Nos. 38 to 43, Nos. 46 to 51.
*3 Inv.: Inventive example Com.: Comparative example

[X1] : Charging from furnace top
[X2] : Coke ratio
[X3] : Converter slag ratio
[X4] : Silica ratio
[X5] : Injection from tuyere
[X6] : Pulverized coal
[X7] : Waste plastics
[X8] : Polyvinyl chloride
[X9] : Other than polyvinyl chloride
[X10] : Air blowing
[X11] : Temperature in front of tuyere
[X12] : Air for secondary combustion
[X13] : Furnace top
[X14] : Furnace top temperature
[X15] : Amount of exhaust gas
[X16] : Composition of exhaust gas
[X17] : Calorific value of exhaust gas
[X18] : Slag ratio
[X19] : FeO content in slag
[X20] : CaO + MgO/SiO$_2$ in slag
[X21] : Temperature of slag
[X22] : Temperature of molten iron
[X23] : Furnace top dust
[X24] : Amount formed
[X25] : Concentration of tar
[X26] : Amount of tar formed
[X27] : Concentration of gaseous tar

TABLE 21

| No. | | 36 | 37 | 38 | 39 |
|---|---|---|---|---|---|
| Division *3 | | Com. | Com. | Com. | Com. |
| Structure of tuyere | | FIG. 22 | FIG. 22 | FIG. 22 | FIG. 22 |
| [X1] | [X2] (kg/t · pig) | 288 | 288 | 303 | 305 |
| | [X3] (kg/t · pig) | 120 | 121 | 122 | 120 |
| | [X4] (kg/t · pig) | 5 | 6 | 5 | 4 |
| | [X7]  [X8] | — | — | — | — |
| | (kg/t · pig) [X9] | 20 | 20 | 20 | 20 |
| [X5] | [X6] (kg/t · pig) | 157 | 105 | 141 | 90 |
| | [X7]  [X8] | — | — | — | — |
| | (kg/t · pig) [X9] | — | 50 | — | 50 |
| | PC/O$_2$ *1 (kg/Nm$^3$) | 0.71 | — | 0.70 | — |
| | PC + SR/O$_2$*1 (kg/Nm$^3$) | — | 0.70 | — | 0.80 |
| [X10] | Oxygen *2 (Nm$^3$/t · pig) | 222 | 221 | 174 | 175 |
| | Air (Nm$^3$/t · pig) | — | — | 131 | 131 |
| | Steam (kg/t · pig) | 65 | 52 | 32 | 12 |
| | [X11] (° C.) | 2300 | 2300 | 2300 | 2300 |
| | [X12] (Nm$^3$/t · pig) | — | — | — | — |
| [X13] | [X14] (° C.) | 510 | 510 | 510 | 510 |
| | [X15] (Nm$^3$/t · pig) | 713 | 713 | 685 | 680 |
| | [X16]  CO (%) | 70.6 | 70.3 | 67.7 | 59.9 |
| | CO$_2$ (%) | — | — | — | — |
| | H$_2$ (%) | 15.2 | 15.2 | 13.2 | 21.2 |
| | CH$_4$ (%) | 5.1 | 4.8 | 2.1 | 1.2 |
| | C$_2$ (%) | 0.7 | 1.2 | 0.7 | 0.4 |
| | C$_3$ (%) | 2.8 | 3.0 | 0.9 | 0.8 |
| | C$_4$ (%) | 0.2 | 0.6 | 0.2 | 0.2 |
| | N$_2$ (%) | 5.4 | 4.9 | 15.2 | 16.3 |
| | HCl (ppm) | — | — | — | — |
| | [X17] (kcal/Nm$^3$) | 3710 | 3906 | 2915 | 2743 |
| Slag | [X18] (kg/t · pig) | 125 | 120 | 123 | 119 |
| | [X19] (%) | 3.9 | 4.1 | 4.0 | 4.5 |
| | [X20] | 1.1 | 1.1 | 1.1 | 1.1 |
| | [X21] (° C.) | 1535 | 1540 | 1545 | 1550 |
| | [X22] (° C.) | 1500 | 1510 | 1510 | 1520 |
| [X23] | [X24] (kg/t · pig) | 15.0 | 14.6 | 14.5 | 14.3 |
| | [X25] (wt %) | 0.9 | 1.7 | 1.1 | 2.4 |
| | [X26] (kg/t · pig) | 0.1 | 0.2 | 0.2 | 0.3 |
| [X27] | (mg/Nm$^3$) | 75 | 715 | 415 | 758 |

*1 PC: Pulverized coal ratio (kg/t · pig) SR: Waste plastics ratio, injected (kg/t · pig) O$_2$: Flow rate of oxygen (Nm$^3$/t · pig)
*2 Amount of oxygen added to air in Nos. 38 to 43, Nos. 46 to 51.
*3 Inv.: Inventive example Com.: Comparative example

[X1] : Charging from furnace top
[X2] : Coke ratio
[X3] : Converter slag ratio
[X4] : Silica ratio
[X5] : Injection from tuyere
[X6] : Pulverized coal
[X7] : Waste plastics
[X8] : Polyvinyl chloride
[X9] : Other than polyvinyl chloride
[X10] : Air blowing
[X11] : Temperature in front of tuyere
[X12] : Air for secondary combustion
[X13] : Furnace top
[X14] : Furnace top temperature
[X15] : Amount of exhaust gas
[X16] : Composition of exhaust gas
[X17] : Calorific value of exhaust gas
[X18] : Slag ratio
[X19] : FeO content in slag
[X20] : CaO + MgO/SiO$_2$ in slag
[X21] : Temperature of slag
[X22] : Temperature of molten iron
[X23] : Furnace top dust
[X24] : Amount formed
[X25] : Concentration of tar
[X26] : Amount of tar formed
[X27] : Concentration of gaseous tar

TABLE 22

| No. | | 40 | 41 | 42 | 43 |
|---|---|---|---|---|---|
| Division *3 | | Com. | Com. | Com. | Com. |
| Structure of tuyere | | FIG. 22 | FIG. 22 | FIG. 2 | FIG. 3 |
| [X1] | [X2] (kg/t · pig) | 257 | 258 | 194 | 194 |
| | [X3] (kg/t · pig) | 115 | 116 | 120 | 121 |
| | [X4] (kg/t · pig) | 4 | 4 | 4 | 5 |
| | [X7] [X8] | — | — | — | — |
| | (kg/t · pig) [X9] | 20 | 20 | 20 | 20 |
| [X5] | [X6] (kg/t · pig) | 133 | 81 | 199 | 148 |
| | [X7] [X8] | — | — | — | — |
| | (kg/t · pig) [X9] | — | 50 | — | 50 |
| | PC/O$_2$ *1 (kg/Nm$^3$) | 0.81 | — | 1.00 | — |
| | PC + SR/O$_2$*1 (kg/Nm$^3$) | — | 0.80 | — | 1.00 |
| [X10] | Oxygen *2 (Nm$^3$/t · pig) | 142 | 142 | 175 | 175 |
| | Air (Nm$^3$/t · pig) | 105 | 105 | 112 | 113 |
| | Steam (kg/t · pig) | 19 | — | 11 | — |
| | [X11] (° C.) | 2300 | 2300 | 2300 | 2300 |
| | [X12] (Nm$^3$/t · pig) | 100 | 100 | — | — |
| [X13] | [X14] (° C.) | 520 | 520 | 510 | 510 |
| | [X15] (Nm$^3$/t · pig) | 671 | 663 | 658 | 686 |
| | [X16] CO (%) | 58.5 | 58.9 | 69.3 | 64.9 |
| | CO$_2$ (%) | 15.0 | 14.7 | — | — |
| | H$_2$ (%) | 2.1 | 1.9 | 15.2 | 19.5 |
| | CH$_4$ (%) | 0.3 | 0.1 | 1.0 | 1.3 |
| | C$_2$ (%) | — | — | 0.3 | 0.4 |
| | C$_3$ (%) | — | — | 0.7 | 0.8 |
| | C$_4$ (%) | — | — | 0.1 | 0.1 |
| | N$_2$ (%) | 24.1 | 24.4 | 13.4 | 13.0 |
| | HCl (ppm) | — | — | — | — |
| | [X17] (kcal/Nm$^3$) | 1846 | 1836 | 2790 | 2830 |
| Slag | [X18] (kg/t · pig) | 116 | 113 | 111 | 106 |
| | [X19] (%) | 4.3 | 4.6 | 2.1 | 2.3 |
| | [X20] | 1.1 | 1.1 | 1.1 | 1.1 |
| | [X21] (° C.) | 1545 | 1550 | 1545 | 1535 |
| | [X22] (° C.) | 1510 | 1520 | 1520 | 1505 |
| [X23] | [X24] (kg/t · pig) | 13.7 | 13.3 | 16.0 | 15.6 |
| | [X25] (wt %) | — | — | 1.0 | 3.2 |
| | [X26] (kg/t · pig) | — | — | 0.2 | 0.5 |
| [X27] | (mg/Nm$^3$) | 7 | 9 | 398 | 802 |

*1 PC: Pulverized coal ratio (kg/t · pig) SR: Waste plastics ratio, injected (kg/t · pig) O$_2$: Flow rate of oxygen (Nm$^3$/t · pig)
*2 Amount of oxygen added to air in Nos. 61 to 64, Nos. 69 to 74.
*3 Inv.: Inventive example Com.: Comparative example
[X1] : Charging from furnace top
[X2] : Coke ratio
[X3] : Converter slag ratio
[X4] : Silica ratio
[X5] : Injection from tuyere
[X6] : Pulverized coal
[X7] : Waste plastics
[X8] : Polyvinyl chloride
[X9] : Other than polyvinyl chloride
[X10] : Air blowing
[X11] : Temperature in front of tuyere
[X12] : Air for secondary combustion
[X13] : Furnace top
[X14] : Furnace top temperature
[X15] : Amount of exhaust gas
[X16] : Composition of exhaust gas
[X17] : Calorific value of exhaust gas
[X18] : Slag ratio
[X19] : FeO content in slag
[X20] : CaO + MgO/SiO$_2$ in slag
[X21] : Temperature of slag
[X22] : Temperature of molten iron
[X23] : Furnace top dust
[X24] : Amount formed
[X25] : Concentration of tar
[X26] : Amount of tar formed
[X27] : Concentration of gaseous tar

TABLE 23

| No. | | 44 | 45 | 46 | 47 |
|---|---|---|---|---|---|
| Division *3 | | Com. | Com. | Com. | Com. |
| Structure of tuyere | | FIG. 2 | FIG. 3 | FIG. 2 | FIG. 3 |
| [X1] | [X2] (kg/t · pig) | 169 | 169 | 144 | 146 |
| | [X3] (kg/t · pig) | 120 | 121 | 120 | 120 |
| | [X4] (kg/t · pig) | 3 | 4 | 4 | 4 |
| | [X7] [X8] | 4 | 4 | — | — |
| | (kg/t · pig) [X9] | 16 | 16 | 20 | 20 |
| [X5] | [X6] (kg/t · pig) | 205 | 156 | 199 | 148 |
| | [X7] [X8] | — | 40 | — | 50 |
| | (kg/t · pig) [X9] | — | 40 | — | 50 |
| | PC/O$_2$ *1 (kg/Nm$^3$) | 1.03 | — | 1.00 | — |
| | PC + SR/O$_2$*1 (kg/Nm$^3$) | — | 1.03 | — | 1.00 |
| [X10] | Oxygen *2 (Nm$^3$/t · pig) | 200 | 202 | 175 | 175 |
| | Air (Nm$^3$/t · pig) | — | — | 112 | 112 |
| | Steam (kg/t · pig) | 35 | 15 | 11 | — |
| | [X11] (° C.) | 2300 | 2300 | 2300 | 2300 |
| | [X12] (Nm$^3$/t · pig) | 100 | 100 | 100 | 100 |
| [X13] | [X14] (° C.) | 550 | 550 | 550 | 550 |
| | [X15] (Nm$^3$/t · pig) | 720 | 723 | 752 | 766 |
| | [X16] CO (%) | 42.1 | 56.1 | 45.5 | 42.9 |
| | CO$_2$ (%) | 27.5 | 20.5 | 29.1 | 29.2 |
| | H$_2$ (%) | 6.1 | 12.3 | 3.1 | 5.9 |
| | CH$_4$ (%) | 1.2 | 0.1 | — | — |
| | C$_2$ (%) | 0.1 | — | — | — |
| | C$_3$ (%) | 0.2 | — | — | — |
| | C$_4$ (%) | — | — | — | — |
| | N$_2$ (%) | 22.8 | 11.0 | 22.3 | 22.0 |
| | HCl (ppm) | 33 | 120 | — | — |
| | [X17] (kcal/Nm$^3$) | 1588 | 2020 | 1454 | 1447 |
| Slag | [X18] (kg/t · pig) | 114 | 113 | 108 | 106 |
| | [X19] (%) | 1.6 | 1.7 | 1.5 | 1.7 |
| | [X20] | 1.1 | 1.1 | 1.1 | 1.1 |
| | [X21] (° C.) | 1535 | 1545 | 1540 | 1540 |
| | [X22] (° C.) | 1510 | 1515 | 1505 | 1510 |
| [X23] | [X24] (kg/t · pig) | 12.9 | 12.2 | 13.0 | 12.8 |
| | [X25] (wt %) | 0.3 | — | — | — |
| | [X26] (kg/t · pig) | 0.01 | — | — | — |
| [X27] | (mg/Nm$^3$) | 54 | 79 | 69 | 89 |

*1 PC: Pulverized coal ratio (kg/t · pig) SR: Waste plastics ratio, injected (kg/t · pig) O$_2$: Flow rate of oxygen (Nm$^3$/t · pig)
*2 Amount of oxygen added to air in Nos. 38 to 43, Nos. 46 to 51.
*3 Inv.: Inventive example Com.: Comparative example
[X1] : Charging from furnace top
[X2] : Coke ratio
[X3] : Converter slag ratio
[X4] : Silica ratio
[X5] : Injection from tuyere
[X6] : Pulverized coal
[X7] : Waste plastics
[X8] : Polyvinyl chloride
[X9] : Other than polyvinyl chloride
[X10] : Air blowing
[X11] : Temperature in front of tuyere
[X12] : Air for secondary combustion
[X13] : Furnace top
[X14] : Furnace top temperature
[X15] : Amount of exhaust gas
[X16] : Composition of exhaust gas
[X17] : Calorific value of exhaust gas
[X18] : Slag ratio
[X19] : FeO content in slag
[X20] : CaO + MgO/SiO$_2$ in slag
[X21] : Temperature of slag
[X22] : Temperature of molten iron
[X23] : Furnace top dust
[X24] : Amount formed
[X25] : Concentration of tar
[X26] : Amount of tar formed
[X27] : Concentration of gaseous tar

TABLE 24

| No. | 48 | 49 | 50 | 51 |
|---|---|---|---|---|
| Division *3 | Com. | Com. | Com. | Com. |
| Structure of tuyere | FIG. 2 | FIG. 3 | FIG. 2 | FIG. 3 |
| [X1] [X2] (kg/t · pig) | 140 | 139 | 132 | 130 |
| [X3] (kg/t · pig) | 96 | 97 | 95 | 95 |
| [X4] (kg/t · pig) | 3 | 3 | 4 | 4 |
| [X7] [X8] (kg/t · pig) [X9] | — | — | — | — |
|  | 20 | 20 | 20 | 20 |
| [X5] [X6] (kg/t · pig) | 140 | 90 | 116 | 65 |
| [X7] [X8] | — | — | — | — |
| (kg/t · pig) [X9] | — | 50 | — | 50 |
| PC/$O_2$ *1 (kg/Nm$^3$) | 0.80 | — | 0.80 | — |
| PC + SR/$O_2$*1 (kg/Nm$^3$) | — | 0.80 | — | 0.80 |
| [X10] Oxygen *2 (Nm$^3$/t · pig) | 147 | 147 | 122 | 122 |
| Air (Nm$^3$/t · pig) | 131 | 131 | 107 | 107 |
| Steam (kg/t · pig) | 17 | — | 14 | 12 |
| [X11] (° C.) | 2300 | 2300 | 2300 | 2300 |
| [X12] (Nm$^3$/t · pig) | — | — | 75 | 75 |
| [X13] [X14] (° C.) | 475 | 475 | 520 | 520 |
| [X15] (Nm$^3$/t · pig) | 593 | 594 | 568 | 565 |
| [X16] CO (%) | 68.7 | 65.1 | 51.7 | 49.5 |
| $CO_2$ (%) | — | — | 19.8 | 21.0 |
| $H_2$ (%) | 12.1 | 15.3 | 3.2 | 4.1 |
| $CH_4$ (%) | 1.1 | 1.2 | — | — |
| $C_2$ (%) | 0.2 | 0.3 | — | — |
| $C_3$ (%) | 0.3 | 0.2 | — | — |
| $C_4$ (%) | 0.1 | 0.1 | — | — |
| $N_2$ (%) | 17.5 | 17.8 | 25.3 | 25.4 |
| HCl (ppm) | — | — | — | — |
| [X17] (kcal/Nm$^3$) | 2602 | 2578 | 1643 | 1600 |
| Slag [X18] (kg/t · pig) | 90 | 88 | 85 | 82 |
| [X19] (%) | 2.2 | 2.3 | 2.0 | 2.4 |
| [X20] | 1.1 | 1.1 | 1.1 | 1.1 |
| [X21] (° C.) | 1535 | 1530 | 1540 | 1530 |
| [X22] (° C.) | 1500 | 1500 | 1505 | 1500 |
| [X23] [X24] (kg/t · pig) | 14.8 | 14.3 | 15.4 | 15.0 |
| [X25] (wt %) | 1.0 | 1.1 | — | — |
| [X26] (kg/t · pig) | 0.1 | 0.2 | — | — |
| [X27] (mg/Nm$^3$) | 207 | 297 | 17 | 25 |

*1 PC: Pulverized coal ratio (kg/t · pig) SR: Waste plastics ratio, injected (kg/t · pig) $O_2$: Flow rate of oxygen (Nm$^3$/t · pig)
*2 Amount of oxygen added to air in Nos. 38 to 43, Nos. 46 to 51.
*3 Inv.: Inventive example Com.: Comparative example
[X1] : Charging from furnace top
[X2] : Coke ratio
[X3] : Converter slag ratio
[X4] : Silica ratio
[X5] : Injection from tuyere
[X6] : Pulverized coal
[X7] : Waste plastics
[X8] : Polyvinyl chloride
[X9] : Other than polyvinyl chloride
[X10] : Air blowing
[X11] : Temperature in front of tuyere
[X12] : Air for secondary combustion
[X13] : Furnace top
[X14] : Furnace top temperature
[X15] : Amount of exhaust gas
[X16] : Composition of exhaust gas
[X17] : Calorific value of exhaust gas
[X18] : Slag ratio
[X19] : FeO content in slag
[X20] : CaO + MgO/$SiO_2$ in slag
[X21] : Temperature of slag
[X22] : Temperature of molten iron
[X23] : Furnace top dust
[X24] : Amount formed
[X25] : Concentration of tar
[X26] : Amount of tar formed
[X27] : Concentration of gaseous tar

TABLE 25

| [X1] | |
|---|---|
| C | 18.02 |
| T.Fe | 52.60 |
| $SiO_2$ | 4.89 |
| $Al_2O_3$ | 2.36 |
| CaO | 4.81 |
| MgO | 1.38 |
| MnO | 0.44 |
| ZnO | 2.42 |
| P | 0.09 |
| S | 0.27 |

X: Composition of dust (wt %)

TABLE 26

| No. | | | 1 | 2 |
|---|---|---|---|---|
| Division | *3 | | Com. | Com. |
| Structure of tuyere | | | FIG. 2 | FIG. 2 |
| [X1] [X2] | (kg/t · pig) | | 420 | 404 |
| [X3] | (kg/t · pig) | | 120 | 120 |
| [X4] | (kg/t · pig) | | — | — |
| [X7] | [X8] | | — | — |
| (kg/t · pig) | [X9] | | — | 20 |
| [X5] [X6] | (kg/t · pig) | | — | — |
| [X7] | [X8] | | — | — |
| (kg/t · pig) | [X9] | | — | — |
| [X28] | (kg/t · pig) | | 45 | 45 |
| PC/$O_2$ | *1 (kg/Nm$^3$) | | — | — |
| PC + SR/$O_2$ | *1 (kg/Nm$^3$) | | — | — |
| [X10] Oxygen | *2 (Nm$^3$/t · pig) | | 221 | 222 |
| Air | (Nm$^3$/t · pig) | | — | — |
| Steam | (kg/t · pig) | | 128 | 129 |
| [X11] | (° C.) | | 2300 | 2300 |
| [X12] | (Nm$^3$/t · pig) | | — | — |
| [X13] [X14] | (° C.) | | 510 | 510 |
| [X15] | (Nm$^3$/t · pig) | | 760 | 765 |
| [X16] | CO (%) | | 79.8 | 72.0 |
| | $CO_2$ (%) | | — | — |
| | $H_2$ (%) | | 14.7 | 17.9 |
| | $CH_4$ (%) | | — | 2.4 |
| | $C_2$ (%) | | — | 0.7 |
| | $C_3$ (%) | | — | 1.2 |
| | $C_4$ (%) | | — | 0.6 |
| | $N_2$ (%) | | 5.5 | 5.2 |
| | HCl (ppm) | | — | — |
| [X17] | (kcal/Nm$^3$) | | 2788 | 3368 |
| Slag [X18] | (kg/t · pig) | | 135 | 133 |
| [X19] | (%) | | 4.8 | 4.7 |
| [X20] | | | 1.1 | 1.1 |
| [X21] | (° C.) | | 1540 | 1530 |
| [X22] | (° C.) | | 1515 | 1510 |
| [X23] [X24] | (kg/t · pig) | | 18.5 | 18.0 |
| C content | (wt %) | | 25.8 | 26.2 |
| T.Fe content | (wt %) | | 27.1 | 26.6 |
| Zn content | (wt %) | | 5.5 | 5.7 |
| [X25] | (wt %) | | 1.0 | 6.9 |
| [X26] | (kg/t · pig) | | 0.1 | 0.9 |
| [X27] | (mg/Nm$^3$) | | 50 | 857 |

*1 PC: Pulverized coal ratio (kg/t · pig)
SR: Waste plastics ratio, injected (kg/t · pig)
$O_2$: Flow rate of oxygen (Nm$^3$/t · pig)
*2 Amount of oxygen added to air in Nos.61 to 66, Nos.69 to 74.
*3 Inv.: Inventive example
Com.: Comparative example
[X1]: Charging from furnace top
[X2]: Coke ratio
[X3]: Converter slag ratio
[X4]: Silica ratio
[X5]: Injection from tuyere
[X6]: Pulverized coal
[X7]: Waste plastics
[X8]: Polyvinyl chloride
[X9]: Other than polyvinyl chloride

TABLE 26-continued

| No. | 1 | 2 |
|---|---|---|

[X10]: Air blowing
[X11]: Temperature in front of tuyere
[X12]: Air for secondary combustion
[X13]: Furnace top
[X14]: Furnace top temperature
[X15]: Amount of exhaust gas
[X16]: Composition of exhaust gas
[X17]: Calorific value of exhaust gas
[X18]: Slag ratio
[X19]: FeO content in slag
[X20]: CaO + MgO/$SiO_2$ in slag
[X21]: Temperature of slag
[X22]: Temperature of molten iron
[X23]: Furnace top dust
[X24]: Amount formed
[X25]: Concentration of tar
[X26]: Amount of tar formed
[X27]: Concentration of gaseous tar
[X28]: Dust

TABLE 27

| No. | | | 3 | 4 | 5 |
|---|---|---|---|---|---|
| Division *3 | | | Inv. | Inv. | Inv. |
| Structure of tuyere | | | FIG. 3 | FIG. 3 | FIG. 3 |
| [X1] | [X2] (kg/t · pig) | | 334 | 194 | 106 |
| | [X3] (kg/t · pig) | | 120 | 120 | 120 |
| | [X4] (kg/t · pig) | | — | 4 | 7 |
| [X5] | [X6] (kg/t · pig) | | 110 | 196 | 250 |
| | [X7] | [X8] | — | — | — |
| | (kg/t · pig) | [X9] | 10 | 10 | 10 |
| | [X28] (kg/t · pig) | | 45 | 45 | 45 |
| | PC/$O_2$ *1 (kg/$Nm^3$) | | — | — | — |
| | PC + SR/$O_2$*1 ($kg/Nm^3$) | | 0.5 | 1.0 | 1.4 |
| [X10] | Oxygen *2 ($Nm^3$/t · pig) | | 241 | 208 | 188 |
| | Air ($Nm^3$/t · pig) | | — | — | — |
| | Steam (kg/t · pig) | | 99 | 48 | 18 |
| [X11] (° C.) | | | 2200 | 2200 | 2200 |
| [X12] ($Nm^3$/t · pig) | | | — | — | — |
| [X13] | [X14] (° C.) | | 250 | 250 | 250 |
| | [X15] ($Nm^3$/t · pig) | | 840 | 712 | 636 |
| | [X16] CO (%) | | 74.5 | 72.1 | 70.1 |
| | $CO_2$ (%) | | 0.1 | — | — |
| | $H_2$ (%) | | 22.9 | 23.3 | 23.5 |
| | $CH_4$ (%) | | — | — | — |
| | $C_2$ (%) | | — | — | — |
| | $C_3$ (%) | | — | — | — |
| | $C_4$ (%) | | — | — | — |
| | $N_2$ (%) | | 2.5 | 4.6 | 6.4 |
| | HCl (ppm) | | — | — | — |
| | [X17] (kcal/$Nm^3$) | | 2837 | 2175 | 2721 |
| Slag | [X18] (kg/t · pig) | | 127 | 124 | 125 |
| | [X19] (%) | | 5.2 | 1.9 | 0.9 |
| | [X20] | | 1.1 | 1.1 | 1.1 |
| | [X21] (° C.) | | 1540 | 1545 | 1530 |
| | [X22] (° C.) | | 1495 | 1510 | 1505 |
| [X23] | [X24] (kg/t · pig) | | 24.6 | 25.8 | 30.7 |
| | C content (wt %) | | 24.5 | 28.4 | 29.7 |
| | T. Fe content (wt %) | | 26.7 | 28.6 | 27.4 |
| | Zn content (wt %) | | 3.6 | 3.0 | 2.9 |
| | [X25] (wt %) | | 0.2 | 0.5 | 1.3 |
| | [X26] (kg/t · pig) | | 0.03 | 0.09 | 0.26 |
| [X27] | (mg/$Nm^3$) | | 15 | 21 | 41 |

*1 PC: Pulverized coal ratio (kg/t · pig) SR: Waste plastics ratio, injected (kg/t · pig) $O_2$: Flow rate of oxygen ($Nm^3$/t · pig)
*2 Amount of oxygen added to air in Nos. 61 to 66, Nos. 69 to 74.
*3 Inv.: Inventive example Com.: Comparative example
[X1] : Charging from furnace top
[X2] : Coke ratio
[X3] : Converter slag ratio
[X4] : Silica ratio

TABLE 27-continued

| No. | 3 | 4 | 5 |
|---|---|---|---|

[X5] : Injection from tuyere
[X6] : Pulverized coal
[X7] : Waste plastics
[X8] : Polyvinyl chloride
[X9] : Other than polyvinyl chloride
[X10] : Air blowing
[X11] : Temperature in front of tuyere
[X12] : Air for secondary combustion
[X13] : Furnace top
[X14] : Furnace top temperature
[X15] : Amount of exhaust gas
[X16] : Composition of exhaust gas
[X17] : Calorific value of exhaust gas
[X18] : Slag ratio
[X19] : FeO content in slag
[X20] : CaO + MgO/$SiO_2$ in slag
[X21] : Temperature of slag
[X22] : Temperature of molten iron
[X23] : Furnace top dust
[X24] : Amount formed
[X25] : Concentration of tar
[X26] : Amount of tar formed
[X27] : Concentration of gaseous tar
[X28] : Dust

TABLE 28

| No. | | | 6 | 7 | 8 | 9 |
|---|---|---|---|---|---|---|
| Division *3 | | | Inv. | Inv. | Inv. | Inv. |
| Structure of tuyere | | | FIG. 4 | FIG. 4 | FIG. 10 | FIG. 10 |
| [X1] | [X2] (kg/t · pig) | | 192 | 105 | 192 | 100 |
| | [X3] (kg/t · pig) | | 121 | 120 | 122 | 119 |
| | [X4] (kg/t · pig) | | 4 | 3 | 4 | 7 |
| [X5] | [X6] (kg/t · pig) | | 198 | 250 | 197 | 252 |
| | [X7] | [X8] | — | — | — | — |
| | (kg/t · pig) | [X9] | 10 | 10 | 10 | 10 |
| | [X28] (kg/t · pig) | | 45 | 45 | 45 | 45 |
| | PC/$O_2$ *1 (kg/$Nm^3$) | | — | — | — | — |
| | PC + SR/$O_2$*1 (kg/$Nm^3$) | | 1.0 | 1.4 | 1.0 | 1.4 |
| [X10] | Oxygen *2 ($Nm^3$/t · pig) | | 210 | 188 | 207 | 188 |
| | Air ($Nm^3$/t · pig) | | — | — | — | — |
| | Steam (kg/t · pig) | | 48 | 18 | 47 | 16 |
| [X11] (° C.) | | | 2200 | 2200 | 2200 | 2200 |
| [X12] ($Nm^3$/t · pig) | | | — | — | — | — |
| [X13] | [X14] (° C.) | | 250 | 250 | 250 | 250 |
| | [X15] ($Nm^3$/t · pig) | | 715 | 636 | 712 | 635 |
| | [X16] CO (%) | | 72.1 | 70.1 | 72.0 | 70.0 |
| | $CO_2$ (%) | | — | — | — | — |
| | $H_2$ (%) | | 24.1 | 23.5 | 23.8 | 24.3 |
| | $CH_4$ (%) | | — | — | — | — |
| | $C_2$ (%) | | — | — | — | — |
| | $C_3$ (%) | | — | — | — | — |
| | $C_4$ (%) | | — | — | — | — |
| | $N_2$ (%) | | 3.8 | 6.4 | 4.2 | 5.7 |
| | HCl (ppm) | | — | — | — | — |
| | [X17] (kcal/$Nm^3$) | | 2798 | 2721 | 2788 | 2740 |
| Slag | [X18] (kg/t · pig) | | 126 | 124 | 124 | 123 |
| | [X19] (%) | | 1.7 | 0.8 | 1.7 | 0.6 |
| | [X20] | | 1.1 | 1.1 | 1.1 | 1.1 |
| | [X21] (° C.) | | 1535 | 1540 | 1545 | 1540 |
| | [X22] (° C.) | | 1510 | 1510 | 1520 | 1520 |
| [X23] | [X24] (kg/t · pig) | | 25.0 | 28.6 | 24.6 | 27.9 |
| | C content (wt %) | | 27.7 | 29.3 | 27.5 | 29.0 |
| | T. Fe content (wt %) | | 8.1 | 27.5 | 28.3 | 27.7 |
| | Zn content (wt %) | | 3.2 | 3.0 | 3.2 | 3.1 |
| | [X25] (wt %) | | 0.9 | 1.1 | 1.1 | 0.8 |
| | [X26] (kg/t · pig) | | 0.14 | 0.20 | 0.17 | 0.14 |
| [X27] | (mg/$Nm^3$) | | 19 | 29 | 25 | 23 |

*1 PC: Pulverized coal ratio (kg/t · pig) SR: Waste plastics ratio, injected (kg/t · pig) $O_2$: Flow rate of oxygen ($Nm^3$/t · pig)
*2 Amount of oxygen added to air in Nos. 61 to 66, Nos. 69 to 74.
*3 Inv.: Inventive example Com.: Comparative example
[X1] : Charging from furnace top

TABLE 28-continued

[X·2] : Coke ratio
[X·3] : Converter slag ratio
[X·4] : Silica ratio
[X·5] : Injection from tuyere
[X·6] : Pulverized coal
[X·7] : Waste plastics
[X·8] : Polyvinyl chloride
[X·9] : Other than polyvinyl chloride
[X·10] : Air blowing
[X·11] : Temperature in front of tuyere
[X·12] : Air for secondary combustion
[X·13] : Furnace top
[X·14] : Furnace top temperature
[X·15] : Amount of exhaust gas
[X·16] : Composition of exhaust gas
[X·17] : Calorific value of exhaust gas
[X·18] : Slag ratio
[X·19] : FeO content in slag
[X·20] : CaO + MgO/SiO$_2$ in slag
[X·21] : Temperature of slag
[X·22] : Temperature of molten iron
[X·23] : Furnace top dust
[X·24] : Amount formed
[X·25] : Concentration of tar
[X·26] : Amount of tar formed
[X·27] : Concentration of gaseous tar
[X·28] : Dust

TABLE 29

| No. | | | 10 | 11 | 12 | 13 |
|---|---|---|---|---|---|---|
| Division *3 | | | Inv. | Inv. | Inv. | Inv. |
| Structure of tuyere | | | FIG. 3 | FIG. 3 | FIG. 3 | FIG. 3 |
| [X·1] | [X·2] (kg/t · pig) | | 195 | 194 | 195 | 189 |
| | [X·3] (kg/t · pig) | | 121 | 123 | 122 | 123 |
| | [X·4] (kg/t · pig) | | 6 | 5 | 6 | 6 |
| [X·5] | [X·6] (kg/t · pig) | | 132 | 140 | 131 | 127 |
| | [X·7] (kg/t · pig) | [X·8] | — | 10 | 10 | 20 |
| | | [X·9] | 80 | 70 | 75 | 80 |
| | [X·28] (kg/t · pig) | | 45 | 45 | 45 | 45 |
| | PC/O$_2$ *1 (kg/Nm$^3$) | | — | — | — | — |
| | PC + SR/O$_2$*1 (kg/Nm$^3$) | | 0.9 | 1.0 | 1.0 | 1.0 |
| [X·10] | Oxygen *2 (Nm$^3$/t · pig) | | 225 | 224 | 223 | 231 |
| | Air (Nm$^3$/t · pig) | | — | — | — | — |
| | Steam (kg/t · pig) | | 9 | 8 | 9 | 8 |
| | [X·11] (° C.) | | 2300 | 2300 | 2300 | 2300 |
| | [X·12] (Nm$^3$/t · pig) | | — | — | — | — |
| [X·13] | [X·14] (° C.) | | 250 | 250 | 250 | 250 |
| | [X·15] (Nm$^3$/t · pig) | | 692 | 673 | 695 | 702 |
| | [X·16] | CO (%) | 69.0 | 71.5 | 68.8 | 72.5 |
| | | CO$_2$ (%) | 0 | 0.3 | 0.1 | 0.2 |
| | | H$_2$ (%) | 27.4 | 24.4 | 27.3 | 23.4 |
| | | CH$_4$ (%) | — | — | — | — |
| | | C$_2$ (%) | — | — | — | — |
| | | C$_3$ (%) | — | — | — | — |
| | | C$_4$ (%) | — | — | — | — |
| | | N$_2$ (%) | 3.6 | 3.8 | 3.8 | 3.9 |
| | | HCl (ppm) | 0 | 3 | 3 | 4 |
| | [X·17] (kcal/Nm$^3$) | | 2790 | 2788 | 2781 | 2792 |
| Slag | [X·18] (kg/t · pig) | | 108 | 109 | 107 | 108 |
| | [X·19] (%) | | 0.9 | 0.9 | 1.0 | 0.8 |
| | [X·20] | | 1.1 | 1.1 | 1.1 | 1.1 |
| | [X·21] (° C.) | | 1545 | 1545 | 1540 | 1550 |
| | [X·22] (° C.) | | 1510 | 1515 | 1510 | 1520 |
| [X·23] | [X·24] (kg/t · pig) | | 24.7 | 24.7 | 24.7 | 24.6 |
| | C content (wt %) | | 28.4 | 28.5 | 28.2 | 28.3 |
| | T. Fe content (wt %) | | 28.5 | 29.0 | 28.7 | 28.8 |
| | Zn content (wt %) | | 3.1 | 3.1 | 3.0 | 3.1 |
| | [X·25] (wt %) | | 1.7 | 1.6 | 1.6 | 2.0 |
| | [X·26] (kg/t · pig) | | 0.30 | 0.28 | 0.28 | 0.35 |
| [X·27] | (mg/Nm$^3$) | | 89 | 72 | 55 | 118 |

*1 PC: Pulverized coal ratio (kg/t · pig) SR: Waste plastics ratio, injected (kg/t · pig) O$_2$: Flow rate of oxygen (Nm$^3$/t · pig)

TABLE 29-continued

*2 Amount of oxygen added to air in Nos. 61 to 66, Nos. 69 to 74.
*3 Inv.: Inventive example Com.: Comparative example
[X·1] : Charging from furnace top
[X·2] : Coke ratio
[X·3] : Converter slag ratio
[X·4] : Silica ratio
[X·5] : Injection from tuyere
[X·6] : Pulverized coal
[X·7] : Waste plastics
[X·8] : Polyvinyl chloride
[X·9] : Other than polyvinyl chloride
[X·10] : Air blowing
[X·11] : Temperature in front of tuyere
[X·12] : Air for secondary combustion
[X·13] : Furnace top
[X·14] : Furnace top temperature
[X·15] : Amount of exhaust gas
[X·16] : Composition of exhaust gas
[X·17] : Calorific value of exhaust gas
[X·18] : Slag ratio
[X·19] : FeO content in slag
[X·20] : CaO + MgO/SiO$_2$ in slag
[X·21] : Temperature of slag
[X·22] : Temperature of molten iron
[X·23] : Furnace top dust
[X·24] : Amount formed
[X·25] : Concentration of tar
[X·26] : Amount of tar formed
[X·27] : Concentration of gaseous tar
[X·28] : Dust

TABLE 30

| No. | | | 14 | 15 | 16 | 17 |
|---|---|---|---|---|---|---|
| Division *3 | | | Inv. | Inv. | Inv. | Inv. |
| Structure of tuyere | | | FIG. 3 | FIG. 3 | FIG. 3 | FIG. 4 |
| [X·1] | [X·2] (kg/t · pig) | | 191 | 190 | 192 | 193 |
| | [X·3] (kg/t · pig) | | 122 | 124 | 123 | 121 |
| | [X·4] (kg/t · pig) | | 5 | 5 | 5 | 4 |
| [X·5] | [X·6] (kg/t · pig) | | 124 | 140 | 93 | 140 |
| | [X·7] (kg/t · pig) | [X·8] | 30 | 50 | 50 | 10 |
| | | [X·9] | 70 | 50 | 80 | 70 |
| | [X·28] (kg/t · pig) | | 45 | 45 | 45 | 45 |
| | PC/O$_2$ *1 (kg/Nm$^3$) | | — | — | — | — |
| | PC + SR/O$_2$*1 (kg/Nm$^3$) | | 1.0 | 1.1 | 1.0 | 1.0 |
| [X·10] | Oxygen *2 (Nm$^3$/t · pig) | | 228 | 224 | 224 | 224 |
| | Air (Nm$^3$/t · pig) | | — | — | — | — |
| | Steam (kg/t · pig) | | 9 | 9 | 9 | 8 |
| | [X·11] (° C.) | | 2300 | 2300 | 2300 | 2300 |
| | [X·12] (Nm$^3$/t · pig) | | — | — | — | — |
| [X·13] | [X·14] (° C.) | | 250 | 250 | 250 | 250 |
| | [X·15] (Nm$^3$/t · pig) | | 685 | 680 | 714 | 674 |
| | [X·16] | CO (%) | 69.7 | 72.5 | 77.3 | 75.4 |
| | | CO$_2$ (%) | 0.1 | 0.3 | 0.2 | 0.1 |
| | | H$_2$ (%) | 26.5 | 23.6 | 18.7 | 21.0 |
| | | CH$_4$ (%) | — | — | — | — |
| | | C$_2$ (%) | — | — | — | — |
| | | C$_3$ (%) | — | — | — | — |
| | | C$_4$ (%) | — | — | — | — |
| | | N$_2$ (%) | 3.7 | 3.6 | 3.8 | 3.5 |
| | | HCl (ppm) | 7 | 6 | 7 | 2 |
| | [X·17] (kcal/Nm$^3$) | | 2788 | 2798 | 2822 | 2818 |
| Slag | [X·18] (kg/t · pig) | | 106 | 110 | 101 | 108 |
| | [X·19] (%) | | 0.8 | 1.0 | 1.3 | 0.9 |
| | [X·20] | | 1.1 | 1.1 | 1.1 | 1.1 |
| | [X·21] (° C.) | | 1535 | 1540 | 1530 | 1550 |
| | [X·22] (° C.) | | 1505 | 1505 | 1500 | 1525 |
| [X·23] | [X·24] (kg/t · pig) | | 24.1 | 24.5 | 22.4 | 24.5 |
| | C content (wt %) | | 26.5 | 26.0 | 26.2 | 28.8 |
| | T. Fe content (wt %) | | 28.0 | 28.4 | 28.1 | 28.5 |
| | Zn content (wt %) | | 3.3 | 3.2 | 3.5 | 3.2 |

TABLE 30-continued

| No. | | 14 | 15 | 16 | 17 |
|---|---|---|---|---|---|
| | [X25] (wt %) | 1.7 | 2.4 | 2.4 | 1.1 |
| | [X26] (kg/t · pig) | 0.29 | 0.42 | 0.34 | 0.19 |
| [X27] | (mg/Nm$^3$) | 89 | 140 | 165 | 58 |

*1 PC: Pulverized coal ratio (kg/t · pig) SR: Waste plastics ratio, injected (kg/t · pig) O$_2$: Flow rate of oxygen (Nm$^3$/t · pig)
*2 Amount of oxygen added to air in Nos. 61 to 66, Nos. 69 to 74.
*3 Inv.: Inventive example Com.: Comparative example
[X1] : Charging from furnace top
[X2] : Coke ratio
[X3] : Converter slag ratio
[X4] : Silica ratio
[X5] : Injection from tuyere
[X6] : Pulverized coal
[X7] : Waste plastics
[X8] : Polyvinyl chloride
[X9] : Other than polyvinyl chloride
[X10] : Air blowing
[X11] : Temperature in front of tuyere
[X12] : Air for secondary combustion
[X13] : Furnace top
[X14] : Furnace top temperature
[X15] : Amount of exhaust gas
[X16] : Composition of exhaust gas
[X17] : Calorific value of exhaust gas
[X18] : Slag ratio
[X19] : FeO content in slag
[X20] : CaO + MgO/SiO$_2$ in slag
[X21] : Temperature of slag
[X22] : Temperature of molten iron
[X23] : Furnace top dust
[X24] : Amount formed
[X25] : Concentration of tar
[X26] : Amount of tar formed
[X27] : Concentration of gaseous tar
[X28] : Dust

TABLE 31

| No. | | 18 | 19 | 20 | 21 |
|---|---|---|---|---|---|
| Division *3 | | Inv. | Inv. | Inv. | Inv. |
| Structure of tuyere | | FIG. 4 | FIG. 4 | FIG. 10 | FIG. 10 |
| [X1] | [X2] (kg/t · pig) | 188 | 190 | 193 | 188 |
| | [X3] (kg/t · pig) | 121 | 124 | 121 | 121 |
| | [X4] (kg/t · pig) | 4 | 5 | 4 | 4 |
| [X5] | [X6] (kg/t · pig) | 127 | 140 | 140 | 127 |
| | [X7]    [X8] | 20 | 50 | 10 | 20 |
| | (kg/t · pig) [X9] | 80 | 50 | 70 | 80 |
| | [X28] (kg/t · pig) | 45 | 45 | 45 | 45 |
| | PC/O$_2$ *1 (kg/Nm$^3$) | — | — | — | — |
| | PC + SR/O$_2$*1 (kg/Nm$^3$) | 1.0 | 1.1 | 1.0 | 1.0 |
| [X10] | Oxygen *2 (Nm$^3$/t · pig) | 231 | 224 | 224 | 230 |
| | Air (Nm$^3$/t · pig) | — | — | — | — |
| | Steam (kg/t · pig) | 8 | 9 | 8 | 8 |
| [X11] | (° C.) | 2300 | 2300 | 2300 | 2300 |
| | [X12] (Nm$^3$/t · pig) | — | — | — | — |
| [X13] | [X14] (° C.) | 250 | 250 | 250 | 250 |
| | [X15] (Nm$^3$/t · pig) | 702 | 680 | 674 | 700 |
| | [X16]    CO (%) | 72.8 | 71.9 | 72.7 | 73.2 |
| | CO$_2$ (%) | 0.2 | 0.2 | 0.1 | 0.1 |
| | H$_2$ (%) | 23.3 | 24.6 | 23.6 | 23.2 |
| | CH$_4$ (%) | — | — | — | — |
| | C$_2$ (%) | — | — | — | — |
| | C$_3$ (%) | — | — | — | — |
| | C$_4$ (%) | — | — | — | — |
| | N$_2$ (%) | 3.7 | 3.3 | 3.6 | 3.5 |
| | HCl (ppm) | 4 | 5 | 2 | 3 |
| | [X17] (kcal/Nm$^3$) | 2799 | 2805 | 2804 | 2808 |
| Slag | [X18] (kg/t · pig) | 108 | 110 | 110 | 108 |
| | [X19] (%) | 0.8 | 0.9 | 0.9 | 0.8 |
| | [X20] | 1.1 | 1.1 | 1.1 | 1.1 |
| | [X21] (° C.) | 1535 | 1545 | 1540 | 1530 |
| | [X22] (° C.) | 1515 | 1520 | 1520 | 1500 |
| [X23] | [X24] (kg/t · pig) | 24.4 | 24.5 | 24.5 | 24.3 |

TABLE 31-continued

| No. | | 18 | 19 | 20 | 21 |
|---|---|---|---|---|---|
| | C content (wt %) | 28.1 | 26.4 | 28.5 | 28.2 |
| | T. Fe content (wt %) | 29.1 | 28.6 | 2.8.5 | 29.0 |
| | Zn content (wt %) | 3.1 | 3.2 | 3.2 | 3.2 |
| | [X25] (wt %) | 2.0 | 2.3 | 0.8 | 1.8 |
| | [X26] (kg/t · pig) | 0.34 | 0.40 | 0.14 | 0.31 |
| [X27] | (mg/Nm$^3$) | 121 | 131 | 65 | 135 |

*1 PC: Pulverized coal ratio (kg/t · pig) SR: Waste plastics ratio, injected (kg/t · pig) O$_2$: Flow rate of oxygen (Nm$^3$/t · pig)
*2 Amount of oxygen added to air in Nos. 61 to 66, Nos. 69 to 74.
*3 Inv.: Inventive example Com.: Comparative example
[X1] : Charging from furnace top
[X2] : Coke ratio
[X3] : Converter slag ratio
[X4] : Silica ratio
[X5] : Injection from tuyere
[X6] : Pulverized coal
[X7] : Waste plastics
[X8] : Polyvinyl chloride
[X9] : Other than polyvinyl chloride
[X10] : Air blowing
[X11] : Temperature in front of tuyere
[X12] : Air for secondary combustion
[X13] : Furnace top
[X14] : Furnace top temperature
[X15] : Amount of exhaust gas
[X16] : Composition of exhaust gas
[X17] : Calorific value of exhaust gas
[X18] : Slag ratio
[X19] : FeO content in slag
[X20] : CaO + MgO/SiO$_2$ in slag
[X21] : Temperature of slag
[X22] : Temperature of molten iron
[X23] : Furnace top dust
[X24] : Amount formed
[X25] : Concentration of tar
[X26] : Amount of tar formed
[X27] : Concentration of gaseous tar
[X28] : Dust

TABLE 32

| No. | | 22 | 23 | 24 | 25 |
|---|---|---|---|---|---|
| Division *3 | | Inv. | Inv. | Inv. | Inv. |
| Structure of tuyere | | FIG. 10 | FIG. 3 | FIG. 3 | FIG. 3 |
| [X1] | [X2] (kg/t · pig) | 190 | 193 | 193 | 193 |
| | [X3] (kg/t · pig) | 124 | 122 | 122 | 122 |
| | [X4] (kg/t · pig) | 5 | 5 | 6 | 5 |
| [X5] | [X6] (kg/t · pig) | 140 | 69 | 46 | 22 |
| | [X7]    [X8] | 50 | 20 | 20 | 20 |
| | (kg/t · pig) [X9] | 50 | 125 | 140 | 155 |
| | [X28] (kg/t · pig) | 45 | 45 | 45 | 45 |
| | PC/O$_2$ *1 (kg/Nm$^3$) | — | — | — | — |
| | PC + SR/O$_2$*1 (kg/Nm$^3$) | 1.1 | 1.0 | 0.9 | 0.9 |
| [X10] | Oxygen *2 (Nm$^3$/t · pig) | 224 | 223 | 223 | 223 |
| | Air (Nm$^3$/t · pig) | — | — | — | — |
| | Steam (kg/t · pig) | 9 | 9 | 8 | 9 |
| [X11] | (° C.) | 2300 | 2300 | 2300 | 2300 |
| | [X12] (Nm$^3$/t · pig) | — | — | — | — |
| [X13] | [X14] (° C.) | 250 | 250 | 250 | 250 |
| | [X15] (Nm$^3$/t · pig) | 680 | 710 | 729 | 738 |
| | [X16]    CO (%) | 72.4 | 73.7 | 75.7 | 78.9 |
| | CO$_2$ (%) | 0.1 | 0.2 | 0.3 | 0.2 |
| | H$_2$ (%) | 24.2 | 22.6 | 20.7 | 17.4 |
| | CH$_4$ (%) | — | — | — | — |
| | C$_2$ (%) | — | — | — | — |
| | C$_3$ (%) | — | — | — | — |
| | C$_4$ (%) | — | — | — | — |
| | N$_2$ (%) | 3.3 | 3.5 | 3.3 | 3.5 |
| | HCl (ppm) | 2 | 27 | 53 | 95 |
| | [X17] (kcal/Nm$^3$) | 2810 | 2808 | 2819 | 2831 |
| Slag | [X18] (kg/t · pig) | 108 | 93 | 88 | 84 |
| | [X19] (%) | 0.8 | 1.3 | 1.2 | 1.8 |
| | [X20] | 1.1 | 1.1 | 1.1 | 1.1 |

TABLE 32-continued

| No. | | | 22 | 23 | 24 | 25 |
|---|---|---|---|---|---|---|
| | [X21] | (° C.) | 1540 | 1540 | 1545 | 1530 |
| | [X22] | (° C.) | 1505 | 1510 | 1520 | 1500 |
| [X23] | [X24] | (kg/t · pig) | 24.3 | 22.6 | 22.3 | 22.0 |
| | C content | (wt %) | 26.1 | 25.6 | 25.8 | 26.4 |
| | T. Fe content | (wt %) | 28.8 | 27.5 | 27.0 | 29.1 |
| | Zn content | (wt %) | 3.3 | 3.5 | 3.5 | 3.6 |
| | [X25] | (wt %) | 1.9 | 2.8 | 2.6 | 3.7 |
| | [X26] | (kg/t · pig) | 0.32 | 0.42 | 0.38 | 0.53 |
| [X27] | | (mg/Nm³) | 157 | 218 | 251 | 315 |

*1 PC: Pulverized coal ratio (kg/t · pig) SR: Waste plastics ratio, injected (kg/t · pig) $O_2$: Flow rate of oxygen (Nm³/t · pig)
*2 Amount of oxygen added to air in Nos. 38 to 43, Nos. 46 to 51.
*3 Inv.: Inventive example Com.: Comparative example
[X1] : Charging from furnace top
[X2] : Coke ratio
[X3] : Converter slag ratio
[X4] : Silica ratio
[X5] : Injection from tuyere
[X6] : Pulverized coal
[X7] : Waste plastics
[X8] : Polyvinyl chloride
[X9] : Other than polyvinyl chloride
[X10] : Air blowing
[X11] : Temperature in front of tuyere
[X12] : Air for secondary combustion
[X13] : Furnace top
[X14] : Furnace top temperature
[X15] : Amount of exhaust gas
[X16] : Composition of exhaust gas
[X17] : Calorific value of exhaust gas
[X18] : Slag ratio
[X19] : FeO content in slag
[X20] : CaO + MgO/$SiO_2$ in slag
[X21] : Temperature of slag
[X22] : Temperature of molten iron
[X23] : Furnace top dust
[X24] : Amount formed
[X25] : Concentration of tar
[X26] : Amount of tar formed
[X27] : Concentration of gaseous tar
[X28] : Dust

TABLE 33

| No. | | | 26 | 27 |
|---|---|---|---|---|
| Division | | *3 | Inv. | Inv. |
| Structure of tuyere | | | FIG. 2 | FIG. 2 |
| [X1] | [X2] | (kg/t · pig) | 282 | 191 |
| | [X3] | (kg/t · pig) | 120 | 120 |
| | [X4] | (kg/t · pig) | — | 5 |
| | [X7] | [X8] | — | — |
| | | (kg/t · pig) | [X9] | 20 | 20 |
| [X5] | [X6] | (kg/t · pig) | 120 | 216 |
| | [X7] | [X8] | — | — |
| | (kg/t · pig) | [X9] | — | — |
| | [X28] | (kg/t · pig) | 45 | 45 |
| | PC/$O_2$ | *1 (kg/Nm³) | 0.61 | 1.02 |
| | PC + SR/$O_2$ | *1 (kg/Nm³) | — | — |
| [X10] | Oxygen | *2 (Nm³/t · pig) | 197 | 212 |
| | Air | (Nm³/t · pig) | — | — |
| | Steam | (kg/t · pig) | 66 | 38 |
| | [X11] | (° C.) | 2300 | 2300 |
| | [X12] | (Nm³/t · pig) | — | — |
| [X13] | [X14] | (° C.) | 510 | 510 |
| | [X15] | (Nm³/t · pig) | 643 | 668 |
| | [X16] | CO (%) | 70.5 | 71.0 |
| | | $CO_2$ (%) | — | — |
| | | $H_2$ (%) | 14.3 | 15.0 |
| | | $CH_4$ (%) | 4.8 | 5.0 |
| | | $C_2$ (%) | 1.4 | 1.5 |
| | | $C_3$ (%) | 3.1 | 3.0 |
| | | $C_4$ (%) | 0.7 | 1.0 |
| | | $N_2$ (%) | 5.2 | 3.5 |

TABLE 33-continued

| No. | | | 26 | 27 |
|---|---|---|---|---|
| | HCl | (ppm) | — | — |
| | [X17] | (kcal/Nm³) | 3968 | 4098 |
| Slag | [X18] | (kg/t · pig) | 123 | 127 |
| | [X19] | (%) | 1.3 | 0.9 |
| | [X20] | | 1.1 | 1.1 |
| | [X21] | (° C.) | 1525 | 1535 |
| | [X22] | (° C.) | 1500 | 1500 |
| [X23] | [X24] | (kg/t · pig) | 22.3 | 25.1 |
| | C content | (wt %) | 28.5 | 27.7 |
| | T.Fe content | (wt %) | 26.2 | 26.0 |
| | Zn content | (wt %) | 4.6 | 4.6 |
| | [X25] | (wt %) | 4.8 | 0.9 |
| | [X26] | (kg/t · pig) | 0.2 | 0.1 |
| [X27] | | (mg/Nm³) | 732 | 645 |

*1 PC: Pulverized coal ratio (kg/t · pig)
SR: Waste plastics ratio, injected (kg/t · pig)
$O_2$: Flow rate of oxygen (Nm³/t · pig)
*2 Amount of oxygen added to air in Nos.61 to 66, Nos.69 to 74.
*3 Inv.: Inventive example
Com.: Comparative example
[X1]: Charging from furnace top
[X2]: Coke ratio
[X3]: Converter slag ratio
[X4]: Silica ratio
[X5]: Injection from tuyere
[X6]: Pulverized coal
[X7]: Waste plastics
[X8]: Polyvinyl chloride
[X9]: Other than polyvinyl chloride
[X10]: Air blowing
[X11]: Temperature in front of tuyere
[X12]: Air for secondary combustion
[X13]: Furnace top
[X14]: Furnace top temperature
[X15]: Amount of exhaust gas
[X16]: Composition of exhaust gas
[X17]: Calorific value of exhaust gas
[X18]: Slag ratio
[X19]: FeO content in slag
[X20]: CaO + MgO/$SiO_2$ in slag
[X21]: Temperature of slag
[X22]: Temperature of molten iron
[X23]: Furnace top dust
[X24]: Amount formed
[X25]: Concentration of tar
[X26]: Amount of tar formed
[X27]: Concentration of gaseous tar
[X28]: Dust

TABLE 34

| No. | | | 28 | 29 | 30 | 31 |
|---|---|---|---|---|---|---|
| Division | | *3 | Inv. | Inv. | Inv. | Inv. |
| Structure of tuyere | | | FIG. 10 | FIG. 3 | FIG. 3 | FIG. 3 |
| [X1] | [X2] | (kg/t · pig) | 259 | 281 | 194 | 265 |
| | [X3] | (kg/t · pig) | 121 | 120 | 120 | 121 |
| | [X4] | (kg/t · pig) | 5 | 4 | 4 | 5 |
| | [X7] | [X8] | — | — | — | — |
| | (kg/t · pig) | [X9] | 20 | 20 | 20 | 20 |
| [X5] | [X6] | (kg/t · pig) | 282 | 74 | 133 | 175 |
| | [X7] | [X8] | — | — | — | — |
| | (kg/t · pig) | [X9] | — | 45 | 80 | 105 |
| | [X28] | (kg/t · pig) | 45 | 45 | 45 | 45 |
| | PC/$O_2$ *1 (kg/Nm³) | | 1.38 | — | — | — |
| | PC + SR/$O_2$ *1 (kg/Nm³) | | — | 0.60 | 1.00 | 1.36 |
| [X10] | Oxygen | *2 (Nm³/t · pig) | 204 | 198 | 214 | 206 |
| | Air | (Nm³/t · pig) | — | — | — | — |
| | Steam | (kg/t · pig) | 7 | 66 | 8 | 7 |
| | [X11] | (° C.) | 2300 | 2300 | 2300 | 2300 |
| | [X12] | (Nm³/t · pig) | — | — | — | — |
| [X13] | [X14] | (° C.) | 510 | 510 | 510 | 510 |
| | [X15] | (Nm³/t · pig) | 621 | 654 | 686 | 630 |
| | [X16] | CO (%) | 62.9 | 76.6 | 65.3 | 61.3 |

TABLE 34-continued

| No. | | | 28 | 29 | 30 | 31 |
|---|---|---|---|---|---|---|
| | $CO_2$ (%) | | — | — | — | — |
| | $H_2$ (%) | | 21.5 | 15.1 | 22.9 | 25.1 |
| | $CH_4$ (%) | | 5.8 | 3.0 | 5.7 | 5.9 |
| | $C_2$ (%) | | 1.5 | 0.7 | 1.2 | 1.3 |
| | $C_3$ (%) | | 3.0 | 1.1 | 2.9 | 3.0 |
| | $C_4$ (%) | | 1.1 | 0.3 | 0.9 | 0.9 |
| | $N_2$ (%) | | 4.2 | 3.2 | 1.1 | 2.5 |
| | HCl (ppm) | | — | — | — | — |
| | [※17] (kcal/Nm³) | | 4117 | 3380 | 4096 | 4084 |
| Slag | [※18] (kg/t · pig) | | 125 | 114 | 117 | 110 |
| | [※19] (%) | | 0.8 | 1.6 | 1.4 | 1.0 |
| | [※20] | | 1.1 | 1.1 | 1.1 | 1.1 |
| | [※21] (° C.) | | 1540 | 1540 | 1545 | 1550 |
| | [※22] (° C.) | | 1510 | 1520 | 1520 | 1520 |
| [※23] | [※24] (kg/t · pig) | | 30.3 | 19.6 | 22.8 | 24.5 |
| | C content (wt %) | | 27.2 | 28.3 | 27.6 | 27.7 |
| | T. Fe content (wt %) | | 25.4 | 26.0 | 25.5 | 24.5 |
| | Zn content (wt %) | | 4.5 | 5.2 | 5.1 | 5.1 |
| | [※25] (wt %) | | 0.5 | 0.5 | 2.9 | 3.7 |
| | [※26] (kg/t · pig) | | 0.1 | 0.1 | 0.1 | 0.7 |
| [※27] | (mg/Nm³) | | 520 | 798 | 725 | 859 |

*1 PC: Pulverized coal ratio (kg/t · pig) SR: Waste plastics ratio, injected (kg/t · pig) $O_2$: Flow rate of oxygen (Nm³/t · pig)
*2 Amount of oxygen added to air in Nos. 61 to 66, Nos. 69 to 74.
*3 Inv.: Inventive example Com.: Comparative example

[※1] : Charging from furnace top
[※2] : Coke ratio
[※3] : Converter slag ratio
[※4] : Silica ratio
[※5] : Injection from tuyere
[※6] : Pulverized coal
[※7] : Waste plastics
[※8] : Polyvinyl chloride
[※9] : Other than polyvinyl chloride
[※10] : Air blowing
[※11] : Temperature in front of tuyere
[※12] : Air for secondary combustion
[※13] : Furnace top
[※14] : Furnace top temperature
[※15] : Amount of exhaust gas
[※16] : Composition of exhaust gas
[※17] : Calorific value of exhaust gas
[※18] : Slag ratio
[※19] : FeO content in slag
[※20] : CaO + MgO/$SiO_2$ in slag
[※21] : Temperature of slag
[※22] : Temperature of molten iron
[※23] : Furnace top dust
[※24] : Amount formed
[※25] : Concentration of tar
[※26] : Amount of tar formed
[※27] : Concentration of gaseous tar
[※28] : dust

TABLE 35

| No. | | | | 32 | 33 | 34 | 35 |
|---|---|---|---|---|---|---|---|
| Division | | | *3 | Inv. | Inv. | Inv. | Inv. |
| Structure of tuyere | | | | FIG. 4 | FIG. 4 | FIG. 4 | FIG. 4 |
| [※1] | [※2] | | (kg/t.pig) | 190 | 257 | 193 | 264 |
| | [※3] | | (kg/t.pig) | 120 | 120 | 120 | 120 |
| | [※4] | | (kg/t.pig) | 5 | 5 | 4 | 4 |
| | [※7] | [※8] | | — | — | — | — |
| | (kg/t.pig) | [※9] | | 20 | 20 | 20 | 20 |
| [※5] | [%6] | | (kg/t.pig) | 218 | 282 | 133 | 175 |
| | [※7] | [※8] | | — | — | — | — |
| | (kg/t.pig) | [※9] | | — | — | 80 | 105 |
| | [※28] | | (kg/t.pig) | 45 | 45 | 45 | 45 |
| | PC/$O_2$ | *1 | (kg/Nm³) | 1.02 | 1.38 | — | — |
| | PC + SR/$O_2$ | *1 | (kg/Nm³) | — | — | 1.00 | 1.36 |
| [※10] | Oxygen | *2 | (Nm³/t.pig) | 212 | 204 | 214 | 205 |
| | Air | | (Nm³/t.pig) | — | — | — | — |
| | Steam | | (kg/t.pig) | 38 | 7 | 8 | 7 |
| | [※11] | | (° C.) | 2300 | 2300 | 2300 | 2300 |
| | [※12] | | (Nm³/t.pig) | — | — | — | — |
| [※13] | [※14] | | (° C.) | 510 | 510 | 510 | 510 |
| | [※15] | | (Nm³/t.pig) | 670 | 622 | 688 | 631 |
| | [※16] | CO | (%) | 70.5 | 62.0 | 64.9 | 61.5 |
| | | $CO_2$ | (%) | — | — | — | — |
| | | $H_2$ | (%) | 15.0 | 22.0 | 25.2 | 26.8 |
| | | $CH_4$ | (%) | 4.3 | 5.0 | 4.9 | 5.0 |
| | | $C_2$ | (%) | 1.2 | 1.7 | 0.9 | 0.9 |
| | | $C_3$ | (%) | 2.9 | 3.0 | 1.8 | 2.1 |
| | | $C_4$ | (%) | 1.1 | 1.0 | 0.2 | 0.3 |
| | | $N_2$ | (%) | 5.0 | 5.3 | 2.1 | 3.4 |
| | | HCl | (ppm) | — | — | — | — |
| | [※17] | | (kcal/Nm³) | 3985 | 4036 | 3599 | 3637 |
| Slag | [※18] | | (kg/t.pig) | 127 | 124 | 119 | 111 |
| | [※19] | | (%) | 1.0 | 0.8 | 0.9 | 0.9 |

TABLE 35-continued

| No. | | | | 32 | 33 | 34 | 35 |
|---|---|---|---|---|---|---|---|
| | [X20] | | | 1.1 | 1.1 | 1.1 | 1.1 |
| | [X21] | | (° C.) | 1545 | 1535 | 1540 | 1545 |
| | [X22] | | (° C.) | 1515 | 1500 | 1505 | 1520 |
| [X23] | [X24] | | (kg/t.pig) | 24.5 | 29.6 | 22.0 | 23.6 |
| | C content | | (wt %) | 26.8 | 27.0 | 27.8 | 27.9 |
| | T. Fe content | | (wt %) | 26.1 | 25.7 | 25.8 | 25.1 |
| | Zn content | | (wt %) | 4.6 | 4.6 | 5.1 | 5.2 |
| | [X25] | | (wt %) | 0.2 | 0.1 | 0.1 | 0.2 |
| | [X26] | | (kg/t.pig) | 0.04 | 0.02 | 0.01 | 0.03 |
| [X27] | | | (mg/Nm$^3$) | 300 | 299 | 431 | 459 |

*1 PC: Pulverized coal ratio (kg/t.pig)
SR: Waste plastics ratio, injected (kg/t.pig)
O$_2$: Flow rate of oxygen (Nm$^3$/t.pig)
*2 Amount of oxygen added to air in Nos. 61 to 66, Nos. 69 to 74.
*3 Inv.: Inventive example
Com.: Comparative example
[X1]: Charging from furnace top
[X2]: Coke ratio
[X3]: Converter slag ratio
[X4]: Silica ratio
[X5]: Injection from tuyere
[X6]: Pulverized coal
[X7]: Waste plastics
[X8]: Polyvinyl chloride
[X9]: Other than polyvinyl chloride
[X10]: Air blowing
[X11]: Temperature in front of tuyere
[X12]: Air for secondary combustion
[X13]: Furnace top
[X14]: Furnace top temperature
[X15]: Amount of exhaust gas
[X16]: Composition of exhaust gas
[X17]: Calorific value of exhaust gas
[X18]: Slag ratio
[X19]: FeO content in slag
[X20]: CaO + MgO/SiO$_2$ in slag
[X21]: Temperature of slag
[X22]: Temperature of molten iron
[X23]: Furnace top dust
[X24]: Amount formed
[X25]: Concentration of tar
[X26]: Amount of tar formed
[X27]: Concentration of gaseous tar
[X28]: Dust

TABLE 36

| No. | | | | 36 | 37 | 38 | 39 |
|---|---|---|---|---|---|---|---|
| Division | | | *3 | Inv. | Inv. | Inv. | Inv. |
| Structure of tuyere | | | | FIG. 10 | FIG. 10 | FIG. 10 | FIG. 10 |
| [X1] | [X2] | | (kg/t.pig) | 190 | 256 | 192 | 264 |
| | [X3] | | (kg/t.pig) | 120 | 121 | 120 | 121 |
| | [X4] | | (kg/t.pig) | 4 | 5 | 5 | 5 |
| | [X7] | [X8] | | — | — | — | — |
| | (kg/t.pig) | [X9] | | 20 | 20 | 20 | 20 |
| [X5] | [X6] | | (kg/t.pig) | 219 | 282 | 133 | 177 |
| | [X7] | [X8] | | — | — | — | — |
| | (kg/t.pig) | [X9] | | — | — | 80 | 105 |
| | [X28] | | (kg/t.pig) | 45 | 45 | 45 | 45 |
| | PC/O$_2$ | *1 | (kg/Nm$^3$) | 1.03 | 1.38 | — | — |
| | PC + SR/O$_2$ | *1 | (kg/Nm$^3$) | — | — | 1.00 | 1.36 |
| [X10] | Oxygen | *2 | (Nm$^3$/t.pig) | 212 | 204 | 214 | 205 |
| | Air | | (Nm$^3$/t.pig) | — | — | — | — |
| | Steam | | (kg/t.pig) | 38 | 7 | 8 | 7 |
| | [X11] | | (° C.) | 2300 | 2300 | 2300 | 2300 |
| | [X12] | | (Nm$^3$/t.pig) | — | — | — | — |
| [X13] | [X14] | | (° C.) | 510 | 510 | 510 | 510 |
| | [X15] | | (Nm$^3$/t.pig) | 670 | 623 | 688 | 630 |
| | [X16] | CO | (%) | 70.1 | 64.2 | 61.1 | 62.5 |
| | | CO$_2$ | (%) | — | — | — | — |
| | | H$_2$ | (%) | 16.7 | 23.1 | 28.9 | 27.5 |
| | | CH$_4$ | (%) | 3.9 | 4.1 | 3.1 | 4.2 |
| | | C$_2$ | (%) | 0.9 | 1.0 | 0.6 | 0.7 |

TABLE 36-continued

| No. | | | | 36 | 37 | 38 | 39 |
|---|---|---|---|---|---|---|---|
| | | $C_3$ | (%) | 2.1 | 2.3 | 1.0 | 0.9 |
| | | $C_4$ | (%) | 0.3 | 0.5 | 0.1 | 0.2 |
| | | $N_2$ | (%) | 5.1 | 4.8 | 5.2 | 4.0 |
| | | HCl | (ppm) | — | — | — | — |
| | [X17] | | (kcal/Nm³) | 3569 | 3660 | 3184 | 3307 |
| Slag | [X18] | | (kg/t.pig) | 126 | 125 | 118 | 111 |
| | [X19] | | (%) | 0.9 | 0.8 | 0.7 | 0.7 |
| | [X20] | | | 1.1 | 1.1 | 1.1 | 1.1 |
| | [X21] | | (° C.) | 1530 | 1545 | 1535 | 1530 |
| | [X22] | | (° C.) | 1495 | 1515 | 1515 | 1510 |
| [X23] | [X24] | | (kg/t.pig) | 24.3 | 29.4 | 21.8 | 23.3 |
| | C content | | (wt %) | 26.5 | 26.8 | 27.7 | 27.6 |
| | T. Fe content | | (wt %) | 26.0 | 25.8 | 25.7 | 25.3 |
| | Zn content | | (wt %) | 4.6 | 4.7 | 5.2 | 5.2 |
| | [X25] | | (wt %) | 0.1 | 0.1 | 0.1 | 0.1 |
| | [X26] | | (kg/t.pig) | 0.02 | 0.02 | 0.01 | 0.02 |
| [X27] | | | (mg/Nm³) | 58 | 65 | 103 | 121 |

*1 PC: Pulverized coal ratio (kg/t.pig)
SR: Waste plastics ratio, injected (kg/t.pig)
$O_2$: Flow rate of oxygen (Nm³/t.pig)
*2 Amount of oxygen added to air in Nos. 61 to 66, Nos. 69 to 74.
*3 Inv.: Inventive example
Com.: Comparative example
[X1]: Charging from furnace top
[X2]: Coke ratio
[X3]: Converter slag ratio
[X4]: Silica ratio
[X5]: Injection from tuyere
[X6]: Pulverized coal
[X7]: Waste plastics
[X8]: Polyvinyl chloride
[X9]: Other than polyvinyl chloride
[X10]: Air blowing
[X11]: Temperature in front of tuyere
[X12]: Air for secondary combustion
[X13]: Furnace top
[X14]: Furnace top temperature
[X15]: Amount of exhaust gas
[X16]: Composition of exhaust gas
[X17]: Calorific value of exhaust gas
[X18]: Slag ratio
[X19]: FeO content in slag
[X20]: CaO + MgO/$SiO_2$ in slag
[X21]: Temperature of slag
[X22]: Temperature of molten iron
[X23]: Furnace top dust
[X24]: Amount formed
[X25]: Concentration of tar
[X26]: Amount of tar formed
[X27]: Concentration of gaseous tar
[X28]: Dust

TABLE 37

| No. | | | | 40 | 41 | 42 |
|---|---|---|---|---|---|---|
| Division | | | *3 | Inv. | Inv. | Inv. |
| Structure of tuyere | | | | FIG. 3 | FIG. 4 | FIG. 10 |
| [X1] | [X2] | | (kg/t.pig) | 182 | 182 | 181 |
| | [X3] | | (kg/t.pig) | 123 | 120 | 121 |
| | [X4] | | (kg/t.pig) | 6 | 4 | 4 |
| | [X7] | [X8] | | — | — | — |
| | | | (kg/t.pig) | 40 | 40 | 40 |
| [X5] | [X6] | | (kg/t.pig) | 207 | 207 | 209 |
| | [X7] | [X8] | | — | — | — |
| | | [X9] | (kg/t.pig) | — | — | — |
| | [X28] | | (kg/t.pig) | 45 | 45 | 45 |
| | PC/$O_2$ | *1 | (kg/Nm³) | 1.01 | 1.01 | 1.02 |
| | PC + SR/$O_2$ | *1 | (kg/Nm³) | — | — | — |
| [X10] | Oxygen | *2 | (Nm³/t.pig) | 205 | 205 | 204 |
| | Air | | (Nm³/t.pig) | — | — | — |
| | Steam | | (kg/t.pig) | 37 | 37 | 36 |
| | [X11] | | (° C.) | 2300 | 2300 | 2300 |
| [X12] | | | (Nm³/t.pig) | — | — | — |
| [X13] | [X14] | | (° C.) | 510 | 510 | 510 |
| | [X15] | | (Nm³/t.pig) | 673 | 673 | 675 |
| | [X16] | CO | (%) | 62.3 | 56.4 | 58.9 |
| | | $CO_2$ | (%) | — | — | — |
| | | $H_2$ | (%) | 21.4 | 27.9 | 25.1 |
| | | $CH_4$ | (%) | 5.8 | 6.1 | 5.6 |
| | | $C_2$ | (%) | 1.9 | 1.9 | 1.5 |
| | | $C_3$ | (%) | 3.5 | 3.2 | 3.0 |
| | | $C_4$ | (%) | 1.8 | 1.5 | 0.9 |
| | | $N_2$ | (%) | 3.3 | 3.0 | 5.0 |
| | | HCl | (ppm) | — | — | — |
| | [X17] | | (kcal/Nm³) | 4460 | 4327 | 4015 |
| Slag | [X18] | | (kg/t.pig) | 120 | 120 | 119 |
| | [X19] | | (%) | 0.8 | 0.8 | 0.7 |
| | [X20] | | | 1.1 | 1.1 | 1.1 |
| | [X21] | | (° C.) | 1540 | 1530 | 1550 |

TABLE 37-continued

| No. | | | 40 | 41 | 42 |
|---|---|---|---|---|---|
| [X23] | [X22] | (° C.) | 1515 | 1510 | 1520 |
| | [X24] | (kg/t.pig) | 23.4 | 23.2 | 23.0 |
| | C content | (wt %) | 27.5 | 26.9 | 26.6 |
| | T. Fe content | (wt %) | 26.3 | 26.0 | 25.8 |
| | Zn content | (wt %) | 4.7 | 4.7 | 4.7 |
| | [X25] | (wt %) | 2.1 | 0.4 | 0.3 |
| | [X26] | (kg/t.pig) | 0.2 | 0.1 | 0.1 |
| [X27] | | (mg/Nm³) | 708 | 451 | 102 |

*1 PC: Pulverized coal ratio (kg/t.pig)
SR: Waste plastics ratio, injected (kg/t.pig)
O₂: Flow rate of oxygen (Nm³/t.pig)
*2 Amount of oxygen added to air in Nos. 61 to 66, Nos. 69 to 74.
*3 Inv.: Inventive example
Com.: Comparative example
[X1]: Charging from furnace top
[X2]: Coke ratio
[X3]: Converter slag ratio
[X4]: Silica ratio
[X5]: Injection from tuyere
[X6]: Pulverized coal
[X7]: Waste plastics
[X8]: Polyvinyl chloride
[X9]: Other than polyvinyl chloride
[X10]: Air blowing
[X11]: Temperature in front of tuyere
[X12]: Air for secondary combustion
[X13]: Furnace top
[X14]: Furnace top temperature
[X15]: Amount of exhaust gas
[X16]: Composition of exhaust gas
[X17]: Calorific value of exhaust gas
[X18]: Slag ratio
[X19]: FeO content in slag
[X20]: CaO + MgO/SiO₂ in slag
[X21]: Temperature of slag
[X22]: Temperature of molten iron
[X23]: Furnace top dust
[X24]: Amount formed
[X25]: Concentration of tar
[X26]: Amount of tar formed
[X27]: Concentration of gaseous tar
[X28]: Dust

TABLE 38

| No. | | | | 43 | 44 | 45 |
|---|---|---|---|---|---|---|
| Division | | | *3 | Inv. | Inv. | Inv. |
| Structure of tuyere | | | | FIG. 3 | FIG. 4 | FIG. 10 |
| [X1] | [X2] | | (kg/t.pig) | 181 | 180 | 180 |
| | [X3] | | (kg/t.pig) | 121 | 120 | 120 |
| | [X4] | | (kg/t.pig) | 5 | 4 | 4 |
| | [X7] | [X8] | | — | — | — |
| | (kg/t.pig) | [X9] | | 20 | 20 | 20 |
| [X5] | [X6] | | (kg/t.pig) | 214 | 212 | 214 |
| | [X7] | [X8] | | — | — | — |
| | (kg/t.pig) | [X9] | | — | — | — |
| | [X28] | | (kg/t.pig) | 45 | 45 | 45 |
| | PC/O₂ | *1 | (kg/Nm³) | 1.01 | 1.00 | 1.00 |
| | PC + SR/O₂ | *1 | (kg/Nm³) | — | — | — |
| [X10] | Oxygen | *2 | (Nm³/t.pig) | 212 | 212 | 213 |
| | Air | | (Nm³/t.pig) | — | — | — |
| | Steam | | (kg/t.pig) | 43 | 43 | 43 |
| | [X11] | | (° C.) | 2200 | 2200 | 2200 |
| | [X12] | | (Nm³/t.pig) | — | — | — |
| [X13] | [X14] | | (° C.) | 250 | 250 | 250 |
| | [X15] | | (Nm³/t.pig) | 682 | 682 | 685 |
| | [X16] | CO | (%) | 72.5 | 76.3 | 74.5 |
| | | CO₂ | (%) | — | — | — |
| | | H₂ | (%) | 13.8 | 13.2 | 14.7 |
| | | CH₄ | (%) | 4.9 | 3.9 | 3.6 |
| | | C₂ | (%) | 0.9 | 0.9 | 0.3 |
| | | C₃ | (%) | 2.7 | 1.2 | 1.1 |
| | | C₄ | (%) | 0.5 | 0.6 | 0.1 |

TABLE 38-continued

| No. | | | 43 | 44 | 45 |
|---|---|---|---|---|---|
| | N₂ | (%) | 4.7 | 3.9 | 5.7 |
| | HCl | (ppm) | — | — | — |
| | [X17] | (kcal/Nm³) | 3810 | 3535 | 3241 |
| Slag | [X18] | (kg/t.pig) | 124 | 125 | 124 |
| | [X19] | (%) | 1.1 | 1.0 | 0.9 |
| | [X20] | | 1.1 | 1.1 | 1.1 |
| | [X21] | (° C.) | 1525 | 1535 | 1540 |
| | [X22] | (° C.) | 1490 | 1505 | 1515 |
| [X23] | [X24] | (kg/t.pig) | 25.0 | 24.2 | 23.9 |
| | C content | (wt %) | 27.7 | 27.3 | 27.5 |
| | T. Fe content | (wt %) | 26.6 | 26.5 | 26.3 |
| | Zn content | (wt %) | 3.4 | 3.4 | 3.5 |
| | [X25] | (wt %) | 1.3 | 0.9 | — |
| | [X26] | (kg/t.pig) | 0.1 | 0.2 | — |
| [X27] | | (mg/Nm³) | 112 | 52 | 30 |

*1 PC: Pulverized coal ratio (kg/t.pig)
SR: Waste plastics ratio, injected (kg/t.pig)
O₂: Flow rate of oxygen (Nm³/t.pig)
*2 Amount of oxygen added to air in Nos. 61 to 66, Nos. 69 to 74.
*3 Inv.: Inventive example
Com.: Comparative example
[X1]: Charging from furnace top
[X2]: Coke ratio
[X3]: Converter slag ratio
[X4]: Silica ratio
[X5]: Injection from tuyere
[X6]: Pulverized coal
[X7]: Waste plastics
[X8]: Polyvinyl chloride
[X9]: Other than polyvinyl chloride
[X10]: Air blowing
[X11]: Temperature in front of tuyere
[X12]: Air for secondary combustion
[X13]: Furnace top
[X14]: Furnace top temperature
[X15]: Amount of exhaust gas
[X16]: Composition of exhaust gas
[X17]: Calorific value of exhaust gas
[X18]: Slag ratio
[X19]: FeO content in slag
[X20]: CaO + MgO/SiO₂ in slag
[X21]: Temperature of slag
[X22]: Temperature of molten iron
[X23]: Furnace top dust
[X24]: Amount formed
[X25]: Concentration of tar
[X26]: Amount of tar formed
[X27]: Concentration of gaseous tar
[X28]: Dust

TABLE 39

| No. | | | | 46 | 47 | 48 |
|---|---|---|---|---|---|---|
| Division | | | *3 | Inv. | Inv. | Inv. |
| Structure of tuyere | | | | FIG. 3 | FIG. 4 | FIG. 10 |
| [X1] | [X2] | | (kg/t.pig) | 171 | 170 | 170 |
| | [X3] | | (kg/t.pig) | 119 | 121 | 120 |
| | [X4] | | (kg/t.pig) | 4 | 4 | 4 |
| | [X7] | [X8] | | — | — | — |
| | (kg/t.pig) | [X9] | | 40 | 40 | 40 |
| [X5] | [X6] | | (kg/t.pig) | 208 | 208 | 210 |
| | [X7] | [X8] | | — | — | — |
| | (kg/t.pig) | [X9] | | — | — | — |
| | [X28] | | (kg/t.pig) | 45 | 45 | 45 |
| | PC/O₂ | *1 | (kg/Nm³) | 1.00 | 1.00 | 1.00 |
| | PC + SR/O₂ | *1 | (kg/Nm³) | — | — | — |
| [X10] | Oxygen | *2 | (Nm³/t.pig) | 208 | 210 | 210 |
| | Air | | (Nm³/t.pig) | — | — | — |
| | Steam | | (kg/t.pig) | 43 | 45 | 44 |
| | [X11] | | (° C.) | 2200 | 2200 | 2200 |
| | [X12] | | (Nm³/t.pig) | — | — | — |
| [X13] | [X14] | | (° C.) | 250 | 250 | 250 |
| | [X15] | | (Nm³/t.pig) | 689 | 691 | 694 |

TABLE 39-continued

| No. | | | 46 | 47 | 48 |
|---|---|---|---|---|---|
| [X16] | CO | (%) | 70.1 | 72.9 | 68.6 |
| | $CO_2$ | (%) | — | — | — |
| | $H_2$ | (%) | 14.9 | 14.1 | 17.9 |
| | $CH_4$ | (%) | 5.2 | 5.1 | 5.0 |
| | $C_2$ | (%) | 1.3 | 1.0 | 0.8 |
| | $C_3$ | (%) | 2.9 | 1.7 | 2.7 |
| | $C_4$ | (%) | 0.9 | 0.7 | 0.2 |
| | $N_2$ | (%) | 4.7 | 4.5 | 4.8 |
| | HCl | (ppm) | — | — | — |
| | [X17] | (kcal/$Nm^3$) | 4006 | 3707 | 3705 |
| Slag | [X18] | (kg/t.pig) | 125 | 126 | 125 |
| | [X19] | (%) | 0.9 | 0.9 | 1.0 |
| | [X20] | | 1.1 | 1.1 | 1.1 |
| | [X21] | (° C.) | 1545 | 1545 | 1540 |
| | [X22] | (° C.) | 1525 | 1520 | 1510 |
| [X23] | [X24] | (kg/t.pig) | 25.3 | 25.0 | 24.8 |
| | C content | (wt %) | 26.8 | 27.0 | 26.7 |
| | T. Fe content | (wt %) | 27.1 | 27.5 | 27.0 |
| | Zn content | (wt %) | 3.3 | 3.4 | 3.4 |
| | [X25] | (wt %) | 7.6 | 0.1 | 0.1 |
| | [X26] | (kg/t.pig) | 0.6 | 0.02 | 0.02 |
| [X27] | | (mg/$Nm^3$) | 184 | 295 | 71 |

*1 PC: Pulverized coal ratio (kg/t.pig)
SR: Waste plastics ratio, injected (kg/t.pig)
$O_2$: Flow rate of oxygen ($Nm^3$/t.pig)
*2 Amount of oxygen added to air in Nos. 61 to 66, Nos. 69 to 74.
*3 Inv.: Inventive example
Com.: Comparative example
[X1]: Charging from furnace top
[X2]: Coke ratio
[X3]: Converter slag ratio
[X4]: Silica ratio
[X5]: Injection from tuyere
[X6]: Pulverized coal
[X7]: Waste plastics
[X8]: Polyvinyl chloride
[X9]: Other than polyvinyl chloride
[X10]: Air blowing
[X11]: Temperature in front of tuyere
[X12]: Air for secondary combustion
[X13]: Furnace top
[X14]: Furnace top temperature
[X15]: Amount of exhaust gas
[X16]: Composition of exhaust gas
[X17]: Calorific value of exhaust gas
[X18]: Slag ratio
[X19]: FeO content in slag
[X20]: CaO + MgO/$SiO_2$ in slag
[X21]: Temperature of slag
[X22]: Temperature of molten iron
[X23]: Furnace top dust
[X24]: Amount formed
[X25]: Concentration of tar
[X26]: Amount of tar formed
[X27]: Concentration of gaseous tar
[X28]: Dust

TABLE 40

| No. | | | | 49 | 50 | 51 |
|---|---|---|---|---|---|---|
| Division | | | *3 | Inv. | Inv. | Inv. |
| Structure of tuyere | | | | FIG. 3 | FIG. 4 | FIG. 10 |
| [X1] | [X2] | | (kg/t.pig) | 177 | 176 | 176 |
| | [X3] | | (kg/t.pig) | 119 | 120 | 121 |
| | [X4] | | (kg/t.pig) | 4 | 4 | 5 |
| | [X7] | [X8] | | — | — | — |
| | (kg/t.pig) | [X9] | | 20 | 20 | 20 |
| [X5] | [X6] | | (kg/t.pig) | 135 | 138 | 137 |
| | [X7] | [X8] | | — | — | — |
| | (kg/t.pig) | [X9] | | 81 | 81 | 81 |
| | [X28] | | (kg/t.pig) | 45 | 45 | 45 |
| | PC/$O_2$ | *1 | (kg/$Nm^3$) | — | — | — |
| | PC + SR/$O_2$ | *1 | (kg/$Nm^3$) | 0.99 | 1.00 | 0.99 |

TABLE 40-continued

| No. | | | | 49 | 50 | 51 |
|---|---|---|---|---|---|---|
| [X10] | Oxygen | *2 | ($Nm^3$/t.pig) | 218 | 220 | 220 |
| | Air | | ($Nm^3$/t.pig) | — | — | — |
| | Steam | | (kg/t.pig) | 15 | 16 | 15 |
| | [X11] | | (° C.) | 2200 | 2200 | 2200 |
| | [X12] | | ($Nm^3$/t.pig) | — | — | — |
| [X13] | [X14] | | (° C.) | 250 | 250 | 250 |
| | [X15] | | ($Nm^3$/t.pig) | 692 | 704 | 700 |
| | [X16] | CO | (%) | 69.1 | 69.2 | 67.7 |
| | | $CO_2$ | (%) | — | — | — |
| | | $H_2$ | (%) | 17.1 | 22.1 | 24.9 |
| | | $CH_4$ | (%) | 4.2 | 3.7 | 2.1 |
| | | $C_2$ | (%) | 0.6 | 0.2 | 0.3 |
| | | $C_3$ | (%) | 1.9 | 1.2 | 0.7 |
| | | $C_4$ | (%) | 0.3 | 0.1 | 0.1 |
| | | $N_2$ | (%) | 6.8 | 3.5 | 4.2 |
| | | HCl | (ppm) | — | — | — |
| | [X17] | | (kcal/$Nm^3$) | 3462 | 3286 | 3086 |
| Slag | [X18] | | (kg/t.pig) | 115 | 117 | 116 |
| | [X19] | | (%) | 1.6 | 1.6 | 1.4 |
| | [X20] | | | 1.1 | 1.1 | 1.1 |
| | [X21] | | (° C.) | 1510 | 1535 | 1540 |
| | [X22] | | (° C.) | 1490 | 1500 | 1515 |
| [X23] | [X24] | | (kg/t.pig) | 23.2 | 23.5 | 23.4 |
| | C content | | (wt %) | 26.8 | 26.6 | 27.0 |
| | T. Fe content | | (wt %) | 25.3 | 25.7 | 25.8 |
| | Zn content | | (wt %) | 3.4 | 3.4 | 3.4 |
| | [X25] | | (wt %) | 5.2 | — | — |
| | [X26] | | (kg/t.pig) | 0.3 | — | — |
| [X27] | | | (mg/$Nm^3$) | 213 | 291 | 64 |

*1 PC: Pulverized coal ratio (kg/t.pig)
SR: Waste plastics ratio, injected (kg/t.pig)
$O_2$: Flow rate of oxygen ($Nm^3$/t.pig)
*2 Amount of oxygen added to air in Nos. 61 to 66, Nos. 69 to 74.
*3 Inv.: Inventive example
Com.: Comparative example
[X1]: Charging from furnace top
[X2]: Coke ratio
[X3]: Converter slag ratio
[X4]: Silica ratio
[X5]: Injection from tuyere
[X6]: Pulverized coal
[X7]: Waste plastics
[X8]: Polyvinyl chloride
[X9]: Other than polyvinyl chloride
[X10]: Air blowing
[X11]: Temperature in front of tuyere
[X12]: Air for secondary combustion
[X13]: Furnace top
[X14]: Furnace top temperature
[X15]: Amount of exhaust gas
[X16]: Composition of exhaust gas
[X17]: Calorific value of exhaust gas
[X18]: Slag ratio
[X19]: FeO content in slag
[X20]: CaO + MgO/$SiO_2$ in slag
[X21]: Temperature of slag
[X22]: Temperature of molten iron
[X23]: Furnace top dust
[X24]: Amount formed
[X25]: Concentration of tar
[X26]: Amount of tar formed
[X27]: Concentration of gaseous tar
[X28]: Dust

TABLE 41

| No. | | | | 52 | 53 | 54 |
|---|---|---|---|---|---|---|
| Division | | | *3 | Inv. | Inv. | Inv. |
| Structure of tuyere | | | | FIG. 3 | FIG. 4 | FIG. 10 |
| [X1] | [X2] | | (kg/t.pig) | 185 | 182 | 182 |
| | [X3] | | (kg/t.pig) | 120 | 121 | 122 |
| | [X4] | | (kg/t.pig) | 4 | 4 | 5 |
| | [X7] | [X8] | | 6 | 3 | 9 |

TABLE 41-continued

| No. | | | | 52 | 53 | 54 |
|---|---|---|---|---|---|---|
| | (kg/t.pig) | [X·9] | | 24 | 27 | 21 |
| [X·5] | [X·6] | | (kg/t.pig) | 178 | 178 | 180 |
| | [X·7] | [X·8] | | — | 6 | 9 |
| | (kg/t.pig) | [X·9] | | 30 | 24 | 21 |
| | [X·28] | | (kg/t.pig) | 45 | 45 | 45 |
| | $PC/O_2$ | *1 | (kg/Nm³) | — | — | — |
| | $PC + SR/O_2$ | *1 | (kg/Nm³) | 1.00 | 1.00 | 1.01 |
| [X·10] | Oxygen | *2 | (Nm³/t.pig) | 208 | 209 | 208 |
| | Air | | (Nm³/t.pig) | — | — | — |
| | Steam | | (kg/t.pig) | 8 | 9 | 8 |
| [X·11] | | | (° C.) | 2300 | 2300 | 2300 |
| [X·12] | | | (Nm³/t.pig) | — | — | — |
| [X·13] | [X·14] | | (° C.) | 510 | 510 | 510 |
| | [X·15] | | (Nm³/t.pig) | 643 | 655 | 644 |
| | [X·16] | CO | (%) | 70.5 | 70.2 | 71.6 |
| | | $CO_2$ | (%) | — | — | — |
| | | $H_2$ | (%) | 15.2 | 12.8 | 14.7 |
| | | $CH_4$ | (%) | 5.1 | 4.9 | 4.8 |
| | | $C_2$ | (%) | 1.1 | 1.2 | 1.2 |
| | | $C_3$ | (%) | 2.0 | 2.0 | 2.1 |
| | | $C_4$ | (%) | 0.4 | 0.5 | 0.5 |
| | | $N_2$ | (%) | 5.7 | 7.2 | 5.1 |
| | | HCl | (ppm) | 20 | 39 | 49 |
| | [X·17] | | (kcal/Nm³) | 3656 | 3611 | 3715 |
| Slag | [X·18] | | (kg/t.pig) | 116 | 113 | 115 |
| | [X·19] | | (%) | 0.9 | 0.9 | 0.8 |
| | [X·20] | | | 1.1 | 1.1 | 1.1 |
| | [X·21] | | (° C.) | 1535 | 1540 | 1550 |
| | [X·22] | | (° C.) | 1500 | 1505 | 1525 |
| [X·23] | [X·24] | | (kg/t.pig) | 22.6 | 22.1 | 21.8 |
| | C content | | (wt %) | 26.0 | 25.8 | 25.8 |
| | T. Fe content | | (wt %) | 27.1 | 26.6 | 26.7 |
| | Zn content | | (wt %) | 4.6 | 4.5 | 4.6 |
| | [X·25] | | (wt %) | 0.2 | 0.1 | 0.1 |
| | [X·26] | | (kg/t.pig) | 0.03 | 0.02 | 0.02 |
| [X·27] | | | (mg/Nm³) | 425 | 378 | 401 |

*1 PC: Pulverized coal ratio (kg/t.pig)
SR: Waste plastics ratio, injected (kg/t.pig)
$O_2$: Flow rate of oxygen (Nm³/t.pig)
*2 Amount of oxygen added to air in Nos. 61 to 66, Nos. 69 to 74.
*3 Inv.: Inventive example
Com.: Comparative example
[X·1]: Charging from furnace top
[X·2]: Coke ratio
[X·3]: Converter slag ratio
[X·4]: Silica ratio
[X·5]: Injection from tuyere
[X·6]: Pulverized coal
[X·7]: Waste plastics
[X·8]: Polyvinyl chloride
[X·9]: Other than polyvinyl chloride
[X·10]: Air blowing
[X·11]: Temperature in front of tuyere
[X·12]: Air for secondary combustion
[X·13]: Furnace top
[X·14]: Furnace top temperature
[X·15]: Amount of exhaust gas
[X·16]: Composition of exhaust gas
[X·17]: Calorific value of exhaust gas
[X·18]: Slag ratio
[X·19]: FeO content in slag
[X·20]: $CaO + MgO/SiO_2$ in slag
[X·21]: Temperature of slag
[X·22]: Temperature of molten iron
[X·23]: Furnace top dust
[X·24]: Amount formed
[X·25]: Concentration of tar
[X·26]: Amount of tar formed
[X·27]: Concentration of gaseous tar
[X·28]: Dust

TABLE 42

| No. | | | | 55 | 56 | 57 | 58 |
|---|---|---|---|---|---|---|---|
| Division | | | *3 | Inv. | Inv. | Inv. | Inv. |
| Structure of tuyere | | | | FIG. 3 | FIG. 3 | FIG. 4 | FIG. 10 |
| [X·1] | [X·2] | | (kg/t.pig) | 187 | 185 | 185 | 184 |
| | [X·3] | | (kg/t.pig) | 121 | 120 | 120 | 122 |
| | [X·4] | | (kg/t.pig) | 5 | 4 | 4 | 5 |
| | [X·7] | [X·8] | | — | — | — | — |
| | (kg/t.pig) | [X·9] | | 20 | 20 | 20 | 20 |
| [X·5] | [X·6] | | (kg/t.pig) | 69 | 46 | 46 | 46 |
| | [X·7] | [X·8] | | 20 | 20 | 20 | 20 |
| | (kg/t.pig) | [X·9] | | 125 | 140 | 140 | 140 |
| | [X·28] | | (kg/t.pig) | 45 | 45 | 45 | 45 |
| | $PC/O_2$ | *1 | (kg/Nm³) | — | — | — | — |
| | $PC + SR/O_2$ | *1 | (kg/Nm³) | 0.95 | 0.92 | 0.92 | 0.92 |
| [X·10] | Oxygen | *2 | (Nm³/t.pig) | 225 | 224 | 224 | 223 |
| | Air | | (Nm³/t.pig) | — | — | — | — |
| | Steam | | (kg/t.pig) | 9 | 8 | 8 | 8 |
| [X·11] | | | (° C.) | 2300 | 2300 | 2300 | 2300 |
| [X·12] | | | (Nm³/t.pig) | — | — | — | — |
| [X·13] | [X·14] | | (° C.) | 510 | 510 | 510 | 510 |
| | [X·15] | | (Nm³/t.pig) | 720 | 719 | 719 | 715 |
| | [X·16] | CO | (%) | 57.6 | 60.7 | 62.6 | 64.2 |
| | | $CO_2$ | (%) | — | — | — | — |
| | | $H_2$ | (%) | 27.9 | 25.2 | 23.7 | 24.5 |
| | | $CH_4$ | (%) | 4.7 | 4.5 | 4.6 | 5.1 |
| | | $C_2$ | (%) | 1.1 | 1.0 | 1.0 | 1.3 |
| | | $C_3$ | (%) | 2.9 | 2.7 | 2.5 | 2.2 |
| | | $C_4$ | (%) | 0.6 | 0.5 | 0.4 | 0.6 |
| | | $N_2$ | (%) | 5.2 | 5.4 | 5.2 | 2.1 |
| | | HCl | (ppm) | 78 | 67 | 105 | 127 |
| | [X·17] | | (kcal/Nm³) | 3805 | 3727 | 3684 | 3834 |

TABLE 42-continued

| No. | | | | 55 | 56 | 57 | 58 |
|---|---|---|---|---|---|---|---|
| Slag | [X18] | | (kg/t.pig) | 103 | 97 | 96 | 96 |
| | [X19] | | (%) | 1.3 | 1.3 | 1.2 | 1.8 |
| | [X20] | | | 1.1 | 1.1 | 1.1 | 1.1 |
| | [X21] | | (° C.) | 1535 | 1545 | 1540 | 1535 |
| | [X22] | | (° C.) | 1505 | 1520 | 1510 | 1510 |
| [X23] | [X24] | | (kg/t.pig) | 21.9 | 21.6 | 21.3 | 20.8 |
| | C content | | (wt %) | 27.7 | 27.6 | 27.5 | 27.2 |
| | T. Fe content | | (wt %) | 25.5 | 25.6 | 24.9 | 25.0 |
| | Zn content | | (wt %) | 4.6 | 4.6 | 4.7 | 4.7 |
| | [X25] | | (wt %) | 2.8 | 2.1 | 2.2 | 3.0 |
| | [X26] | | (kg/t.pig) | 0.4 | 0.3 | 0.3 | 0.4 |
| [X27] | | | (mg/Nm$^3$) | 375 | 357 | 404 | 389 |

*1 PC: Pulverized coal ratio (kg/t.pig)
SR: Waste plastics ratio, injected (kg/t.pig)
$O_2$: Flow rate of oxygen (Nm$^3$/t.pig)
*2 Amount of oxygen added to air in Nos. 61 to 66, Nos. 69 to 74.
*3 Inv.: Inventive example
Com.: Comparative example
[X1]: Charging from furnace top
[X2]: Coke ratio
[X3]: Converter slag ratio
[X4]: Silica ratio
[X5]: Injection from tuyere
[X6]: Pulverized coal
[X7]: Waste plastics
[X8]: Polyvinyl chloride
[X9]: Other than polyvinyl chloride
[X10]: Air blowing
[X11]: Temperature in front of tuyere
[X12]: Air for secondary combustion
[X13]: Furnace top
[X14]: Furnace top temperature
[X15]: Amount of exhaust gas
[X16]: Composition of exhaust gas
[X17]: Calorific value of exhaust gas
[X18]: Slag ratio
[X19]: FeO content in slag
[X20]: CaO + MgO/SiO$_2$ in slag
[X21]: Temperature of slag
[X22]: Temperature of molten iron
[X23]: Furnace top dust
[X24]: Amount formed
[X25]: Concentration of tar
[X26]: Amount of tar formed
[X27]: Concentration of gaseous tar
[X28]: Dust

TABLE 43

| No. | | | | | 59 | 60 | 61 | 62 |
|---|---|---|---|---|---|---|---|---|
| Division | | | *3 | | Com. | Com. | Com. | Com. |
| Structure of tuyere | | | | | FIG. 22 | FIG. 22 | FIG. 22 | FIG. 22 |
| [X1] | [X2] | | | (kg/t.pig) | 288 | 288 | 303 | 305 |
| | [X3] | | | (kg/t.pig) | 120 | 121 | 122 | 120 |
| | [X4] | | | (kg/t.pig) | 5 | 6 | 5 | 4 |
| | [X7] | [X8] | | | — | — | — | — |
| | (kg/t.pig) | [X9] | | | 20 | 20 | 20 | 20 |
| [X5] | [X6] | | | (kg/t.pig) | 157 | 105 | 141 | 90 |
| | [X7] | [X8] | | | — | — | — | — |
| | (kg/t.pig) | [X9] | | | — | 50 | — | 50 |
| | [X28] | | | (kg/t.pig) | 45 | 45 | 45 | 45 |
| | PC/O$_2$ | *1 | | (kg/Nm$^3$) | 0.71 | — | 0.70 | — |
| | PC + SR/O$_2$ | *1 | | (kg/Nm$^3$) | — | 0.70 | — | 0.80 |
| [X10] | Oxygen | *2 | | (Nm$^3$/t.pig) | 222 | 221 | 174 | 175 |
| | Air | | | (Nm$^3$/t.pig) | — | — | 131 | 131 |
| | Steam | | | (kg/t.pig) | 65 | 52 | 32 | 12 |
| | [X11] | | | (° C.) | 2300 | 2300 | 2300 | 2300 |
| | [X12] | | | (Nm$^3$/t.pig) | — | — | — | — |
| [X13] | [X14] | | | (° C.) | 510 | 510 | 510 | 510 |
| | [X15] | | | (Nm$^3$/t.pig) | 713 | 713 | 685 | 680 |
| | [X16] | CO | | (%) | 70.6 | 70.3 | 67.7 | 59.9 |
| | | CO$_2$ | | (%) | — | — | — | — |
| | | H$_2$ | | (%) | 15.2 | 15.2 | 13.2 | 21.2 |

TABLE 43-continued

| No. | | | | 59 | 60 | 61 | 62 |
|---|---|---|---|---|---|---|---|
| | | $CH_4$ | (%) | 5.1 | 4.8 | 2.1 | 1.2 |
| | | $C_2$ | (%) | 0.7 | 1.2 | 0.7 | 0.4 |
| | | $C_3$ | (%) | 2.8 | 3.0 | 0.9 | 0.8 |
| | | $C_4$ | (%) | 0.2 | 0.6 | 0.2 | 0.2 |
| | | $N_2$ | (%) | 5.4 | 4.9 | 15.2 | 16.3 |
| | | HCl | (ppm) | — | — | — | — |
| | [X17] | | (kcal/$Nm^3$) | 3710 | 3906 | 2915 | 2743 |
| Slag | [X18] | | (kg/t.pig) | 134 | 130 | 133 | 129 |
| | [X19] | | (%) | 3.9 | 4.1 | 4.0 | 4.5 |
| | [X20] | | | 1.1 | 1.1 | 1.1 | 1.1 |
| | [X21] | | (° C.) | 1535 | 1540 | 1545 | 1550 |
| | [X22] | | (° C.) | 1500 | 1510 | 1510 | 1520 |
| [X23] | [X24] | | (kg/t.pig) | 25.0 | 24.8 | 25.0 | 24.6 |
| | C content | | (wt %) | 26.1 | 25.3 | 26.2 | 25.0 |
| | T. Fe content | | (wt %) | 25.9 | 26.0 | 25.7 | 26.3 |
| | Zn content | | (wt %) | 4.1 | 4.1 | 4.0 | 4.1 |
| | [X25] | | (wt %) | 0.9 | 1.7 | 1.1 | 2.4 |
| | [X26] | | (kg/t.pig) | 0.1 | 0.2 | 0.2 | 0.3 |
| [X27] | | | (mg/$Nm^3$) | 75 | 715 | 415 | 758 |

*1 PC: Pulverized coal ratio (kg/t.pig)
SR: Waste plastics ratio, injected (kg/t.pig)
$O_2$: Flow rate of oxygen ($Nm^3$/t.pig)
*2 Amount of oxygen added to air in Nos. 61 to 66, Nos. 69 to 74.
*3 Inv.: Inventive example
Com.: Comparative example
[X1]: Charging from furnace top
[X2]: Coke ratio
[X3]: Converter slag ratio
[X4]: Silica ratio
[X5]: Injection from tuyere
[X6]: Pulverized coal
[X7]: Waste plastics
[X8]: Polyvinyl chloride
[X9]: Other than polyvinyl chloride
[X10]: Air blowing
[X11]: Temperature in front of tuyere
[X12]: Air for secondary combustion
[X13]: Furnace top
[X14]: Furnace top temperature
[X15]: Amount of exhaust gas
[X16]: Composition of exhaust gas
[X17]: Calorific value of exhaust gas
[X18]: Slag ratio
[X19]: FeO content in slag
[X20]: CaO + MgO/$SiO_2$ in slag
[X21]: Temperature of slag
[X22]: Temperature of molten iron
[X23]: Furnace top dust
[X24]: Amount formed
[X25]: Concentration of tar
[X26]: Amount of tar formed
[X27]: Concentration of gaseous tar
[X28]: Dust

TABLE 44

| No. | | | | 55 | 56 | 57 | 58 |
|---|---|---|---|---|---|---|---|
| Division | | | *3 | Com. | Com. | Com. | Com. |
| Structure of tuyere | | | | FIG. 22 | FIG. 22 | FIG. 3 | FIG. 3 |
| [X1] | [X2] | | (kg/t.pig) | 257 | 258 | 194 | 194 |
| | [X3] | | (kg/t.pig) | 115 | 116 | 120 | 121 |
| | [X4] | | (kg/t.pig) | 4 | 4 | 4 | 5 |
| | [X7] | [X8] | | — | — | — | — |
| | (kg/t.pig) | [X9] | | 20 | 20 | 20 | 20 |
| [X5] | [X6] | | (kg/t.pig) | 133 | 81 | 199 | 148 |
| | [X7] | [X8] | | — | — | — | — |
| | (kg/t.pig) | [X9] | | — | 50 | — | 50 |
| | [X28] | | (kg/t.pig) | 45 | 45 | 45 | 45 |
| | PC/$O_2$ | *1 | (kg/$Nm^3$) | 0.81 | — | 1.00 | — |
| | PC + SR/$O_2$ | *1 | (kg/$Nm^3$) | — | 0.80 | — | 1.00 |
| [X10] | Oxygen | *2 | ($Nm^3$/t.pig) | 142 | 142 | 175 | 175 |
| | Air | | ($Nm^3$/t.pig) | 105 | 105 | 112 | 113 |
| | Steam | | (kg/t.pig) | 19 | — | 11 | — |

TABLE 44-continued

| No. | | | | 55 | 56 | 57 | 58 |
|---|---|---|---|---|---|---|---|
| | [X11] | | (° C.) | 2300 | 2300 | 2300 | 2300 |
| | [X12] | | (Nm³/t.pig) | 100 | 100 | — | — |
| [X13] | [X14] | | (° C.) | 520 | 520 | 510 | 510 |
| | [X15] | | (Nm³/t.pig) | 671 | 663 | 658 | 686 |
| | [X16] | CO | (%) | 58.5 | 58.9 | 69.3 | 64.9 |
| | | $CO_2$ | (%) | 15.0 | 14.7 | — | — |
| | | $H_2$ | (%) | 2.1 | 1.9 | 15.2 | 19.5 |
| | | $CH_4$ | (%) | 0.3 | 0.1 | 1.0 | 1.3 |
| | | $C_2$ | (%) | — | — | 0.3 | 0.4 |
| | | $C_3$ | (%) | — | — | 0.7 | 0.8 |
| | | $C_4$ | (%) | — | — | 0.1 | 0.1 |
| | | $N_2$ | (%) | 24.1 | 24.4 | 13.4 | 13.0 |
| | | HCl | (ppm) | — | — | — | — |
| | [X17] | | (kcal/Nm³) | 1846 | 1836 | 2790 | 2830 |
| Slag | [X18] | | (kg/t.pig) | 125 | 123 | 121 | 116 |
| | [X19] | | (%) | 4.3 | 4.6 | 2.1 | 2.3 |
| | [X20] | | | 1.1 | 1.1 | 1.1 | 1.1 |
| | [X21] | | (° C.) | 1545 | 1550 | 1545 | 1535 |
| | [X22] | | (° C.) | 1510 | 1520 | 1520 | 1505 |
| [X23] | [X24] | | (kg/t.pig) | 21.4 | 21.2 | 24.9 | 24.5 |
| | C content | | (wt %) | 26.8 | 26.0 | 26.5 | 26.2 |
| | T. Fe content | | (wt %) | 25.6 | 25.6 | 25.7 | 26.0 |
| | Zn content | | (wt %) | 4.2 | 4.3 | 4.0 | 4.1 |
| | [X25] | | (wt %) | — | — | 1.0 | 3.2 |
| | [X26] | | (kg/t.pig) | — | — | 0.2 | 0.5 |
| [X27] | | | (mg/Nm³) | 7 | 9 | 398 | 802 |

*1 PC: Pulverized coal ratio (kg/t.pig)
SR: Waste plastics ratio, injected (kg/t.pig)
$O_2$: Flow rate of oxygen (Nm³/t.pig)
*2 Amount of oxygen added to air in Nos. 61 to 66, Nos. 69 to 74.
*3 Com.: Inventive example
Com.: Comparative example
[X1]: Charging from furnace top
[X2]: Coke ratio
[X3]: Converter slag ratio
[X4]: Silica ratio
[X5]: Injection from tuyere
[X6]: Pulverized coal
[X7]: Waste plastics
[X8]: Polyvinyl chloride
[X9]: Other than polyvinyl chloride
[X10]: Air blowing
[X11]: Temperature in front of tuyere
[X12]: Air for secondary combustion
[X13]: Furnace top
[X14]: Furnace top temperature
[X15]: Amount of exhaust gas
[X16]: Composition of exhaust gas
[X17]: Calorific value of exhaust gas
[X18]: Slag ratio
[X19]: FeO content in slag
[X20]: CaO + $MgO/SiO_2$ in slag
[X21]: Temperature of slag
[X22]: Temperature of molten iron
[X23]: Furnace top dust
[X24]: Amount formed
[X25]: Concentration of tar
[X26]: Amount of tar formed
[X27]: Concentration of gaseous tar
[X28]: Dust

TABLE 45

| No. | | | 67 | 68 | 69 | 70 |
|---|---|---|---|---|---|---|
| Division *3 | | | Com. | Com. | Com. | Com. |
| Structure of tuyere | | | FIG. 3 | FIG. 3 | FIG. 3 | FIG. 3 |
| [X1] | [X2] | (kg/t · pig) | 169 | 169 | 144 | 146 |
| | [X3] | (kg/t · pig) | 120 | 121 | 120 | 120 |
| | [X4] | (kg/t · pig) | 3 | 4 | 4 | 4 |
| | [X7] [X8] | | 4 | 4 | — | — |
| | (kg/t · pig) [X9] | | 16 | 16 | 20 | 20 |
| [X5] | [X6] (kg/t · pig) | | 205 | 156 | 199 | 148 |
| | [X7] [X8] | | — | 10 | — | — |
| | (kg/t · pig) [X9] | | — | 40 | — | 50 |
| | [X28] (kg/t · pig) | | 45 | 45 | 45 | 45 |
| | $PC/O_2$ *1 (kg/Nm³) | | 1.03 | — | 100 | — |
| | $PC + SR/O_2$*1 (kg/Nm³) | | — | 1.03 | — | 1.00 |
| [X10] | Oxygen *2 (Nm³/t · pig) | | 200 | 202 | 175 | 175 |
| | Air (Nm³/t · pig) | | — | — | 112 | 112 |
| | Steam (kg/t · pig) | | 35 | 15 | 11 | — |

TABLE 45-continued

| No. | | | 67 | 68 | 69 | 70 |
|---|---|---|---|---|---|---|
| | [X11] (° C.) | | 2300 | 2300 | 2300 | 2300 |
| | [X12] (Nm$^3$/t · pig) | | 100 | 100 | 100 | 100 |
| [X13] | [X14] (° C.) | | 550 | 550 | 550 | 550 |
| | [X15] (Nm$^3$/t · pig) | | 720 | 728 | 752 | 766 |
| | [X16] | CO (%) | 42.1 | 56.1 | 45.5 | 42.9 |
| | | CO$_2$ (%) | 27.5 | 20.5 | 29.1 | 29.2 |
| | | H$_2$ (%) | 6.1 | 12.3 | 3.1 | 5.9 |
| | | CH$_4$ (%) | 1.2 | 0.1 | — | — |
| | | C$_2$ (%) | 0.1 | — | — | — |
| | | C$_3$ (%) | 0.2 | — | — | — |
| | | C$_4$ (%) | — | — | — | — |
| | | N$_2$ (%) | 22.8 | 11.0 | 22.3 | 22.0 |
| | | HCl (ppm) | 33 | 120 | — | — |
| | [X17] (kcal/Nm$^3$) | | 1588 | 2020 | 1454 | 1447 |
| Slag | [X18] (kg/t · pig) | | 124 | 123 | 119 | 116 |
| | [X19] (%) | | 1.6 | 1.7 | 1.5 | 1.7 |
| | [X20] | | 1.1 | 1.1 | 1.1 | 1.1 |
| | [X21] (° C.) | | 1535 | 1545 | 1540 | 1540 |
| | [X22] (° C.) | | 1510 | 1515 | 1505 | 1510 |
| [X23] | [X24] (kg/t · pig) | | 20.9 | 20.4 | 21.1 | 21.3 |
| | C content (wt %) | | 26.7 | 27.0 | 26.8 | 27.0 |
| | T. Fe content (wt %) | | 27.5 | 27.1 | 27.0 | 26.6 |
| | Zn content (wt %) | | 4.4 | 4.5 | 4.4 | 4.5 |
| | [X25] (wt %) | | 0.3 | — | — | — |
| | [X26] (kg/t · pig) | | 0.01 | — | — | — |
| [X27] | (mg/Nm$^3$) | | 54 | 79 | 69 | 89 |

*1 PC: Pulverized coal ratio (kg/t · pig) SR: Waste plastics ratio, injected (kg/t · pig) O$_2$: Flow rate of oxygen (Nm$^3$/t · pig)
*2 Amount of oxygen added to air in Nos. 61 to 66, Nos. 69 to 74.
*3 Inv.: Inventive example Com.: Comparative example
[X1] : Charging from furnace top
[X2] : Coke ratio
[X3] : Converter slag ratio
[X4] : Silica ratio
[X5] : Injection from tuyere
[X6] : Pulverized coal
[X7] : Waste plastics
[X8] : Polyvinyl chloride
[X9] : Other than polyvinyl chloride
[X10] : Air blowing
[X11] : Temperature in front of tuyere
[X12] : Air for secondary combustion
[X13] : Furnace top
[X14] : Furnace top temperature
[X15] : Amount of exhaust gas
[X16] : Composition of exhaust gas
[X17] : Calorific value of exhaust gas
[X18] : Slag ratio
[X19] : FeO content in slag
[X20] : CaO + MgO/SiO$_2$ in slag
[X21] : Temperature of slag
[X22] : Temperature of molten iron
[X23] : Furnace top dust
[X24] : Amount formed
[X25] : Concentration of tar
[X26] : Amount of tar formed
[X27] : Concentration of gaseous tar
[X28] : Dust

TABLE 46

| No. | | | 71 | 72 | 73 | 74 |
|---|---|---|---|---|---|---|
| Division *3 | | | Com. | Com. | Com. | Com. |
| Structure of tuyere | | | FIG. 2 | FIG. 3 | FIG. 2 | FIG. 3 |
| [X1] | [X2] (kg/t · pig) | | 140 | 139 | 132 | 130 |
| | [X3] (kg/t · pig) | | 96 | 97 | 95 | 95 |
| | [X4] (kg/t · pig) | | 3 | 3 | 4 | 4 |
| | [X7] | [X8] (kg/t · pig) | — | — | — | — |
| | | [X9] (kg/t · pig) | 20 | 20 | 20 | 20 |
| [X5] | [X6] (kg/t · pig) | | 140 | 90 | 116 | 65 |
| | [X7] | [X8] (kg/t · pig) | — | — | — | — |
| | | [X9] (kg/t · pig) | — | 50 | — | 50 |
| | [X28] (kg/t · pig) | | 45 | 45 | 45 | 45 |

TABLE 46-continued

| No. | | | 71 | 72 | 73 | 74 |
|---|---|---|---|---|---|---|
| | PC/O$_2$ *1 (kg/Nm$^3$) | | 0.80 | — | 0.80 | — |
| | PC + SR/O$_2$*1 (kg/Nm$^3$) | | — | 0.80 | — | 0.80 |
| [X10] | Oxygen *2 (Nm$^3$/t · pig) | | 147 | 147 | 122 | 122 |
| | Air (Nm$^3$/t · pig) | | 131 | 131 | 107 | 107 |
| | Steam (kg/t · pig) | | 17 | — | 14 | 12 |
| | [X11] (° C.) | | 2300 | 2300 | 2300 | 2300 |
| | [X12] (Nm$^3$/t · pig) | | — | — | 75 | 75 |
| [X13] | [X14] (° C.) | | 475 | 475 | 520 | 520 |
| | [X15] (Nm$^3$/t · pig) | | 593 | 594 | 568 | 565 |
| | [X16] | CO (%) | 68.7 | 65.1 | 51.7 | 49.5 |
| | | CO$_2$ (%) | — | — | 19.8 | 21.0 |
| | | H$_2$ (%) | 12.1 | 15.3 | 3.2 | 4.1 |
| | | CH$_4$ (%) | 1.1 | 1.2 | — | — |
| | | C$_2$ (%) | 0.2 | 0.3 | — | — |
| | | C$_3$ (%) | 0.3 | 0.2 | — | — |
| | | C$_4$ (%) | 0.1 | 0.1 | — | — |
| | | N$_2$ (%) | 17.5 | 17.8 | 25.3 | 25.4 |
| | | HCl (ppm) | — | — | — | — |
| | [X17] (kcal/Nm$^3$) | | 2602 | 2578 | 1643 | 1600 |
| Slag | [X18] (kg/t · pig) | | 100 | 98 | 95 | 92 |
| | [X19] (%) | | 2.2 | 2.3 | 2.0 | 2.4 |
| | [X20] | | 1.1 | 1.1 | 1.1 | 1.1 |
| | [X21] (° C.) | | 1535 | 1530 | 1540 | 1530 |
| | [X22] (° C.) | | 1500 | 1500 | 1505 | 1500 |
| [X23] | [X24] (kg/t · pig) | | 24.9 | 24.5 | 21.4 | 21.0 |
| | C content (wt %) | | 25.8 | 25.9 | 26.1 | 26.0 |
| | T. Fe content (wt %) | | 27.5 | 27.0 | 29.1 | 28.8 |
| | Zn content (wt %) | | 4.1 | 4.1 | 4.5 | 4.6 |
| | [X25] (wt %) | | 1.0 | 1.1 | — | — |
| | [X26] (kg/t · pig) | | 0.1 | 0.2 | — | — |
| [X27] | (mg/Nm$^3$) | | 207 | 297 | 17 | 25 |

*1 PC: Pulverized coal ratio (kg/t · pig) SR: Waste plastics ratio, injected (kg/t · pig) O$_2$: Flow rate of oxygen (Nm$^3$/t · pig)
*2 Amount of oxygen added to air in Nos. 61 to 66, Nos. 69 to 74.
*3 Inv.: Inventive example Com.: Comparative example
[X1] : Charging from furnace top
[X2] : Coke ratio
[X3] : Converter slag ratio
[X4] : Silica ratio
[X5] : Injection from tuyere
[X6] : Pulverized coal
[X7] : Waste plastics
[X8] : Polyvinyl chloride
[X9] : Other than polyvinyl chloride
[X10] : Air blowing
[X11] : Temperature in front of tuyere
[X12] : Air for secondary combustion
[X13] : Furnace top
[X14] : Furnace top temperature
[X15] : Amount of exhaust gas
[X16] : Composition of exhaust gas
[X17] : Calorific value of exhaust gas
[X18] : Slag ratio
[X19] : FeO content in slag
[X20] : CaO + MgO/SiO$_2$ in slag
[X21] : Temperature of slag
[X22] : Temperature of molten iron
[X23] : Furnace top dust
[X24] : Amount formed
[X25] : Concentration of tar
[X26] : Amount of tar formed
[X27] : Concentration of gaseous tar
[X28] : Dust

TABLE 47

| No. | | 1 | 2 | 3 |
|---|---|---|---|---|
| Structure of tuyere | | FIG. 2 | FIG. 3 | FIG. 2 |
| Fuel and raw materials | Coke (kg/HMT) | 256 | 140 | 578 |
| | Limestone *1 (kg/HMT) | 94 | 41 | 100 |
| | Silica *1 (kg/HMT) | 23 | 16 | 14 |
| | Serpentine *1 (kg/HMT) | 15 | 6 | 15 |
| Blowing | Oxygen (Nm$^3$/HMT) | 236 | 192 | 316 |

TABLE 47-continued

| No. | | 1 | 2 | 3 |
|---|---|---|---|---|
| | Steam (kg/HMT) | 72 | — | 184 |
| | Air *2 (Nm³/HMT) | 16 | 28 | — |
| | [※1] (° C.) | 2200 | 2200 | 2200 |
| Injection from tuyere | Pulverized coal (kg/HMT) | 200 | 55 | — |
| | Waste plastics (kg/HMT) | — | 120 | — |
| Furnace top gas | Temperature *3 (° C.) | 150 | 150 | 150 |
| | [※2] (Nm³/HMT) | 845 | 670 | 1148 |
| | CO (%) | 73.5 | 62.6 | 76.4 |
| | CO₂ (%) | 1.8 | 0.8 | 1.4 |
| | H₂ (%) | 22.6 | 32.9 | 21.8 |
| | N₂ (%) | 2.1 | 3.7 | 0.4 |
| | [※3] (kcal/Nm³) | 2779 | 2721 | 2849 |
| Furnace top dust | Amount (kg/HMT) | 13 | 12 | 16 |
| | C content (%) | 35 | 34 | 24 |
| | T. Fe content (%) | 26 | 25 | 30 |
| | Zn content (%) | 0.5 | 0.5 | 0.5 |
| Slag | Slag ratio (kg/HMT) | 124 | 53 | 129 |
| | FeO content in slag (%) | 0.4 | 0.4 | 0.4 |
| | Slag basicity *4 (-) | 1.2 | 1.2 | 1.2 |
| | Slag temperature (° C.) | 1540 | 1540 | 1540 |
| | Molten iron temerature (° C.) | 1500 | 1500 | 1500 |

*1: Limestone (as CaO source), Silica (as SiO₂ source), Serpentine (as MgO source) Converter slag is not used to reduce the P content
*2: Carrier gas for pulverized coal and was teplastics
*3: Equivalent to blast furnace.
*4: Slag basicity is made equal to that of balst furnace slag in consideration of melting point, viscosity, desulfurization, and disposal
[※1]: Temperature in front of tuyere
[※2]: Amount of exhaust gas
[※3]: Calorific value of exhaust gas Exploitation in Industry The present invention can be applied to the integrated steel mill for the production of molten iron and high-calorie exhaust gas from scrap and waste plastics.

We claim:

1. A scrap melting process which comprises charging a shaft furnace with ferrous scrap and coke, and injecting pulverized coal, waste plastics and oxygen into the furnace through a burner at the tuyere, with injection of pulverized coal and waste plastics from the center of the burner and injection of oxygen from its periphery, so as to mix together pulverized coal, waste plastics, and oxygen, thereby achieving rapid combustion of pulverized coal and at least part of waste plastics in the combustion zone that forms in front of the tuyere, thereby causing the sensible heat of the combustion gas to melt the scrap and produce molten iron therefrom and recovering the combustion gas as a fuel gas without intentional secondary combustion in the furnace.

2. A scrap melting process which comprises charging a shaft furnace with ferrous scrap and coke, and injecting pulverized coal, waste plastics and oxygen into the furnace through a burner at the tuyere, with injection of oxygen from the center of the burner, injection of pulverized coal and waste plastics from its periphery, and additional injection of oxygen from its periphery, so as to mix together pulverized coal, waste plastics, and oxygen, thereby achieving rapid combustion of pulverized coal and at least part of waste plastics in the combustion zone that forms in front of the tuyere, thereby causing the sensible heat of the combustion gas to melt the scrap and produce molten iron therefrom and recovering the combustion gas as a fuel gas without intentional secondary combustion in the furnace.

3. A scrap melting process as defined in claim 1 or 2, in which the injection of waste plastics from the burner is carried out discontinuously or intermittently and the injection of waste plastics is carried out simultaneously with the injection of pulverized coal or temporarily in place of the injection of pulverized coal.

4. A scrap melting process that employs a shaft furnace equipped at its tuyere with a burner having a pre-combustion chamber in its forward opening, said process comprising charging the shaft furnace with ferrous scrap and coke from the furnace top, and injecting pulverized coal and oxygen into the pre-combustion chamber of the burner and also injecting or charging waste plastics, with injection of pulverized coal from the center of the burner and injection of oxygen from its periphery, so as to mix together pulverized coal and oxygen, thereby achieving rapid combustion of pulverized coal and at least part of waste plastics in the pre-combustion chamber, leading the combustion gas from the forward opening of the burner into the furnace, thereby causing the sensible heat of the combustion gas to melt the scrap and produce molten iron therefrom and recovering the combustion gas as a fuel gas without intentional secondary combustion in the furnace.

5. A scrap melting process as defined in claim 4, in which waste plastics in the form of powder, granule, or chips is injected into the pre-combustion chamber from the center of the burner.

6. A scrap melting process that employs a shaft furnace equipped at its tuyere with a burner having a pre-combustion chamber in its forward opening, said process comprising charging the shaft furnace with ferrous scrap and coke from the furnace top, and injecting pulverized coal and oxygen into the pre-combustion chamber of the burner and also injecting or charging waste plastics, with injection of oxygen from the center of the burner, injection of at least pulverized coal from its periphery, and additional injection of oxygen from its periphery, so as to mix together pulverized coal and oxygen, thereby achieving rapid combustion of pulverized coal and at least part of waste plastics in the pre-combustion chamber, leading the combustion gas from the forward opening of the burner into the furnace, thereby causing the sensible heat of the combustion gas to melt the scrap and produce molten iron therefrom and recovering the combustion gas as a fuel gas without intentional secondary combustion in the furnace.

7. A scrap melting process as defined in claim 6, in which waste plastics in the form of powder, granule, or chips is injected into the pre-combustion chamber from the periphery of oxygen being injected from the center of the burner.

8. A scrap melting process as defined in any of claims 4 to 7, in which the injection or charging of waste plastics into the pre-combustion chamber is carried out discontinuously or intermittently and the injection or charging of waste plastics is carried out simultaneously with the injection of pulverized coal or temporarily in place of the injection of pulverized coal.

9. A scrap melting process as defined in any of claims 1, 2 or 4–7 in which pulverized coal, waste plastics, and oxygen are supplied to the burner such that the ratio $(PC+SR)/O_2$ is greater than 0.7 kg/Nm³, where PC denotes the pulverized coal ratio (kg/t-pig), SR denotes the waste plastics ratio (kg/t-pig), and $O_2$ denote the oxygen flow rate (Nm³/t-pig).

10. A scrap melting process as defined in any of claims 1, 2 or 4–7, in which the fuel ratio is greater than 300 kg/t-pig and pulverized coal and waste plastics are supplied to the burner and coke is charged from the furnace top such that the ratio (by weight) of (pulverized coal ratio plus waste plastics ratio)/(coke ratio) is greater than 1.0.

11. A scrap melting process which comprises charging a shaft furnace with ferrous scrap, coke, and waste plastics from the furnace top, and injecting pulverized coal and oxygen into the furnace through a burner at the tuyere, with injection of pulverized coal from the center of the burner and injection of oxygen from its periphery, so as to mix together pulverized coal and oxygen, thereby achieving rapid combustion of pulverized coal in the combustion zone that forms in front of the tuyere, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

12. A scrap melting process which comprises charging a shaft furnace with ferrous scrap, coke, and waste plastics from the furnace top, and injecting pulverized coal and oxygen into the furnace through a burner at the tuyere, with injection of oxygen from the center of the burner, injection of pulverized coal from its periphery, and additional injection of oxygen from its periphery, so as to mix together pulverized coal and oxygen, thereby achieving rapid combustion of pulverized coal in the combustion zone that forms in front of the tuyere, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

13. A scrap melting process which comprises charging a shaft furnace with ferrous scrap, coke, and waste plastics from the furnace top, and injecting pulverized coal, waste plastics, and oxygen into the furnace through a burner at the tuyere, with injection of pulverized coal and waste plastics from the center of the burner and injection of oxygen from its periphery, so as to mix together pulverized coal, waste plastics, and oxygen, thereby achieving rapid combustion of pulverized coal and at least part of waste plastics in the combustion zone that forms in front of the tuyere, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

14. A scrap melting process which comprises charging a shaft furnace with ferrous scrap, coke, and waste plastics from the furnace top, and injecting pulverized coal, waste plastics, and oxygen into the furnace through a burner at the tuyere, with injection of oxygen from the center of the burner, injection of pulverized coal and waste plastics from its periphery, and additional injection of oxygen from its periphery, so as to mix together pulverized coal, waste plastics, and oxygen, thereby achieving rapid combustion of pulverized coal and at least part of waste plastics in the combustion zone that forms in front of the tuyere, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

15. A scrap melting process as defined in claim 13 or 14, in which the injection of waste plastics from the burner is carried out discontinuously or intermittently and the injection of waste plastics is carried out simultaneously with the injection of pulverized coal or temporarily in place of the injection of pulverized coal.

16. A scrap melting process that employs a shaft furnace equipped at its tuyere with a burner having a pre-combustion chamber in its forward opening, said process comprising charging the shaft furnace with ferrous scrap, coke, and waste plastics from the furnace top, and injecting pulverized coal and oxygen into the pre-combustion chamber of the burner, with injection of pulverized coal from the center of the burner and injection of oxygen from its periphery, so as to mix together pulverized coal and oxygen, thereby achieving rapid combustion of pulverized coal in the pre-combustion chamber, leading the combustion gas from the forward opening of the burner into the furnace, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

17. A scrap melting process that employs a shaft furnace equipped at its tuyere with a burner having a pre-combustion chamber in its forward opening, said process comprising charging the shaft furnace with ferrous scrap, coke and waste plastics from the furnace top, and injecting pulverized coal and oxygen into the pre-combustion chamber of the burner, with injection of oxygen from the center of the burner, injection of pulverized coal from its periphery, and additional injection of oxygen from its periphery, so as to mix together pulverized coal and oxygen, thereby achieving rapid combustion of pulverized coal in the pre-combustion chamber, leading the combustion gas from the forward opening of the burner into the furnace, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

18. A scrap melting process that employs a shaft furnace equipped at its tuyere with a burner having a pre-combustion chamber in its forward opening, said process comprising charging the shaft furnace with ferrous scrap, coke, and waste plastics from the furnace top, and injecting pulverized coal and oxygen into the pre-combustion chamber of the burner and injecting or charging waste plastics into the pre-combustion chamber of the burner, with injection of at least part of pulverized coal from the center of the burner and injection of oxygen from its periphery, so as to mix together pulverized coal and oxygen, thereby achieving rapid combustion of pulverized coal in the pre-combustion chamber, leading the combustion gas from the forward opening of the burner into the furnace, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

19. A scrap melting process as defined in claim 18, in which waste plastics in the form of powder, granule, or chips is injected into the pre-combustion chamber from the center of the burner.

20. A scrap melting process that employs a shaft furnace equipped at its tuyere with a burner having a pre-combustion chamber in its forward opening, said process comprising charging the shaft furnace with ferrous scrap, coke, and waste plastics from the furnace top, and injecting pulverized coal and oxygen into the pre-combustion chamber of the burner and injecting or charging waste plastics into the pre-combustion chamber of the burner, with injection of oxygen from the center of the burner, injection of at least part of pulverized coal from its periphery, and additional injection of oxygen from its periphery, so as to mix together pulverized coal and oxygen, thereby achieving rapid combustion of pulverized coal and at least part of waste plastics in the pre-combustion chamber, leading the combustion gas from the forward opening of the burner into the furnace, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

21. A scrap melting process as defined in claim 20, in which waste plastics in the form of powder, granule, or chips is injected into the pre-combustion chamber from the periphery of oxygen being injected from the center of the burner.

22. A scrap melting process as defined in any of claims 18 to 21, in which the injection or charging of waste plastics into the pre-combustion chamber is carried out discontinuously or intermittently and the injection or charging of waste plastics is carried out simultaneously with the injection of pulverized coal or temporarily in place of the injection of pulverized coal.

23. A scrap melting process as defined in any of claims 11, 12, 16, and 17, in which pulverized coal and oxygen are supplied to the burner such that the ratio $PC/O_2$ is greater than 0.7 kg/Nm$^3$, where PC denotes the pulverized coal ratio (kg/t-pig) and $O_2$ denote the oxygen flow rate (Nm$^3$/t-pig).

24. A scrap melting process as defined in any of claims 11, 12, 16, or 17, in which the fuel ratio is greater than 300 kg/t-pig and pulverized coal is supplied to the burner and coke is charged from the furnace top such that the ratio (by weight) of (pulverized coal ratio/(coke ratio) is greater than 1.0.

25. A scrap melting process as defined in any of claims 13, 14 or 18 to 21, in which pulverized coal, waste plastics, and oxygen are supplied to the burner such that the ratio (PC+SR)/$O_2$ is greater than 0.7 kg/Nm$^3$, where PC denotes the pulverized coal ratio (kg/t-pig), SR denotes the waste plastics ratio (kg/t-pig), and $O_2$ denote the oxygen flow rate (Nm$^3$/t-pig).

26. A scrap melting process as defined in any of claims 13, 14 or 18 to 21, in which the fuel ratio is greater than 300 kg/t-pig and pulverized coal and waste plastics are supplied to the burner and coke is charged from the furnace top such that the ratio (by weight) of (pulverized coal ratio plus waste plastics ratio)/(coke ratio) is greater than 1.0.

27. A scrap melting process as defined in any of claims 11 to 14, or 16 to 21, in which the furnace top temperature is kept at 400–600° C.

28. A scrap melting process which comprises charging a shaft furnace with ferrous scrap and coke from the furnace top, and injecting pulverized coal, waste plastics, and oxygen into the furnace through a burner at the tuyere, and also injecting dust into the furnace through the burner and/or any other injection means at the tuyere, with injection of pulverized coal and waste plastics from the center of the burner and injection of oxygen from its periphery, so as to mix together pulverized coal, waste plastics, and oxygen, thereby achieving rapid combustion of pulverized coal and at least part of waste plastics in the combustion zone that forms in front of the tuyere, thereby causing the sensible heat of the combustion gas to melt the scrap and produce molten iron therefrom and recovering the combustion gas as a fuel gas without intentional secondary combustion in the furnace.

29. A scrap melting process which comprises charging a shaft furnace with ferrous scrap and coke from the furnace top, and injecting pulverized coal, waste plastics, and oxygen into the furnace through a burner at the tuyere, and also injecting dust into the furnace through the burner and/or any other injection means at the tuyere, with injection of oxygen from the center of the burner, injection of pulverized coal and waste plastics from its periphery, and additional injection of oxygen from its periphery, so as to mix together pulverized coal, waste plastics, and oxygen, thereby achieving rapid combustion of pulverized coal and at least part of waste plastics in the combustion zone that forms in front of the tuyere, thereby causing the sensible heat of the combustion gas to melt the scrap and produce molten iron therefrom and recovering the combustion gas as a fuel gas without intentional secondary combustion in the furnace.

30. A scrap melting process that employs a shaft furnace equipped at its tuyere with a burner having a pre-combustion chamber in its forward opening, said process comprising charging the shaft furnace with ferrous scrap and coke from the furnace top, and injecting pulverized coal and oxygen into the pre-combustion chamber of the burner and also injecting or charging waste plastics and also injecting dust into the furnace through the burner and/or any other injection means at the tuyere, with injection of pulverized coal from the center of the burner and injection of oxygen from its periphery, so as to mix together pulverized coal and oxygen, thereby achieving rapid combustion of pulverized coal and at least part of waste plastics in the pre-combustion chamber, leading the combustion gas from the forward opening of the burner into the furnace, thereby causing the sensible heat of the combustion gas to melt the scrap and produce molten iron therefrom and recovering the combustion gas as a fuel gas without intentional secondary combustion in the furnace.

31. A scrap melting process that employs a shaft furnace equipped at its tuyere with a burner having a pre-combustion chamber in its forward opening, said process comprising charging the shaft furnace with ferrous scrap and coke from the furnace top, and injecting pulverized coal and oxygen into the pre-combustion chamber of the burner and also injecting or charging waste plastics and also injecting dust into the furnace through the burner and/or any other injection means at the tuyere, with injection of oxygen from the center of the burner, injection of at least pulverized coal from its periphery, and additional injection of oxygen from its periphery, so as to mix together pulverized coal and oxygen, thereby achieving rapid combustion of pulverized coal and at least part of waste plastics in the pre-combustion chamber, leading the combustion gas from the forward opening of the burner into the furnace, thereby causing the sensible heat of the combustion gas to melt the scrap and produce molten iron therefrom and recovering the combustion gas as a fuel gas without intentional secondary combustion in the furnace.

32. A scrap melting process which comprises charging a shaft furnace with ferrous scrap, coke, and waste plastics from the furnace top, and injecting pulverized coal and oxygen into the furnace through a burner at the tuyere, and also injecting dust into the furnace through the burner and/or any other injection means at the tuyere, with injection of pulverized coal from the center of the burner and injection of oxygen from its periphery, so as to mix together pulverized coal and oxygen, thereby achieving rapid combustion of pulverized coal in the combustion zone that forms in front of the tuyere, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

33. A scrap melting process which comprises charging a shaft furnace with ferrous scrap, coke, and waste plastics from the furnace top, and injecting pulverized coal and oxygen into the furnace through a burner at the tuyere, and also injecting dust into the furnace through the burner and/or any other injection means at the tuyere, with injection of oxygen from the center of the burner, injection of pulverized coal from its periphery, and additional injection of oxygen from its periphery, so as to mix together pulverized coal and oxygen, thereby achieving rapid combustion of pulverized coal in the combustion zone that forms in front of the tuyere, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

34. A scrap melting process which comprises charging a shaft furnace with ferrous scrap, coke, and waste plastics from the furnace top, and injecting pulverized coal, waste plastics, and oxygen into the furnace through a burner at the tuyere, and also injecting dust into the furnace through the burner and/or any other injection means at the tuyere, with injection of pulverized coal and waste plastics from the center of the burner and injection of oxygen from its periphery, so as to mix together pulverized coal, waste plastics, and oxygen, thereby achieving rapid combustion of pulverized coal and at least part of waste plastics in the combustion zone that forms in front of the tuyere, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

35. A scrap melting process which comprises charging a shaft furnace with ferrous scrap, coke, and waste plastics from the furnace top, and injecting pulverized coal, waste plastics, and oxygen into the furnace through a burner at the tuyere, and also injecting dust into the furnace through the burner and/or any other injection means at the tuyere, with injection of oxygen from the center of the burner, injection of pulverized coal and waste plastics from its periphery, and additional injection of oxygen from its periphery, so as to mix together pulverized coal, waste plastics, and oxygen, thereby achieving rapid combustion of pulverized coal and at least part of waste plastics in the combustion zone that forms in front of the tuyere, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

36. A scrap melting process that employs a shaft furnace equipped at its tuyere with a burner having a pre-combustion chamber in its forward opening, said process comprising charging the shaft furnace with ferrous scrap, coke, and waste plastics from the furnace top, and injecting pulverized coal and oxygen into the pre-combustion chamber of the burner, and also injecting dust into the furnace through the burner and/or any other injection means at the tuyere, with injection of pulverized coal from the center of the burner and injection of oxygen from its periphery, so as to mix together pulverized coal and oxygen, thereby achieving rapid combustion of pulverized coal in the pre-combustion chamber, leading the combustion gas from the forward opening of the burner into the furnace, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

37. A scrap melting process that employs a shaft furnace equipped at its tuyere with a burner having a pre-combustion chamber in its forward opening, said process comprising charging the shaft furnace with ferrous scrap, coke, and waste plastics from the furnace top, and injecting pulverized coal and oxygen into the pre-combustion chamber of the burner, and also injecting dust into the furnace through the burner and/or any other injection means at the tuyere, with injection of oxygen from the center of the burner, injection of pulverized coal from its periphery, and additional injection of oxygen from its periphery, so as to mix together pulverized coal and oxygen, thereby achieving rapid combustion of pulverized coal in the pre-combustion chamber, leading the combustion gas from the forward opening of the burner into the furnace, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

38. A scrap melting process that employs a shaft furnace equipped at its tuyere with a burner having a pre-combustion chamber in its forward opening, said process comprising charging the shaft furnace with ferrous scrap, coke, and waste plastics from the furnace top, and injecting pulverized coal and oxygen into the pre-combustion chamber of the burner and injecting or charging waste plastics into the pre-combustion chamber of the burner, and also injecting dust into the furnace through the burner and/or any other injection means at the tuyere, with injection of at least part of pulverized coal from the center of the burner and injection of oxygen from its periphery, so as to mix together pulverized coal and oxygen, thereby achieving rapid combustion of pulverized coal in the pre-combustion chamber, leading the combustion gas from the forward opening of the burner into the furnace, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

39. A scrap melting process that employs a shaft furnace equipped at its tuyere with a burner having a pre-combustion chamber in its forward opening, said process comprising charging the shaft furnace with ferrous scrap, coke, and waste plastics from the furnace top, and injecting pulverized coal and oxygen into the pre-combustion chamber of the burner and injecting or charging waste plastics into the pre-combustion chamber of the burner, and also injecting dust into the furnace through the burner and/or any other injection means at the tuyere, with injection of oxygen from the center of the burner, injection of at least part of pulverized coal from its periphery, and additional injection of oxygen from its periphery, so as to mix together pulverized coal and oxygen, thereby achieving rapid combustion of pulverized coal and at least part of waste plastics in the pre-combustion chamber, leading the combustion gas from the forward opening of the burner into the furnace, thereby causing the sensible heat of the combustion gas to melt the scrap and produce molten iron therefrom and recovering the combustion gas, together with the gas resulting from pyrolysis of waste plastics, as a fuel gas without intentional secondary combustion in the furnace.

40. A scrap melting process as defined in claim 30 or 38, in which waste plastics in the form of powder, granule, or chips is injected into the pre-combustion chamber from the center of the burner.

41. A scrap melting process as defined in claim 31 or 39, in which waste plastics in the form of powder, granule, or chips is injected into the pre-combustion chamber from the periphery of oxygen being injected from the center of the burner.

42. A scrap melting process as defined in any of claims 28, 29, 34, and 35, in which the injection of waste plastics from the burner is carried out discontinuously or intermittently and the injection of waste plastics is carried out simultaneously with the injection of pulverized coal or temporarily in place of the injection of pulverized coal.

43. A scrap melting process as defined in any of claims 30, 31, 38, or 39, in which the injection or charging of waste plastics into the pre-combustion chamber is carried out discontinuously or intermittently and the injection or charging of waste plastics is carried out simultaneously with the injection of pulverized coal or temporarily in place of the injection of pulverized coal.

44. A scrap melting process as defined in any of claims 28 to 39, in which the injection of dust into the pre-combustion chamber is carried out discontinuously or intermittently.

45. A scrap melting process as defined in any of claims 28 to 39, in which the dust to be injected into the furnace is any one or more of blast furnace dust, converter dust, electric furnace dust, cupola dust, mill scale, shredder dust, zinc dust, and dust recovered from the exhaust gas of the furnace.

46. A scrap melting process as defined in any of claims 32 to 39, in which the furnace top temperature is kept at 400–600° C.

47. A scrap melting process as defined in claim 45, in which the furnace top temperature is kept at 400–800° C. and zinc-containing dust recovered from the exhaust gas of the furnace is used as at least part of the dust to be injected into the furnace.

48. A scrap melting process as defined in any of claims 28 to 39, in which pulverized coal and oxygen are supplied to the burner such that the ratio $PC/O_2$ is greater than 0.7 kg/Nm$^3$, where PC denotes the pulverized coal ratio (kg/t-pig) and $O_2$ denote the oxygen flow rate (Nm$_3$/t-pig), if pulverized coal and oxygen are supplied to the burner, or pulverized coal, waste plastics, and oxygen are supplied to the burner such that the ratio $(PC+SR)/O_2$ is greater than 0.7 kg/Nm$^3$, where PC denotes the pulverized coal ratio (kg/t-pig), SR denotes the waste plastics ratio (kg/t-pig), and $O_2$ denote the oxygen flow rate (Nm$^3$/t-pig), if pulverized coal, waste plastics, and oxygen are supplied to the burner.

49. A scrap melting process as defined in any of claims 28 to 39, in which the fuel ratio is greater than 300 kg/t-pig and pulverized coal is supplied to the burner and coke is charged from the furnace top such that the ratio (by weight) of (pulverized coal ratio)/(coke ratio) is greater than 1.0, if pulverized coal and oxygen are supplied to the burner, and pulverized coal and waste plastics are supplied to the burner and coke is charged from the furnace top such that the ratio (by weight) of (pulverized coal ratio plus waste plastics ratio)/(coke ratio) is greater than 1, 0, if pulverized coal, waste plastics, and oxygen are supplied to the burner.

\* \* \* \* \*